US012452445B2

(12) United States Patent
Chen et al.

(10) Patent No.: US 12,452,445 B2
(45) Date of Patent: Oct. 21, 2025

(54) MOTION COMPENSATION CONSIDERING OUT-OF-BOUNDARY CONDITIONS IN VIDEO CODING

(71) Applicant: BEIJING DAJIA INTERNET INFORMATION TECHNOLOGY CO., LTD., Beijing (CN)

(72) Inventors: Yi-Wen Chen, San Diego, CA (US); Xiaoyu Xiu, San Diego, CA (US); Che-Wei Kuo, San Diego, CA (US); Hong-Jheng Jhu, San Diego, CA (US); Wei Chen, San Diego, CA (US); Ning Yan, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/774,854

(22) Filed: Jul. 16, 2024

(65) Prior Publication Data

US 2025/0016346 A1   Jan. 9, 2025

Related U.S. Application Data

(63) Continuation of application No. PCT/US2023/011077, filed on Jan. 18, 2023.
(Continued)

(51) Int. Cl.
*H04N 19/52* (2014.01)
*H04N 19/105* (2014.01)
(Continued)

(52) U.S. Cl.
CPC .......... *H04N 19/44* (2014.11); *H04N 19/105* (2014.11); *H04N 19/159* (2014.11); *H04N 19/176* (2014.11)

(58) Field of Classification Search
CPC .... H04N 19/105; H04N 19/159; H04N 19/52; H04N 19/577
See application file for complete search history.

(56) References Cited

U.S. PATENT DOCUMENTS 12,219,150 B2 *   2/2025   Yasugi .............. H04N 19/573
2021/0127133 A1   4/2021   Chen et al.
(Continued)

FOREIGN PATENT DOCUMENTS

WO   2020125755 A1   6/2020

OTHER PUBLICATIONS

Enhanced bi-directional motion compensation; Chen—Jan. 2022; (Year: 2022).*
(Continued)

*Primary Examiner* — Luis Perez-Fuentes
(74) *Attorney, Agent, or Firm* — Arch & Lake LLP; Hao Tan; Shen Wang

(57) ABSTRACT

Methods, apparatuses, and non-transitory computer-readable storage media are provided for video coding. In one method, a decoder derives a first and a second reference pictures for a current coding block; the decoder derives a first and a second predictor samples based on a motion vector associated with the first reference picture using a motion compensation process from the first reference picture; the decoder determines whether the first and the second predictor samples are out-of-boundary (OOB), and in response to determining the first or the second predictor sample is OOB, the decoder replaces the first or the second predictor sample that is OOB with a first or a second
(Continued)

alternative predictor sample; and the decoder generates the final prediction sample by averaging sample values of the first predictor sample and the second predictor sample.

9 Claims, 38 Drawing Sheets

Related U.S. Application Data

(60) Provisional application No. 63/300,631, filed on Jan. 18, 2022.

(51) Int. Cl.
*H04N 19/159* (2014.01)
*H04N 19/176* (2014.01)
*H04N 19/44* (2014.01)
*H04N 19/577* (2014.01)

(56) References Cited

U.S. PATENT DOCUMENTS

| | | |
|---|---|---|
| 2021/0160527 A1 | 5/2021 | Chuang et al. |
| 2021/0203946 A1 | 7/2021 | Sethuraman et al. |
| 2023/0247216 A1* | 8/2023 | Huang ............... H04N 19/44 375/240.15 |
| 2023/0328257 A1* | 10/2023 | Zhang ............... H04N 19/182 |
| 2024/0283968 A1* | 8/2024 | Chen ............... H04N 19/176 |
| 2024/0397081 A1* | 11/2024 | Chen ............... H04N 19/132 |
| 2025/0016346 A1* | 1/2025 | Chen ............... H04N 19/167 |

OTHER PUBLICATIONS

Motion compensation picture boundary padding; Leannce—Jul. 2022; (Year: 2022).*
ECM fix for block level out-of-bound checking; Leannce—Jul. 2022; (Year: 2022).*
International Search Report of PCT Application No. PCT/US2023/011077 dated May 9, 2023.
Kwai Inc., "AHG12: Enhanced bi-directional motion compensation" Joint Video Experts Team (JVET) of ITU-T SG 16 WP 3 and ISO/IEC JTC 1/SC 29, 25th Meeting by teleconference Jan. 12-21, 2022, JVET-Y0125, (4p).

* cited by examiner

```
┌─────────────────────────────────────────────────────────┐
│  Deriving, by a decoder, a first reference picture for  │
│  a current coding block                          3801   │
└─────────────────────────────────────────────────────────┘
                            ↓
┌─────────────────────────────────────────────────────────┐
│  Deriving, by the decoder, a first predictor sample     │
│  based on a motion vector associated with the first     │
│  reference picture using a motion compensation          │
│  process from the first reference picture               │
│                                                  3802   │
└─────────────────────────────────────────────────────────┘
                            ↓
┌─────────────────────────────────────────────────────────┐
│  Determining, by the decoder, whether the first         │
│  predictor sample is out-of-boundary (OOB), and in      │
│  response to determining the first predictor sample     │
│  is OOB, replacing, by the decoder, the first           │
│  predictor sample that is OOB with an alternative       │
│  predictor sample                                3803   │
└─────────────────────────────────────────────────────────┘
                            ↓
┌─────────────────────────────────────────────────────────┐
│  Deriving, by a decoder, a second reference picture     │
│  for the current coding block                    3804   │
└─────────────────────────────────────────────────────────┘
                            ↓
┌─────────────────────────────────────────────────────────┐
│  Deriving, by the decoder, a second predictor sample    │
│  based on a motion vector associated with the second    │
│  reference picture using a motion compensation          │
│  process from the second reference picture              │
│                                                  3805   │
└─────────────────────────────────────────────────────────┘
                            ↓
┌─────────────────────────────────────────────────────────┐
│  Determining, by the decoder, whether the second        │
│  predictor sample is out-of-boundary (OOB), and in      │
│  response to determining the second predictor sample    │
│  is OOB, replacing, by the decoder, the second          │
│  predictor sample that is OOB with an alternative       │
│  predictor sample                                3806   │
└─────────────────────────────────────────────────────────┘
                            ↓
┌─────────────────────────────────────────────────────────┐
│  Generating the final prediction sample by averaging    │
│  sample values of the first predictor sample and the    │
│  second predictor sample                         3807   │
└─────────────────────────────────────────────────────────┘
```

FIG. 38

Deriving, by a decoder, a first reference picture for a current coding block  4001

Deriving, by the decoder, a first predictor sample based on a motion vector associated with the first reference picture using a motion compensation process from the first reference picture  4002

Determining, by the decoder, whether the first predictor sample is out-of-boundary (OOB), and in response to determining the first predictor sample is OOB, replacing, by the decoder, the first predictor sample that is OOB with an alternative predictor sample  4003

FIG. 40

Deriving, by an encoder, a first reference picture for a current coding block  4101

Deriving, by the encoder, a first predictor sample based on a motion vector associated with the first reference picture using a motion compensation process from the first reference picture  4102

Determining, by the encoder, whether the first predictor sample is out-of-boundary (OOB), and in response to determining the first predictor sample is OOB, replacing, by the decoder, the first predictor sample that is OOB with an alternative predictor sample  4103

FIG. 41

MOTION COMPENSATION CONSIDERING OUT-OF-BOUNDARY CONDITIONS IN VIDEO CODING

CROSS-REFERENCE TO RELATED APPLICATION

This application is a continuation of International Application No. PCT/US2023/011077, filed on Jan. 18, 2023, which claims priority to Provisional Applications No. 63/300,631, filed on Jan. 18, 2022, all of which are incorporated herein by reference in their entireties for all purposes.

TECHNICAL FIELD

This disclosure is related to video coding and compression. More specifically, this disclosure relates to methods and apparatus for inter prediction in video coding.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. For example, video coding standards include Versatile Video Coding (VVC), Joint Exploration test Model (JEM), High-Efficiency Video Coding (HEVC/H.265), Advanced Video Coding (AVC/H.264), Moving Picture Expert Group (MPEG) coding, or the like. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

SUMMARY

Examples of the present disclosure provide methods and apparatus for inter prediction in video coding.

According to a first aspect of the present disclosure, a method for decoding a bi-prediction coding block is provided. The method may include: deriving, by a decoder, a first reference picture for a current coding block; deriving, by the decoder, a first predictor sample based on a motion vector associated with the first reference picture using a motion compensation process from the first reference picture; determining, by the decoder, whether the first predictor sample is out-of-boundary (OOB), and in response to determining the first predictor sample is OOB, replacing, by the decoder, the first predictor sample that is OOB with a first alternative predictor sample; deriving, by the decoder, a second reference picture for the current coding block; deriving, by the decoder, a second predictor sample based on a motion vector associated with the second reference picture using a motion compensation process from the second reference picture; determining, by the decoder, whether the second predictor sample is out-of-boundary (OOB), and in response to determining the second predictor sample is OOB, replacing, by the decoder, the second predictor sample that is OOB with a second alternative predictor sample; and generating a final prediction sample by averaging sample values of the first predictor sample and the second predictor sample.

According to a second aspect of the present disclosure, a method for coding a bi-prediction coding block is provided. The method may include: deriving, by an encoder, a first reference picture for a current coding block; deriving, by the encoder, a first predictor sample based on a motion vector associated with the first reference picture using a motion compensation process from the first reference picture; determining, by the encoder, whether the first predictor sample is out-of-boundary (OOB); and in response to determining the first predictor sample is OOB, replacing, by the encoder, the predictor sample that is OOB with a first alternative predictor sample; deriving, by the encoder, a second reference picture for the current coding block; deriving, by the encoder, a second predictor sample based on a motion vector associated with the second reference picture using a motion compensation process from the second reference picture; determining, by the encoder, whether the second predictor sample is out-of-boundary (OOB); and in response to determining the second predictor sample is OOB, replacing, by the decoder, the second predictor sample that is OOB with a second alternative predictor sample; and generating a final prediction sample by averaging sample values of the first predictor sample and the second predictor sample.

According to a third aspect of the present disclosure, a method for decoding a uni-prediction coding block is provided. The method may include: deriving, by a decoder, a first reference picture for the current coding block; deriving, by the decoder, a predictor sample based on a motion vector associated with the first reference picture using a motion compensation process from the first reference picture; determining, by the decoder, whether the predictor sample is out-of-boundary (OOB); and in response to determining the predictor sample is OOB, replacing, by the decoder, the predictor sample that is OOB with an alternative predictor sample.

According to a fourth aspect of the present disclosure, a method for coding a uni-prediction coding block is provided. The method may include: deriving, by an encoder, a first reference picture for the current coding block; deriving, by the encoder, a predictor sample based on a motion vector associated with the first reference picture using a motion compensation process from the first reference picture; determining, by the encoder, whether the predictor sample is out-of-boundary (OOB); and in response to determining the predictor sample is OOB, replacing, by the encoder, the predictor sample that is OOB with an alternative predictor sample.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 38 is a flow chart showing a method for decoding a bi-prediction coding block in accordance with some implementations of the present disclosure.

FIG. 40 is a flow chart showing a method for decoding a uni-prediction coding block in accordance with some implementations of the present disclosure.

FIG. 41 is a flow chart showing a method for coding a uni-prediction coding block in accordance with some implementations of the present disclosure.

DETAILED DESCRIPTION

Figure 1:
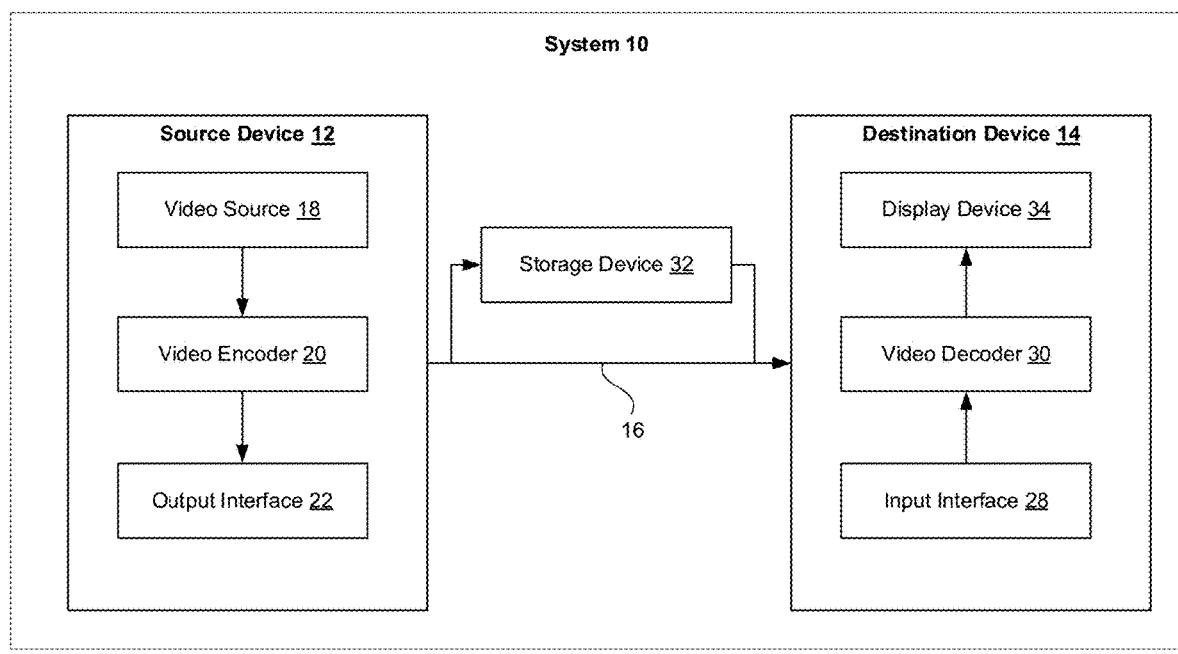
FIG. 1 is a block diagram illustrating an exemplary system for encoding and decoding video blocks in accordance with some implementations of the present disclosure.

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc., may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

Various video coding techniques may be used to compress video data. Video coding is performed according to one or more video coding standards. For example, nowadays, some well-known video coding standards include Versatile Video Coding (VVC), High Efficiency Video Coding (HEVC, also known as H.265 or MPEG-H Part 2) and Advanced Video Coding (AVC, also known as H.264 or MPEG-4 Part 10), which are jointly developed by ISO/IEC MPEG and ITU-T VECG. AOMedia Video 1 (AV1) was developed by Alliance for Open Media (AOM) as a successor to its preceding standard VP9. Audio Video Coding (AVS), which refers to digital audio and digital video compression standard, is another video compression standard series developed by the Audio and Video Coding Standard Workgroup of China. Most of the existing video coding standards are built upon the famous hybrid video coding framework i.e., using block-based prediction methods (e.g., inter-prediction, intra-prediction) to reduce redundancy present in video images or sequences and using transform coding to compact the energy of the prediction errors. An important goal of video coding techniques is to compress video data into a form that uses a lower bit rate while avoiding or minimizing degradations to video quality.

The first generation AVS standard includes Chinese national standard "Information Technology, Advanced Audio Video Coding, Part 2: Video" (known as AVS1) and "Information Technology, Advanced Audio Video Coding Part 16: Radio Television Video" (known as AVS+). It can offer around 50% bit-rate saving at the same perceptual quality compared to MPEG-2 standard. The AVS1 standard video part was promulgated as the Chinese national standard in February 2006. The second generation AVS standard includes the series of Chinese national standard "Information Technology, Efficient Multimedia Coding" (knows as AVS2), which is mainly targeted at the transmission of extra HD TV programs. The coding efficiency of the AVS2 is double of that of the AVS+. On May 2016, the AVS2 was issued as the Chinese national standard. Meanwhile, the AVS2 standard video part was submitted by Institute of Electrical and Electronics Engineers (IEEE) as one international standard for applications. The AVS3 standard is one new generation video coding standard for UHD video application aiming at surpassing the coding efficiency of the latest international standard HEVC. In March 2019, at the 68-th AVS meeting, the AVS3-P2 baseline was finished, which provides approximately 30% bit-rate savings over the HEVC standard. Currently, there is one reference software, called high performance model (HPM), is maintained by the AVS group to demonstrate a reference implementation of the AVS3 standard.

FIG. 1 is a block diagram illustrating an exemplary system 10 for encoding and decoding video blocks in parallel in accordance with some implementations of the present disclosure. As shown in FIG. 1, the system 10 includes a source device 12 that generates and encodes video data to be decoded at a later time by a destination device 14. The source device 12 and the destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may comprise any type of communication medium or device capable of moving the encoded video data from the source device 12 to the destination device 14. In one example, the link 16 may comprise a communication medium to enable the source device 12 to transmit the encoded video data directly to the destination device 14 in real time. The encoded video data may be modulated according to a communication standard, such as a wireless communication protocol, and transmitted to the destination device 14. The communication medium may comprise any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may hold the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or a combination of both that is suitable for accessing encoded video data stored on a file server. The transmission of the encoded video data from the storage device 32 may be a streaming transmission, a download transmission, or a combination of both.

As shown in FIG. 1, the source device 12 includes a video source 18, a video encoder 20 and the output interface 22. The video source 18 may include a source such as a video capturing device, e.g., a video camera, a video archive containing previously captured video, a video feeding interface to receive video from a video content provider, and/or a computer graphics system for generating computer graphics data as the source video, or a combination of such sources. As one example, if the video source 18 is a video camera of a security surveillance system, the source device 12 and the destination device 14 may form camera phones or video phones. However, the implementations described in the present application may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which may be an integrated display device and an external display device that is configured to communicate with the destination device 14. The display device 34 displays the decoded video data to a user, and may comprise any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present application is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

Figure 2:
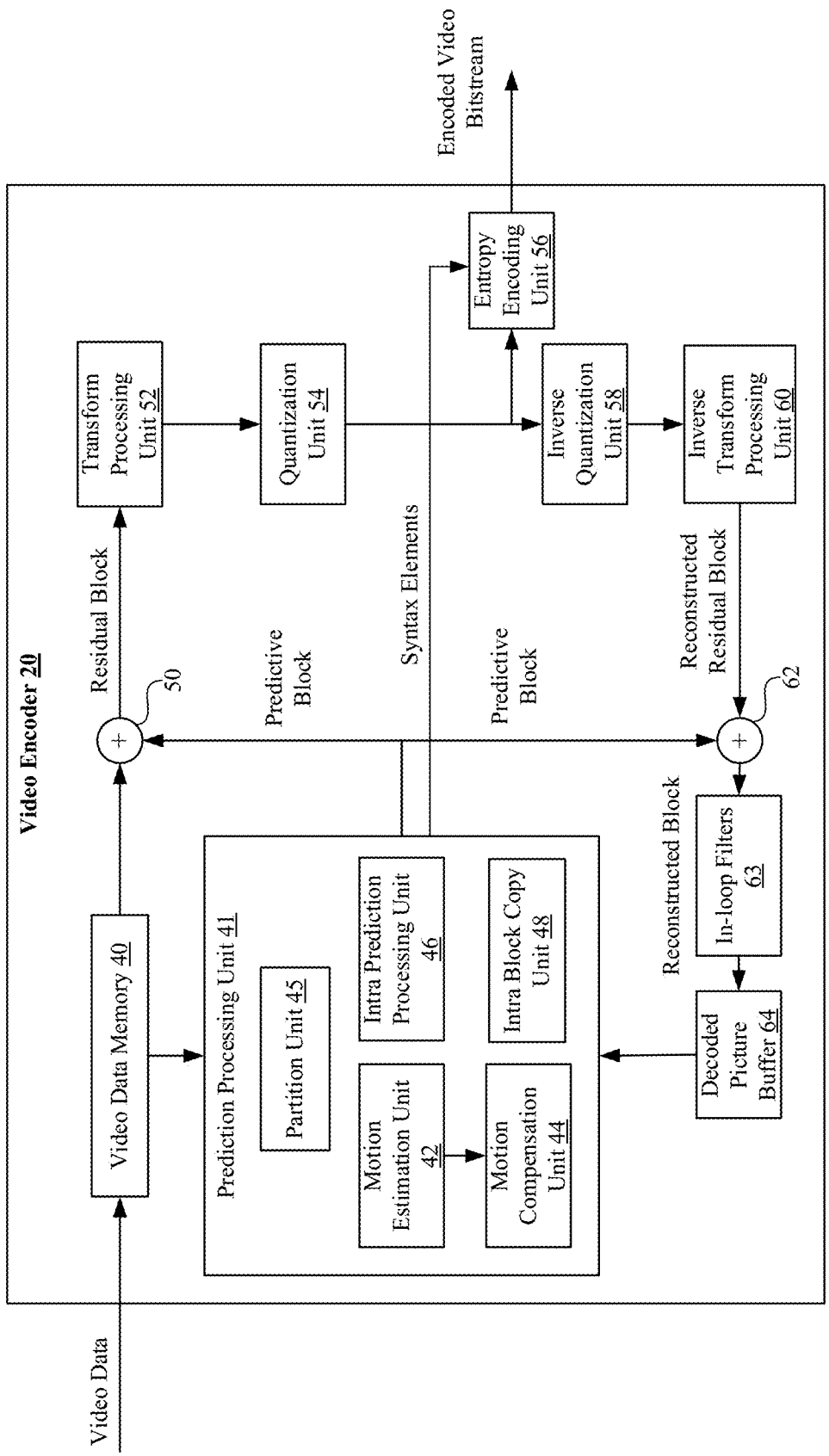
FIG. 2 is a block diagram illustrating an exemplary video encoder in accordance with some implementations of the present disclosure.

FIG. 2 is a block diagram illustrating an exemplary video encoder 20 in accordance with some implementations described in the present application. The video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence. It should be noted that the term "frame" may be used as synonyms for the term "image" or "picture" in the field of video coding.

As shown in FIG. 2, the video encoder 20 includes a video data memory 40, a prediction processing unit 41, a Decoded Picture Buffer (DPB) 64, a summer 50, a transform processing unit 52, a quantization unit 54, and an entropy encoding unit 56. The prediction processing unit 41 further includes a motion estimation unit 42, a motion compensation unit 44, a partition unit 45, an intra prediction processing unit 46, and an intra Block Copy (BC) unit 48. In some implementations, the video encoder 20 also includes an inverse quantization unit 58, an inverse transform processing unit 60, and a summer 62 for video block reconstruction. An in-loop filter 63, such as a deblocking filter, may be positioned between the summer 62 and the DPB 64 to filter block boundaries to remove blockiness artifacts from reconstructed video. Another in-loop filter, such as Sample Adaptive Offset (SAO) filter and/or Adaptive in-Loop Filter (ALF), may also be used in addition to the deblocking filter to filter an output of the summer 62. In some examples, the in-loop filters may be omitted, and the decoded video block may be directly provided by the summer 62 to the DPB 64. The video encoder 20 may take the form of a fixed or programmable hardware unit or may be divided among one or more of the illustrated fixed or programmable hardware units.

The video data memory 40 may store video data to be encoded by the components of the video encoder 20. The video data in the video data memory 40 may be obtained, for example, from the video source 18 as shown in FIG. 1. The DPB 64 is a buffer that stores reference video data (for example, reference frames or pictures) for use in encoding video data by the video encoder 20 (e.g., in intra or inter predictive coding modes). The video data memory 40 and the DPB 64 may be formed by any of a variety of memory devices. In various examples, the video data memory 40 may be on-chip with other components of the video encoder 20, or off-chip relative to those components.

As shown in FIG. 2, after receiving the video data, the partition unit 45 within the prediction processing unit 41 partitions the video data into video blocks. This partitioning may also include partitioning a video frame into slices, tiles (for example, sets of video blocks), or other larger Coding Units (CUs) according to predefined splitting structures such as a Quad-Tree (QT) structure associated with the video data. The video frame is or may be regarded as a two-dimensional array or matrix of samples with sample values. A sample in the array may also be referred to as a pixel or a pel. A number of samples in horizontal and vertical directions (or axes) of the array or picture define a size and/or a resolution of the video frame. The video frame may be divided into multiple video blocks by, for example, using QT partitioning. The video block again is or may be regarded as a two-dimensional array or matrix of samples with sample values, although of smaller dimension than the video frame. A number of samples in horizontal and vertical directions (or axes) of the video block define a size of the video block. The video block may further be partitioned into one or more block partitions or sub-blocks (which may form again blocks) by, for example, iteratively using QT partitioning, Binary-Tree (BT) partitioning or Triple-Tree (TT) partitioning or any combination thereof. It should be noted that the term "block" or "video block" as used herein may be a portion, in particular a rectangular (square or non-square) portion, of a frame or a picture. With reference, for example, to HEVC and VVC, the block or video block may be or correspond to a Coding Tree Unit (CTU), a CU, a Prediction Unit (PU) or a Transform Unit (TU) and/or may be or correspond to a corresponding block, e.g., a Coding Tree Block (CTB), a Coding Block (CB), a Prediction Block (PB) or a Transform Block (TB) and/or to a sub-block.

The prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). The prediction processing unit 41 may provide the resulting intra or inter prediction coded block to the summer 50 to generate a residual block and to the summer 62 to reconstruct the encoded block for use as part of a reference frame subsequently. The prediction processing unit 41 also provides syntax elements, such as motion vectors, intra-mode indicators, partition information, and other such syntax information, to the entropy encoding unit 56.

In order to select an appropriate intra predictive coding mode for the current video block, the intra prediction processing unit 46 within the prediction processing unit 41 may perform intra predictive coding of the current video block relative to one or more neighbor blocks in the same frame as the current block to be coded to provide spatial prediction. The motion estimation unit 42 and the motion compensation unit 44 within the prediction processing unit 41 perform inter predictive coding of the current video block relative to one or more predictive blocks in one or more reference frames to provide temporal prediction. The video encoder 20 may perform multiple coding passes, e.g., to select an appropriate coding mode for each block of video data.

In some implementations, the motion estimation unit 42 determines the inter prediction mode for a current video frame by generating a motion vector, which indicates the displacement of a video block within the current video frame relative to a predictive block within a reference video frame, according to a predetermined pattern within a sequence of video frames. Motion estimation, performed by the motion estimation unit 42, is the process of generating motion vectors, which estimate motion for video blocks. A motion vector, for example, may indicate the displacement of a video block within a current video frame or picture relative to a predictive block within a reference frame relative to the current block being coded within the current frame. The predetermined pattern may designate video frames in the sequence as P frames or B frames. The intra BC unit 48 may determine vectors, e.g., block vectors, for intra BC coding in a manner similar to the determination of motion vectors by the motion estimation unit 42 for inter prediction, or may utilize the motion estimation unit 42 to determine the block vector.

A predictive block for the video block may be or may correspond to a block or a reference block of a reference frame that is deemed as closely matching the video block to be coded in terms of pixel difference, which may be determined by Sum of Absolute Difference (SAD), Sum of Square Difference (SSD), or other difference metrics. In some implementations, the video encoder 20 may calculate values for sub-integer pixel positions of reference frames stored in the DPB 64. For example, the video encoder 20 may interpolate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision.

The motion estimation unit 42 calculates a motion vector for a video block in an inter prediction coded frame by comparing the position of the video block to the position of a predictive block of a reference frame selected from a first reference frame list (List 0) or a second reference frame list (List 1), each of which identifies one or more reference frames stored in the DPB 64. The motion estimation unit 42 sends the calculated motion vector to the motion compensation unit 44 and then to the entropy encoding unit 56.

Motion compensation, performed by the motion compensation unit 44, may involve fetching or generating the predictive block based on the motion vector determined by the motion estimation unit 42. Upon receiving the motion vector for the current video block, the motion compensation unit 44 may locate a predictive block to which the motion vector points in one of the reference frame lists, retrieve the predictive block from the DPB 64, and forward the predictive block to the summer 50. The summer 50 then forms a residual video block of pixel difference values by subtracting pixel values of the predictive block provided by the motion compensation unit 44 from the pixel values of the current video block being coded. The pixel difference values forming the residual video block may include luma or chroma difference components or both. The motion compensation unit 44 may also generate syntax elements associated with the video blocks of a video frame for use by the video decoder 30 in decoding the video blocks of the video frame. The syntax elements may include, for example, syntax elements defining the motion vector used to identify the predictive block, any flags indicating the prediction mode, or any other syntax information described herein. Note that the motion estimation unit 42 and the motion compensation unit 44 may be highly integrated, but are illustrated separately for conceptual purposes.

In some implementations, the intra BC unit 48 may generate vectors and fetch predictive blocks in a manner similar to that described above in connection with the motion estimation unit 42 and the motion compensation unit 44, but with the predictive blocks being in the same frame as the current block being coded and with the vectors being referred to as block vectors as opposed to motion vectors. In particular, the intra BC unit 48 may determine an intra-prediction mode to use to encode a current block. In some examples, the intra BC unit 48 may encode a current block using various intra-prediction modes, e.g., during separate encoding passes, and test their performance through rate-distortion analysis. Next, the intra BC unit 48 may select, among the various tested intra-prediction modes, an appropriate intra-prediction mode to use and generate an intra-mode indicator accordingly. For example, the intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, the intra BC unit 48 may use the motion estimation unit 42 and the motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by SAD, SSD, or other difference metrics, and identification of the predictive block may include calculation of values for sub-integer pixel positions.

Whether the predictive block is from the same frame according to intra prediction, or a different frame according to inter prediction, the video encoder 20 may form a residual video block by subtracting pixel values of the predictive block from the pixel values of the current video block being coded, forming pixel difference values. The pixel difference values forming the residual video block may include both luma and chroma component differences.

The intra prediction processing unit 46 may intra-predict a current video block, as an alternative to the inter-prediction performed by the motion estimation unit 42 and the motion compensation unit 44, or the intra block copy prediction performed by the intra BC unit 48, as described above. In particular, the intra prediction processing unit 46 may determine an intra prediction mode to use to encode a current block. To do so, the intra prediction processing unit 46 may encode a current block using various intra prediction modes, e.g., during separate encoding passes, and the intra prediction processing unit 46 (or a mode selection unit, in some examples) may select an appropriate intra prediction mode to use from the tested intra prediction modes. The intra prediction processing unit 46 may provide information indicative of the selected intra-prediction mode for the block to the entropy encoding unit 56. The entropy encoding unit 56 may encode the information indicating the selected intra-prediction mode in the bitstream.

After the prediction processing unit 41 determines the predictive block for the current video block via either inter prediction or intra prediction, the summer 50 forms a residual video block by subtracting the predictive block from the current video block. The residual video data in the residual block may be included in one or more TUs and is provided to the transform processing unit 52. The transform processing unit 52 transforms the residual video data into residual transform coefficients using a transform, such as a Discrete Cosine Transform (DCT) or a conceptually similar transform.

The transform processing unit 52 may send the resulting transform coefficients to the quantization unit 54. The quantization unit 54 quantizes the transform coefficients to further reduce the bit rate. The quantization process may also reduce the bit depth associated with some or all of the coefficients. The degree of quantization may be modified by adjusting a quantization parameter. In some examples, the quantization unit 54 may then perform a scan of a matrix including the quantized transform coefficients. Alternatively, the entropy encoding unit 56 may perform the scan.

Following quantization, the entropy encoding unit 56 entropy encodes the quantized transform coefficients into a video bitstream using, e.g., Context Adaptive Variable Length Coding (CAVLC), Context Adaptive Binary Arithmetic Coding (CABAC), Syntax-based context-adaptive Binary Arithmetic Coding (SBAC), Probability Interval Partitioning Entropy (PIPE) coding or another entropy encoding methodology or technique. The encoded bitstream may then be transmitted to the video decoder 30 as shown in FIG. 1, or archived in the storage device 32 as shown in FIG. 1 for later transmission to or retrieval by the video decoder 30. The entropy encoding unit 56 may also entropy encode the motion vectors and the other syntax elements for the current video frame being coded.

The inverse quantization unit 58 and the inverse transform processing unit 60 apply inverse quantization and inverse transformation, respectively, to reconstruct the residual video block in the pixel domain for generating a reference block for prediction of other video blocks. As noted above, the motion compensation unit 44 may generate a motion compensated predictive block from one or more reference blocks of the frames stored in the DPB 64. The motion compensation unit 44 may also apply one or more interpolation filters to the predictive block to calculate sub-integer pixel values for use in motion estimation.

The summer 62 adds the reconstructed residual block to the motion compensated predictive block produced by the motion compensation unit 44 to produce a reference block for storage in the DPB 64. The reference block may then be used by the intra BC unit 48, the motion estimation unit 42 and the motion compensation unit 44 as a predictive block to inter predict another video block in a subsequent video frame.

Figure 3:
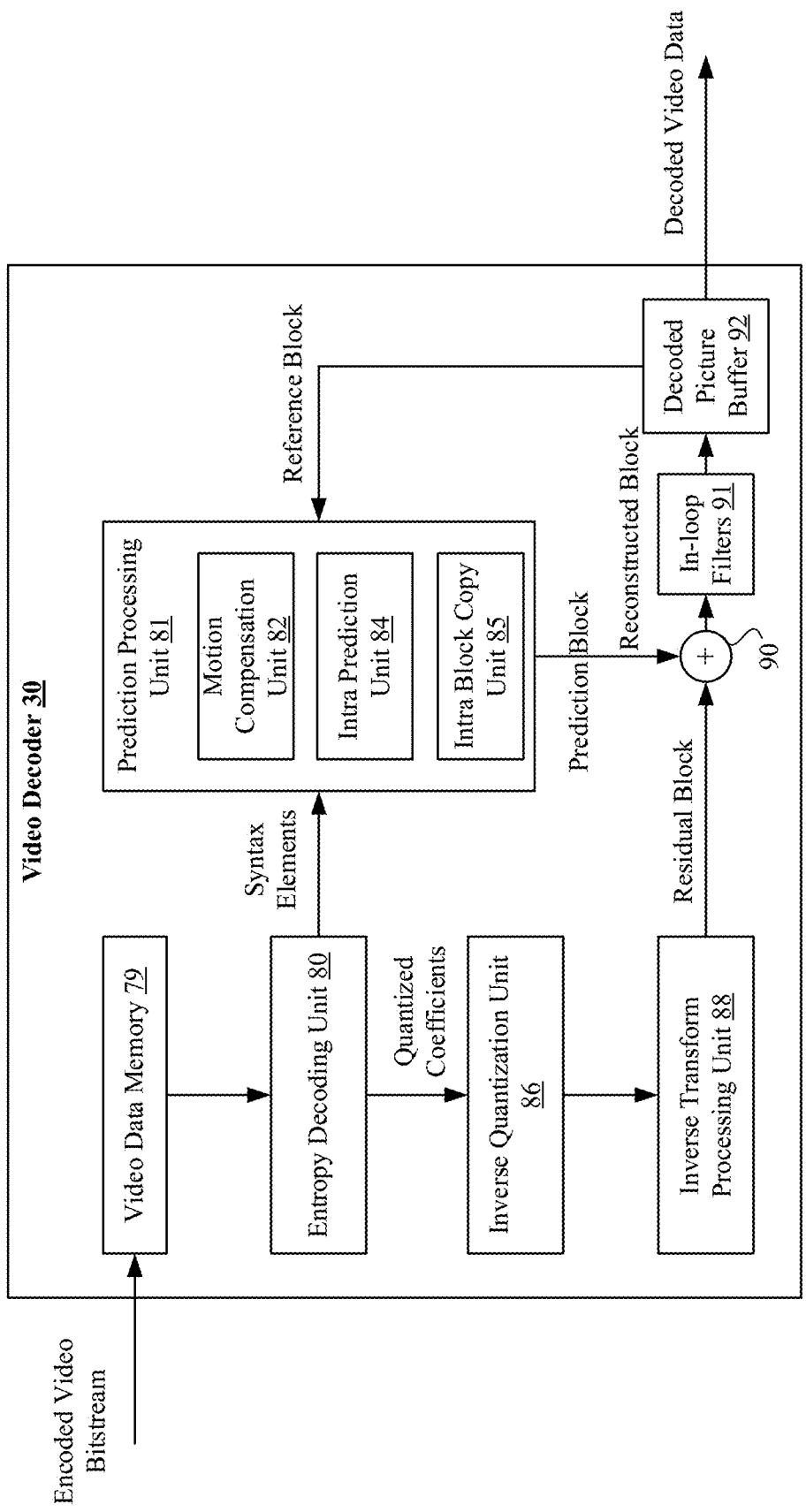
FIG. 3 is a block diagram illustrating an exemplary video decoder in accordance with some implementations of the present disclosure.

FIG. 3 is a block diagram illustrating an exemplary video decoder 30 in accordance with some implementations of the present application. The video decoder 30 includes a video data memory 79, an entropy decoding unit 80, a prediction processing unit 81, an inverse quantization unit 86, an inverse transform processing unit 88, a summer 90, and a DPB 92. The prediction processing unit 81 further includes a motion compensation unit 82, an intra prediction unit 84, and an intra BC unit 85. The video decoder 30 may perform a decoding process generally reciprocal to the encoding process described above with respect to the video encoder 20 in connection with FIG. 2. For example, the motion compensation unit 82 may generate prediction data based on motion vectors received from the entropy decoding unit 80, while the intra-prediction unit 84 may generate prediction data based on intra-prediction mode indicators received from the entropy decoding unit 80.

In some examples, a unit of the video decoder 30 may be tasked to perform the implementations of the present application. Also, in some examples, the implementations of the present disclosure may be divided among one or more of the units of the video decoder 30. For example, the intra BC unit 85 may perform the implementations of the present application, alone, or in combination with other units of the video decoder 30, such as the motion compensation unit 82, the intra prediction unit 84, and the entropy decoding unit 80. In some examples, the video decoder 30 may not include the intra BC unit 85 and the functionality of intra BC unit 85 may be performed by other components of the prediction processing unit 81, such as the motion compensation unit 82.

The video data memory 79 may store video data, such as an encoded video bitstream, to be decoded by the other components of the video decoder 30. The video data stored in the video data memory 79 may be obtained, for example, from the storage device 32, from a local video source, such as a camera, via wired or wireless network communication of video data, or by accessing physical data storage media (e.g., a flash drive or hard disk). The video data memory 79 may include a Coded Picture Buffer (CPB) that stores encoded video data from an encoded video bitstream. The DPB 92 of the video decoder 30 stores reference video data for use in decoding video data by the video decoder 30 (e.g., in intra or inter predictive coding modes). The video data memory 79 and the DPB 92 may be formed by any of a variety of memory devices, such as dynamic random access memory (DRAM), including Synchronous DRAM (SDRAM), Magneto-resistive RAM (MRAM), Resistive RAM (RRAM), or other types of memory devices. For illustrative purpose, the video data memory 79 and the DPB 92 are depicted as two distinct components of the video decoder 30 in FIG. 3. But it will be apparent to one skilled in the art that the video data memory 79 and the DPB 92 may be provided by the same memory device or separate memory devices. In some examples, the video data memory 79 may be on-chip with other components of the video decoder 30, or off-chip relative to those components.

During the decoding process, the video decoder 30 receives an encoded video bitstream that represents video blocks of an encoded video frame and associated syntax elements. The video decoder 30 may receive the syntax elements at the video frame level and/or the video block level. The entropy decoding unit 80 of the video decoder 30 entropy decodes the bitstream to generate quantized coefficients, motion vectors or intra-prediction mode indicators, and other syntax elements. The entropy decoding unit 80 then forwards the motion vectors or intra-prediction mode indicators and other syntax elements to the prediction processing unit 81.

When the video frame is coded as an intra predictive coded (I) frame or for intra coded predictive blocks in other types of frames, the intra prediction unit 84 of the prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, the motion compensation unit 82 of the prediction processing unit 81 produces one or more predictive blocks for a video block of the current video frame based on the motion vectors and other syntax elements received from the entropy decoding unit 80. Each of the predictive blocks may be produced from a reference frame within one of the reference frame lists. The video decoder 30 may construct the reference frame lists, List 0 and List 1, using default construction techniques based on reference frames stored in the DPB 92.

In some examples, when the video block is coded according to the intra BC mode described herein, the intra BC unit 85 of the prediction processing unit 81 produces predictive blocks for the current video block based on block vectors and other syntax elements received from the entropy decoding unit 80. The predictive blocks may be within a reconstructed region of the same picture as the current video block defined by the video encoder 20.

The motion compensation unit 82 and/or the intra BC unit 85 determines prediction information for a video block of the current video frame by parsing the motion vectors and other syntax elements, and then uses the prediction information to produce the predictive blocks for the current video block being decoded. For example, the motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, the intra BC unit 85 may use some of the received syntax elements, e.g., a flag, to determine that the current video block was predicted using the intra BC mode, construction information of which video blocks of the frame are within the reconstructed region and should be stored in the DPB 92, block vectors for each intra BC predicted video block of the frame, intra BC prediction status for each intra BC predicted video block of the frame, and other information to decode the video blocks in the current video frame.

The motion compensation unit 82 may also perform interpolation using the interpolation filters as used by the video encoder 20 during encoding of the video blocks to calculate interpolated values for sub-integer pixels of reference blocks. In this case, the motion compensation unit 82 may determine the interpolation filters used by the video encoder 20 from the received syntax elements and use the interpolation filters to produce predictive blocks.

The inverse quantization unit 86 inverse quantizes the quantized transform coefficients provided in the bitstream and entropy decoded by the entropy decoding unit 80 using the same quantization parameter calculated by the video encoder 20 for each video block in the video frame to determine a degree of quantization. The inverse transform processing unit 88 applies an inverse transform, e.g., an inverse DCT, an inverse integer transform, or a conceptually similar inverse transform process, to the transform coefficients in order to reconstruct the residual blocks in the pixel domain.

After the motion compensation unit 82 or the intra BC unit 85 generates the predictive block for the current video block based on the vectors and other syntax elements, the summer 90 reconstructs decoded video block for the current video block by summing the residual block from the inverse transform processing unit 88 and a corresponding predictive block generated by the motion compensation unit 82 and the intra BC unit 85. An in-loop filter 91 such as deblocking filter, SAO filter and/or ALF may be positioned between the summer 90 and the DPB 92 to further process the decoded video block. In some examples, the in-loop filter 91 may be omitted, and the decoded video block may be directly provided by the summer 90 to the DPB 92. The decoded video blocks in a given frame are then stored in the DPB 92, which stores reference frames used for subsequent motion compensation of next video blocks. The DPB 92, or a memory device separate from the DPB 92, may also store decoded video for later presentation on a display device, such as the display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
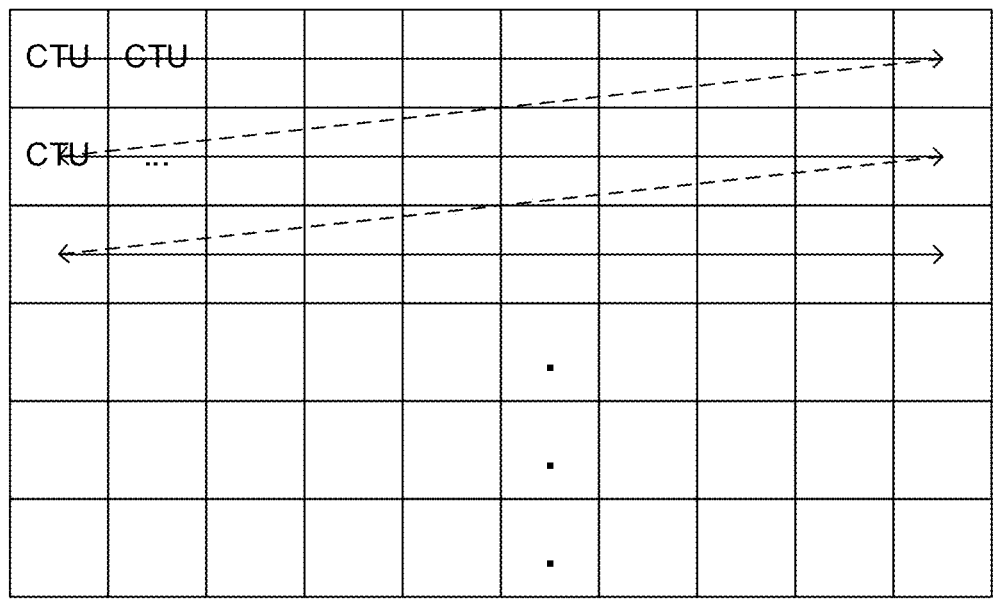
FIGS. 4A through 4E are block diagrams illustrating how a frame is recursively partitioned into multiple video blocks of different sizes and shapes in accordance with some implementations of the present disclosure.
Figure 4B:
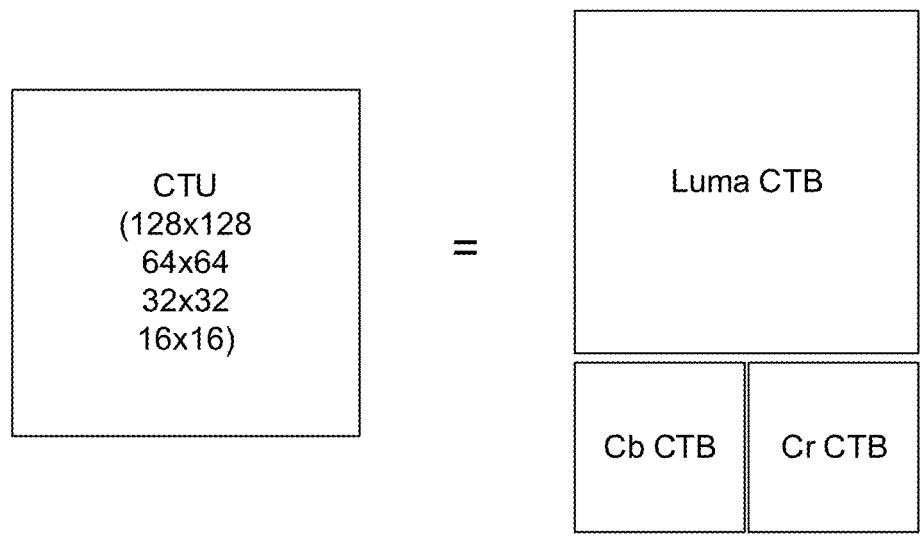

As shown in FIG. 4A, the video encoder 20 (or more specifically the partition unit 45) generates an encoded representation of a frame by first partitioning the frame into a set of CTUs. A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one CTB of luma samples, two corresponding coding tree blocks of chroma samples, and syntax elements used to code the samples of the coding tree blocks. The syntax elements describe properties of different types of units of a coded block of pixels and how the video sequence may be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
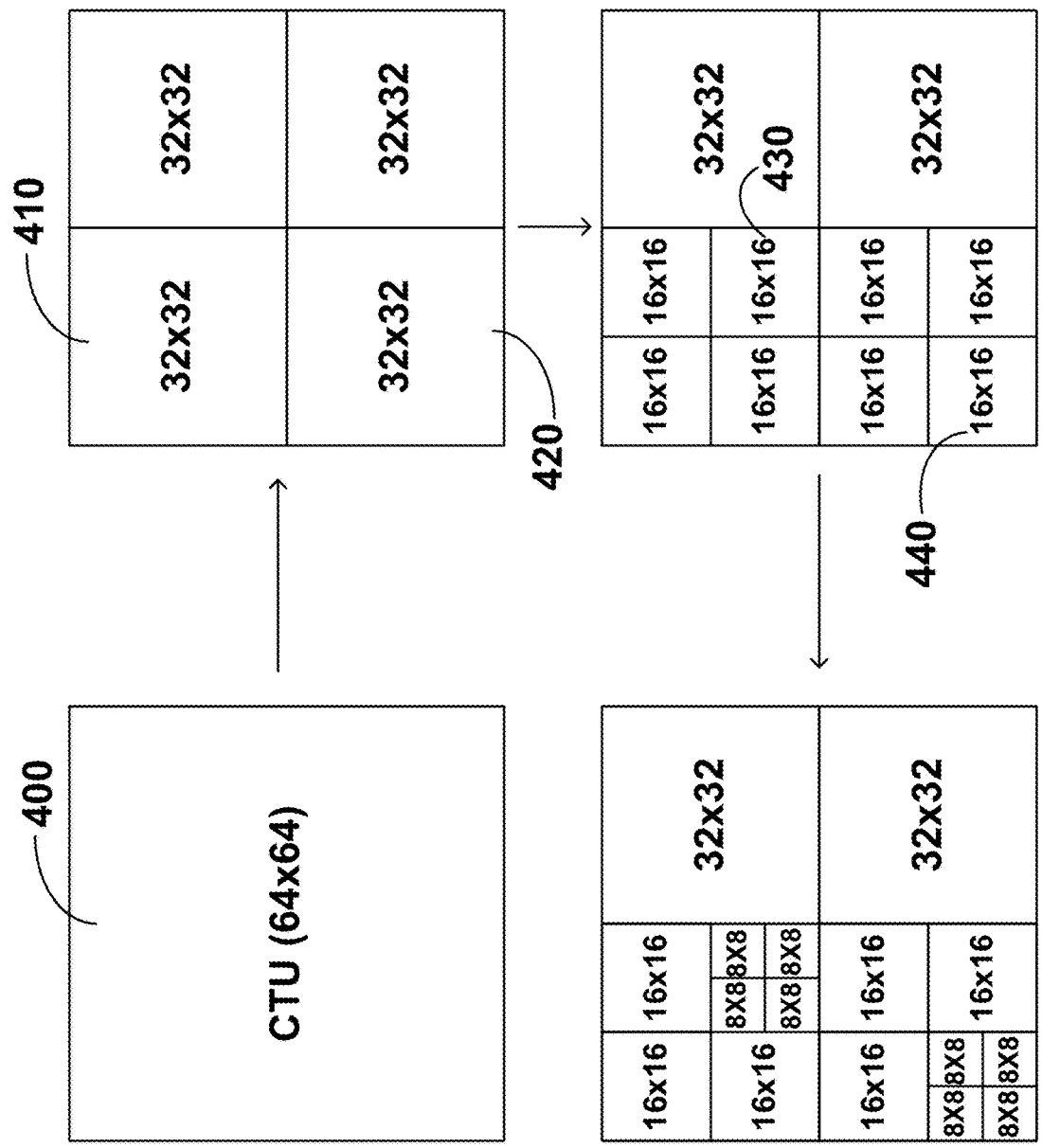
Figure 4D:
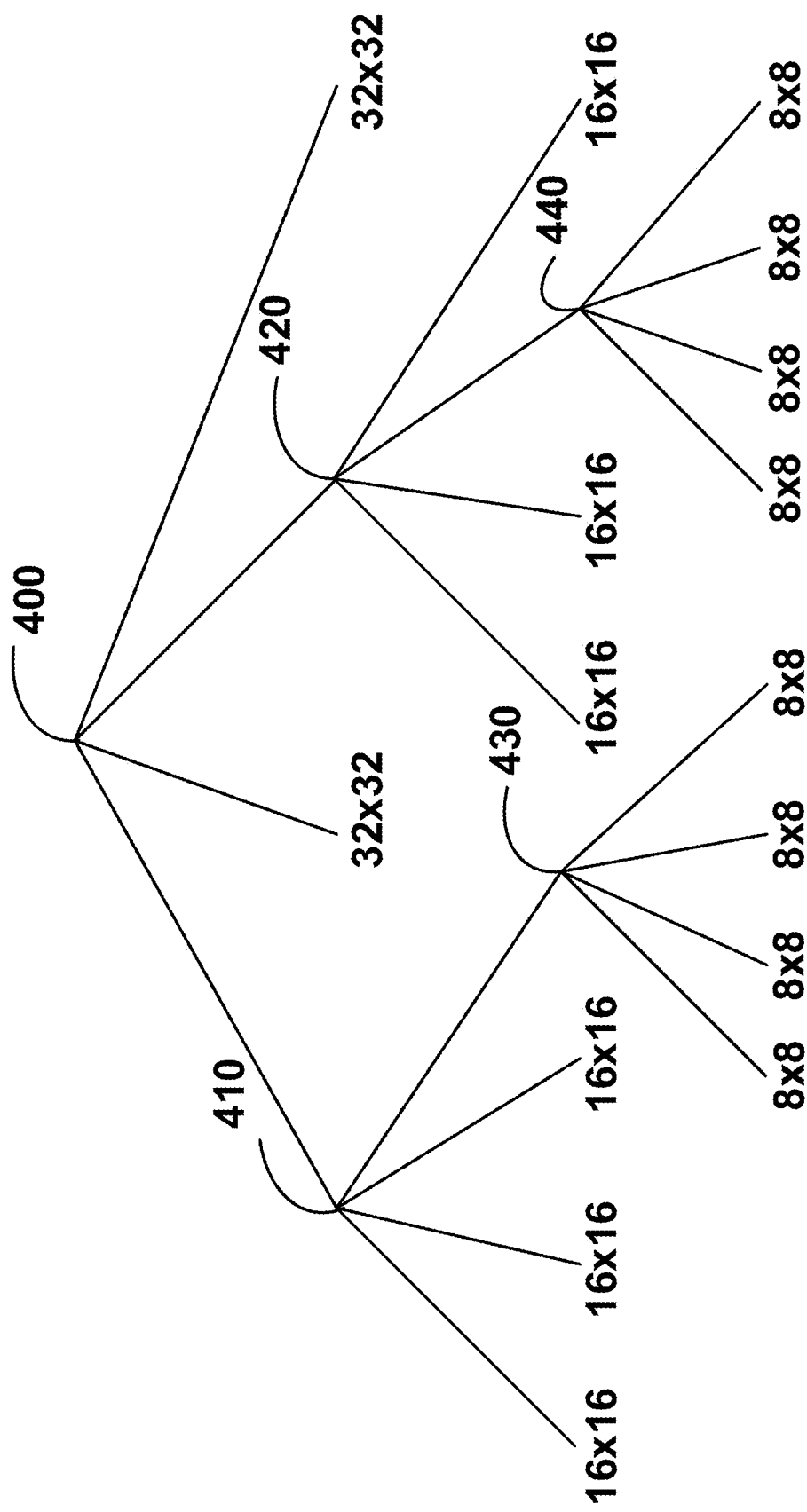
Figure 4E:
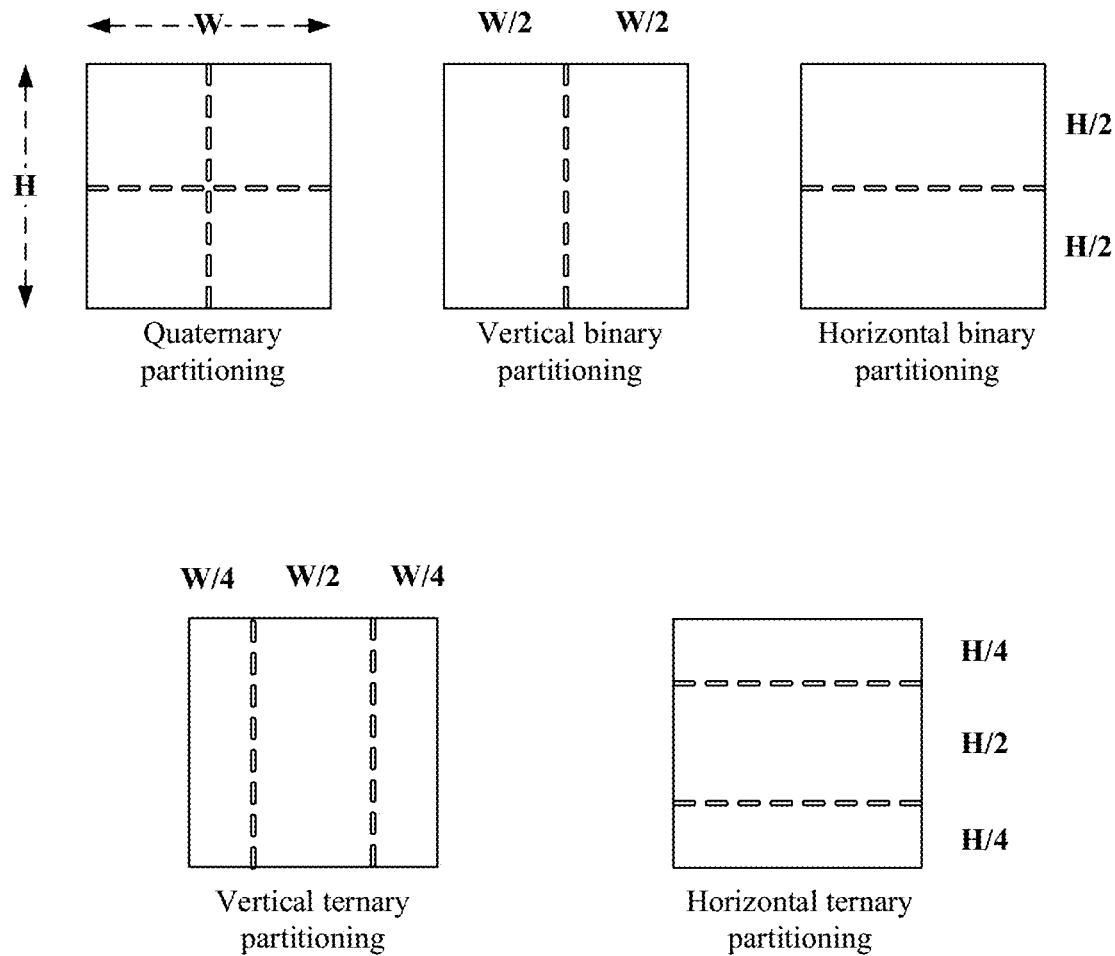

To achieve a better performance, the video encoder 20 may recursively perform tree partitioning such as binary-tree partitioning, ternary-tree partitioning, quad-tree partitioning or a combination thereof on the coding tree blocks of the CTU and divide the CTU into smaller CUs. As depicted in FIG. 4C, the 64×64 CTU 400 is first divided into four smaller CUs, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a CB of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU may be split into CUs to adapt to varying local characteristics based on quad/ternary/binary-tree partitions. In the multi-type tree structure, one CTU is partitioned by a quad-tree structure and each quad-tree leaf CU may be further partitioned by a binary and ternary tree structure. As shown in FIG. 4E, there are five possible partitioning types of a coding block having a width W and a height H, i.e., quaternary partitioning, horizontal binary partitioning, vertical binary partitioning, horizontal ternary partitioning, and vertical ternary partitioning.

In some implementations, the video encoder 20 may further partition a coding block of a CU into one or more M×N PBs. A PB is a rectangular (square or non-square) block of samples on which the same prediction, inter or intra, is applied. A PU of a CU may comprise a PB of luma samples, two corresponding PBs of chroma samples, and syntax elements used to predict the PBs. In monochrome pictures or pictures having three separate color planes, a PU may comprise a single PB and syntax structures used to predict the PB. The video encoder 20 may generate predictive luma, Cb, and Cr blocks for luma, Cb, and Cr PBs of each PU of the CU.

The video encoder 20 may use intra prediction or inter prediction to generate the predictive blocks for a PU. If the video encoder 20 uses intra prediction to generate the predictive blocks of a PU, the video encoder 20 may generate the predictive blocks of the PU based on decoded samples of the frame associated with the PU. If the video encoder 20 uses inter prediction to generate the predictive blocks of a PU, the video encoder 20 may generate the predictive blocks of the PU based on decoded samples of one or more frames other than the frame associated with the PU.

After the video encoder 20 generates predictive luma, Cb, and Cr blocks for one or more PUs of a CU, the video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, the video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, the video encoder 20 may use quad-tree partitioning to decompose the luma, Cb, and Cr residual blocks of a CU into one or more luma, Cb, and Cr transform blocks respectively. A transform block is a rectangular (square or non-square) block of samples on which the same transform is applied. A TU of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

The video encoder 20 may apply one or more transforms to a luma transform block of a TU to generate a luma coefficient block for the TU. A coefficient block may be a two-dimensional array of transform coefficients. A transform coefficient may be a scalar quantity. The video encoder 20 may apply one or more transforms to a Cb transform block of a TU to generate a Cb coefficient block for the TU. The video encoder 20 may apply one or more transforms to a Cr transform block of a TU to generate a Cr coefficient block for the TU.

After generating a coefficient block (e.g., a luma coefficient block, a Cb coefficient block or a Cr coefficient block), the video encoder 20 may quantize the coefficient block. Quantization generally refers to a process in which transform coefficients are quantized to possibly reduce the amount of data used to represent the transform coefficients, providing further compression. After the video encoder 20 quantizes a coefficient block, the video encoder 20 may entropy encode syntax elements indicating the quantized transform coefficients. For example, the video encoder 20 may perform CABAC on the syntax elements indicating the quantized transform coefficients. Finally, the video encoder 20 may output a bitstream that includes a sequence of bits that forms a representation of coded frames and associated data, which is either saved in the storage device 32 or transmitted to the destination device 14.

After receiving a bitstream generated by the video encoder 20, the video decoder 30 may parse the bitstream to obtain syntax elements from the bitstream. The video decoder 30 may reconstruct the frames of the video data based at least in part on the syntax elements obtained from the bitstream. The process of reconstructing the video data is generally reciprocal to the encoding process performed by the video encoder 20. For example, the video decoder 30 may perform inverse transforms on the coefficient blocks associated with TUs of a current CU to reconstruct residual blocks associated with the TUs of the current CU. The video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that IBC could be regarded as either intra-frame prediction or a third mode. Between the two modes, inter-frame prediction contributes more to the coding efficiency than intra-frame prediction because of the use of motion vectors for predicting a current video block from a reference video block.

But with the ever-improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally co-located CUs as an approximation of the motion information (e.g., motion vector) of a current CU by exploring their spatial and temporal correlation, which is also referred to as "Motion Vector Predictor (MVP)" of the current CU.

Instead of encoding, into the video bitstream, an actual motion vector of the current CU determined by the motion estimation unit 42 as described above in connection with FIG. 2, the motion vector predictor of the current CU is subtracted from the actual motion vector of the current CU to produce a Motion Vector Difference (MVD) for the current CU. By doing so, there is no need to encode the motion vector determined by the motion estimation unit 42 for each CU of a frame into the video bitstream and the amount of data used for representing motion information in the video bitstream may be significantly decreased.

Like the process of choosing a predictive block in a reference frame during inter-frame prediction of a code block, a set of rules need to be adopted by both the video encoder 20 and the video decoder 30 for constructing a motion vector candidate list (also known as a "merge list") for a current CU using those potential candidate motion vectors associated with spatially neighboring CUs and/or temporally co-located CUs of the current CU and then selecting one member from the motion vector candidate list as a motion vector predictor for the current CU. By doing so, there is no need to transmit the motion vector candidate list itself from the video encoder 20 to the video decoder 30 and an index of the selected motion vector predictor within the motion vector candidate list is sufficient for the video encoder 20 and the video decoder 30 to use the same motion vector predictor within the motion vector candidate list for encoding and decoding the current CU.

For each inter-predicted CU, motion parameters consisting of motion vectors, reference picture indices and reference picture list usage index, and additional information needed for the new coding feature of VVC to be used for inter-predicted sample generation. The motion parameter can be signaled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighboring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list and reference picture list usage flag and other needed information are signaled explicitly per each CU.

Moreover, ITU-T VCEG (Q6/16) and ISO/IEC MPEG (JTC 1/SC 29/WG 11) are studying the potential need for standardization of future video coding technology with a compression capability that significantly exceeds that of the current VVC standard. Such future standardization action could either take the form of additional extension(s) of VVC or an entirely new standard. The groups are working together on this exploration activity in a joint collaboration effort known as the Joint Video Exploration Team (JVET) to evaluate compression technology designs proposed by their experts in this area. The first Exploration Experiments (EE) were established in JVET meeting during 6-15 Jan. 2021 and this exploration software model is named as Enhanced Compression Model (ECM) and ECM version2 (ECM2) is released on August 2021. The newly developed inter prediction schemes in ECM2 are elaborated in the following sections.

The following sections provide the details on those inter prediction methods specified in VVC and in the developing ECM model.

Extended Merge Prediction in VVC

In VVC, the merge candidate list is constructed by including the following five types of candidates in order:

1). Spatial MVP from spatial neighbour CUs
2). Temporal MVP from collocated CUs

3). History-based MVP from an FIFO table
4). Pairwise average MVP
5). Zero MVs.

The size of merge list is signalled in sequence parameter set header and the maximum allowed size of merge list is 6. For each CU code in merge mode, an index of best merge candidate is encoded using truncated unary binarization (TU). The first bin of the merge index is coded with context and bypass coding is used for other bins.

The derivation process of each category of merge candidates is provided in this session. As done in HEVC, VVC also supports parallel derivation of the merging candidate lists for all CUs within a certain size of area.

Spatial Candidate Derivation in VVC

Figure 5:
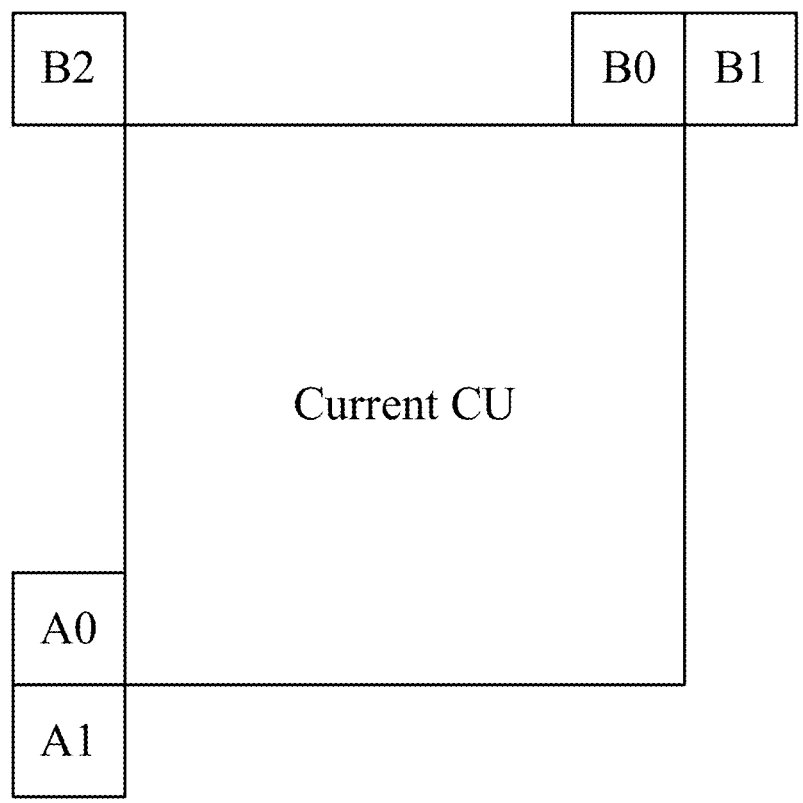
FIG. 5 illustrates examples of positions of spatial merger candidates in accordance with some implementations of the present disclosure.
Figure 6:
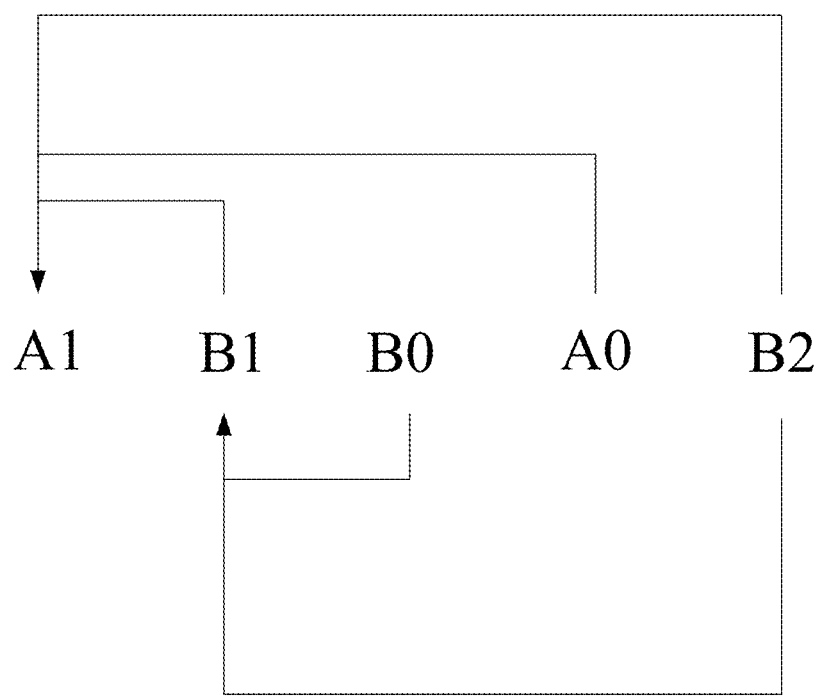
FIG. 6 illustrates examples of candidate pairs considered for redundancy check of spatial merge candidates in accordance with some implementations of the present disclosure.

The derivation of spatial merge candidates in VVC is same to that in HEVC except the positions of first two merge candidates are swapped. A maximum of four merge candidates are selected among candidates located in the positions depicted in FIG. 5. The order of derivation is $B_0$, $A_0$, $B_1$, $A_1$ and $B_2$. Position $B_2$ is considered only when one or more than one CUs of position $B_0$, $A_0$, $B_1$, $A_1$ are not available (e.g., because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead, only the pairs linked with an arrow in FIG. 6 are considered and a candidate is only added to the list if the corresponding candidate used for redundancy check has not the same motion information.

Temporal Candidate Derivation in VVC

Figure 7:
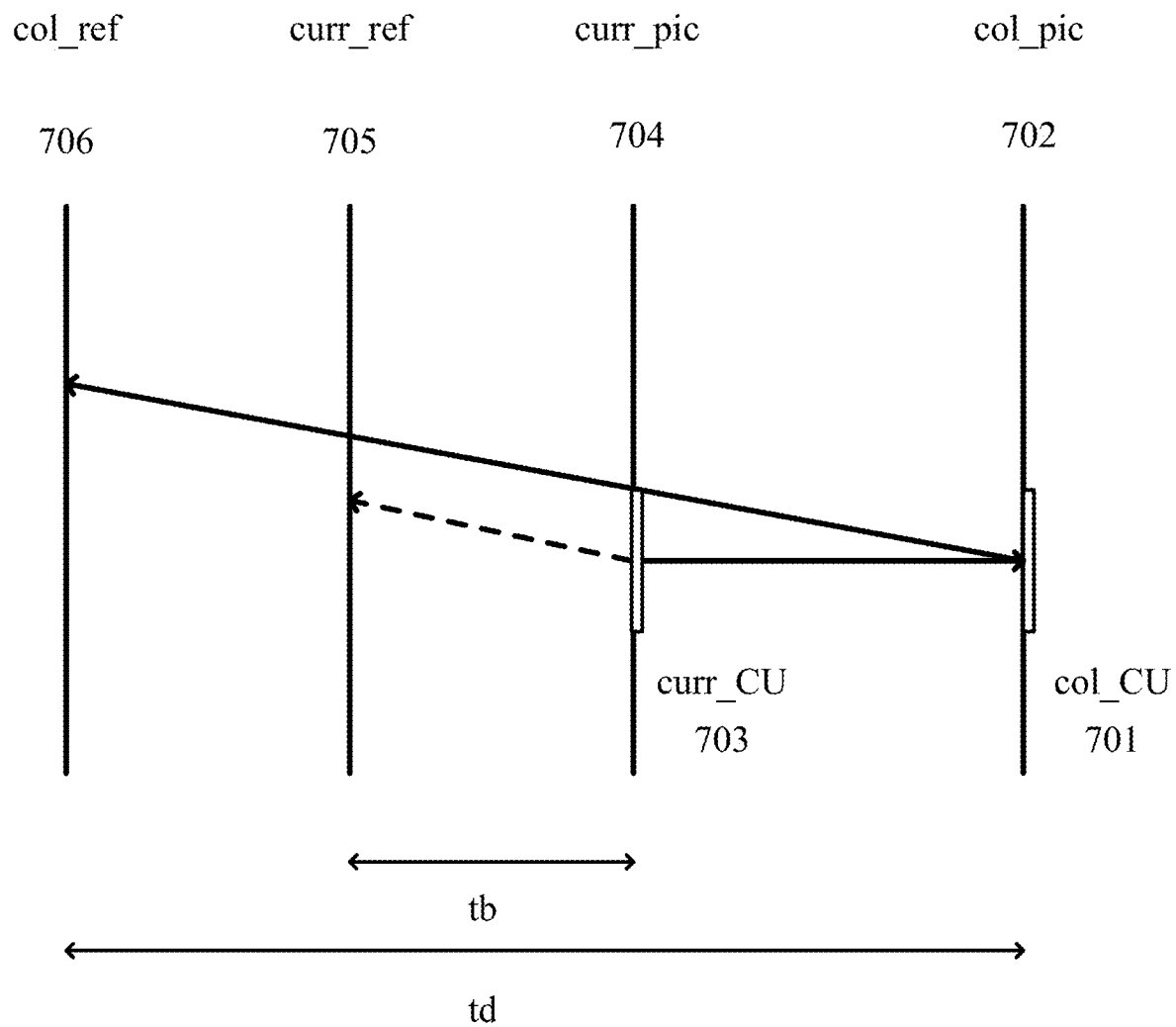
FIG. 7 illustrates an example motion vector scaling for temporal merge candidate in accordance with some implementations of the present disclosure.

In this step, only one candidate is added to the list. Particularly, in the derivation of this temporal merge candidate, a scaled motion vector is derived based on co-located CU belonging to the collocated reference picture. The reference picture list and the reference index to be used for derivation of the co-located CU is explicitly signaled in the slice header. The scaled motion vector for temporal merge candidate is obtained as illustrated by the dotted line in FIG. 7, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 8:
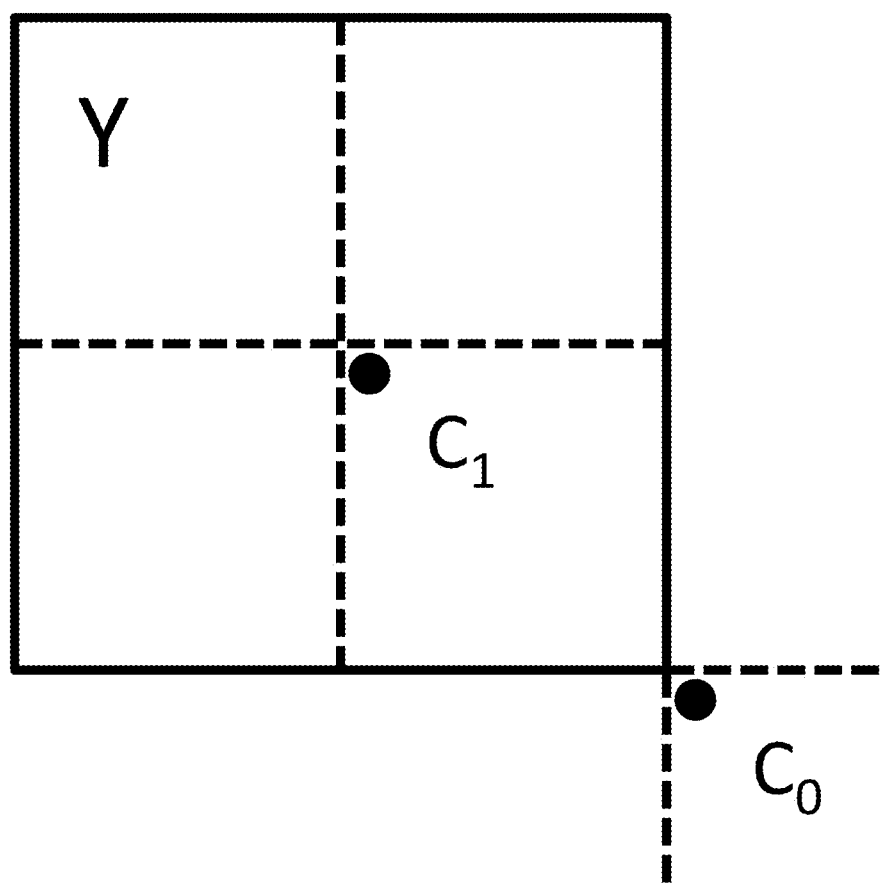
FIG. 8 illustrates candidate positions for temporal merge candidate in accordance with some implementations of the present disclosure.

The position for the temporal candidate is selected between candidates $C_0$ and $C_1$, as depicted in FIG. 8. If CU at position $C_0$ is not available, is intra coded, or is outside of the current row of CTUs, position $C_1$ is used. Otherwise, position $C_0$ is used in the derivation of the temporal merge candidate.

History-Based Merge Candidate Derivation in VVC

The history-based MVP (HMVP) merge candidates are added to merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

The HMVP table size S is set to be 6, which indicates up to 5 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward, and the identical HMVP is inserted to the last entry of the table.

HMVP candidates may be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:

1. The last two entries in the table are redundancy checked to A1 and B1 spatial candidates, respectively.

2. Once the total number of available merge candidates reaches the maximally allowed merge candidates minus 1, the merge candidate list construction process from HMVP is terminated.

Pair-Wise Average Merge Candidate Derivation in VVC

Pairwise average candidates are generated by averaging predefined pairs of candidates in the existing merge candidate list, using the first two merge candidates. The first merge candidate is defined as p0Cand and the second merge candidate can be defined as p1Cand, respectively. The averaged motion vectors are calculated according to the availability of the motion vector of p0Cand and p1Cand separately for each reference list. If both motion vectors are available in one list, these two motion vectors are averaged even when they point to different reference pictures, and its reference picture is set to the one of p0Cand; if only one motion vector is available, use the one directly; if no motion vector is available, keep this list invalid. Also, if the half-pel interpolation filter indices of p0Cand and p1Cand are different, it is set to 0.

When the merge list is not full after pair-wise average merge candidates are added, the zero MVPs are inserted in the end until the maximum merge candidate number is encountered.

High Precision ($\frac{1}{16}$ Pel) Motion Compensation and Motion Vector Storage in VVC VVC increases the MV precision to $\frac{1}{16}$ luma sample, to improve the prediction efficiency of slow-motion video. This higher motion accuracy is particularly helpful for video contents with locally varying and non-translational motion such as in case of affine mode. For fractional position samples generation of higher MV accuracy, HEVC's 8-tap luma interpolation filters and 4-tap chroma interpolation filters are extended to 16 phases for luma and 32 phases for chroma. This extended filter set is applied in MC process of inter coded CUs except the CUs in affine mode. For affine mode, a set of 6-tap luma interpolation filter with 16 phases is used for lower computational complexity as well as memory bandwidth saving.

In VVC, the highest precision of explicitly signalled motion vectors for non-affine CU is quarter-luma-sample. In some inter prediction modes such as the affine mode, motion vectors can be signalled at $\frac{1}{16}$-luma-sample precision. In all inter coded CU with implicitly inferred MVs, the MVs are derived at $\frac{1}{16}$-luma-sample precision and motion compensated prediction is performed at $\frac{1}{16}$-sample-precision. In terms of internal motion field storage, all motion vectors are stored at $\frac{1}{16}$-luma-sample precision.

For temporal motion field storage used by TMVP and SbTVMP, motion field compression is performed at 8×8 size granularity in contrast to the 16×16 size granularity in HEVC.

Merge Mode with MVD (MMVD) in VVC

In addition to merge mode, where the implicitly derived motion information is directly used for prediction samples generation of the current CU, the merge mode with motion vector differences (MMVD) is introduced in VVC. A MMVD flag is signalled right after sending a regular merge flag to specify whether MMVD mode is used for a CU.

In MMVD, after a merge candidate is selected, it is further refined by the signalled MVDs information. The further information includes a merge candidate flag, an index to specify motion magnitude, and an index for indication of motion direction. In MMVD mode, one for the first two candidates in the merge list is selected to be used as MV basis. The mmvd candidate flag is signalled to specify which one is used between the first and second merge candidates.

Figure 9A:
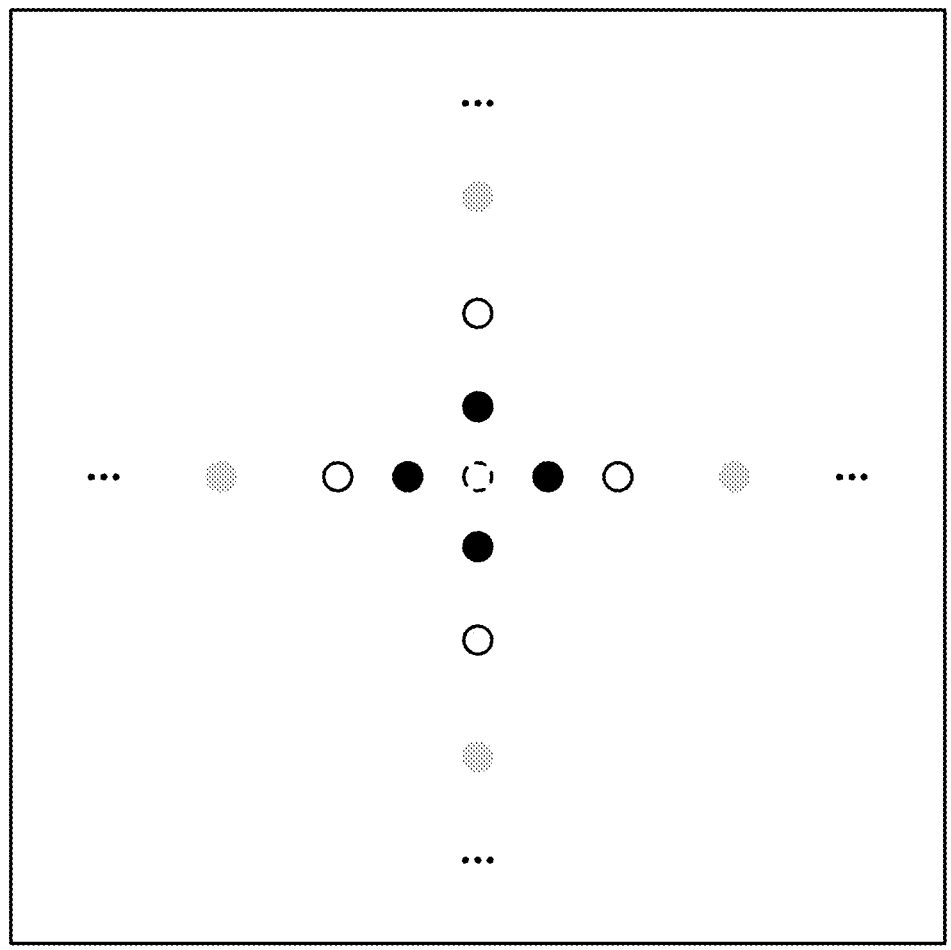
FIG. 9A illustrates an example of MMVD search point in accordance with some implementations of the present disclosure.
Figure 9B:
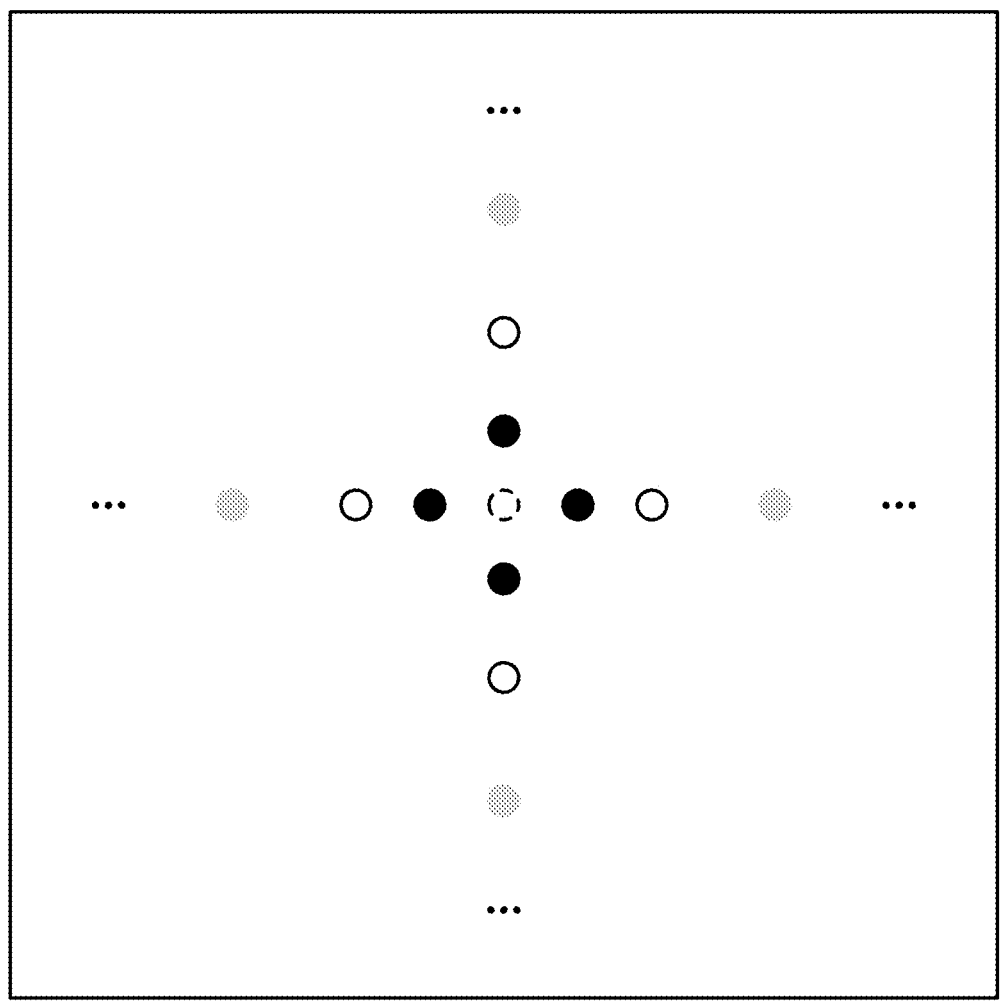
FIG. 9B illustrates an example of MMVD search point in accordance with some implementations of the present disclosure.

Distance index specifies motion magnitude information and indicate the pre-defined offset from the starting point. As shown in FIGS. 9A and 9B, an offset is added to either horizontal component or vertical component of starting MV. The relation of distance index and pre-defined offset is specified in Table 1.

TABLE 1

The relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

Direction index represents the direction of the MVD relative to the starting point. The direction index can represent of the four directions as shown in Table 2. It's noted that the meaning of MVD sign may be variant according to the information of starting MVs. When the starting MVs is an un-prediction MV or bi-prediction MVs with both lists point to the same side of the current picture (i.e., POCs of two references are both larger than the POC of the current picture, or are both smaller than the POC of the current picture), the sign in Table 2 specifies the sign of MV offset added to the starting MV. When the starting MVs is bi-prediction MVs with the two MVs point to the different sides of the current picture (i.e. the POC of one reference is larger than the POC of the current picture, and the POC of the other reference is smaller than the POC of the current picture), and the difference of POC in list 0 is greater than the one in list 1, the sign in Table 2 specifies the sign of MV offset added to the list0 MV component of starting MV and the sign for the list1 MV has opposite value. Otherwise, if the difference of POC in list 1 is greater than list 0, the sign in Table 2 specifies the sign of MV offset added to the list1 MV component of starting MV and the sign for the list0 MV has opposite value.

The MVD is scaled according to the difference of POCs in each direction. If the differences of POCs in both lists are the same, no scaling is needed. Otherwise, if the difference of POC in list 0 is larger than the one of list 1, the MVD for list 1 is scaled, by defining the POC difference of L0 as td and POC difference of L1 as tb, described in FIG. 7. If the POC difference of L1 is greater than L0, the MVD for list 0 is scaled in the same way. If the starting MV is uni-predicted, the MVD is added to the available MV.

TABLE 2

Sign of MV offset specified by direction index

| Direction IDX | 00 | 01 | 10 | 11 |
|---|---|---|---|---|
| x-axis | + | − | N/A | N/A |
| y-axis | N/A | N/A | + | − |

Symmetric MVD Coding in VVC

In VVC, besides the normal unidirectional prediction and bi-directional prediction mode MVD signalling, symmetric MVD mode for bi-predictional MVD signalling is applied. In the symmetric MVD mode, motion information including reference picture indices of both list-0 and list-1 and MVD of list-1 are not signaled but derived.

The decoding process of the symmetric MVD mode is as follows:

1. At slice level, variables BiDirPredFlag, RefIdxSymL0 and RefIdxSymL1 are derived as follows:

If mvd_l1_zero_flag is 1, BiDirPredFlag is set equal to 0.

Otherwise, if the nearest reference picture in list-0 and the nearest reference picture in list-1 form a forward and backward pair of reference pictures or a backward and forward pair of reference pictures, BiDirPredFlag is set to 1, and both list-0 and list-1 reference pictures are short-term reference pictures. Otherwise BiDirPredFlag is set to 0.

2. At CU level, a symmetrical mode flag indicating whether symmetrical mode is used or not is explicitly signaled if the CU is bi-prediction coded and BiDirPredFlag is equal to 1.

When the symmetrical mode flag is true, only mvp_l0_flag, mvp_l1_flag and MVD0 are explicitly signaled. The reference indices for list-0 and list-1 are set equal to the pair of reference pictures, respectively. MVD1 is set equal to (−MVD0). The final motion vectors are shown in below formula.

$$\begin{cases} (mvx_0, mvy_0) = (mvpx_0 + mvdx_0, mvpy_0 + mvdy_0) \\ (mvx_1, mvy_1) = (mvpx_1 + mvdx_0, mvpy_1 + mvdy_0) \end{cases} \quad (1)$$

In the encoder, symmetric MVD motion estimation starts with initial MV evaluation. A set of initial MV candidates comprising of the MV obtained from uni-prediction search, the MV obtained from bi-prediction search and the MVs from the AMVP list. The one with the lowest rate-distortion cost is chosen to be the initial MV for the symmetric MVD motion search.

Affine Motion Compensated Prediction in VVC

Figure 10A:
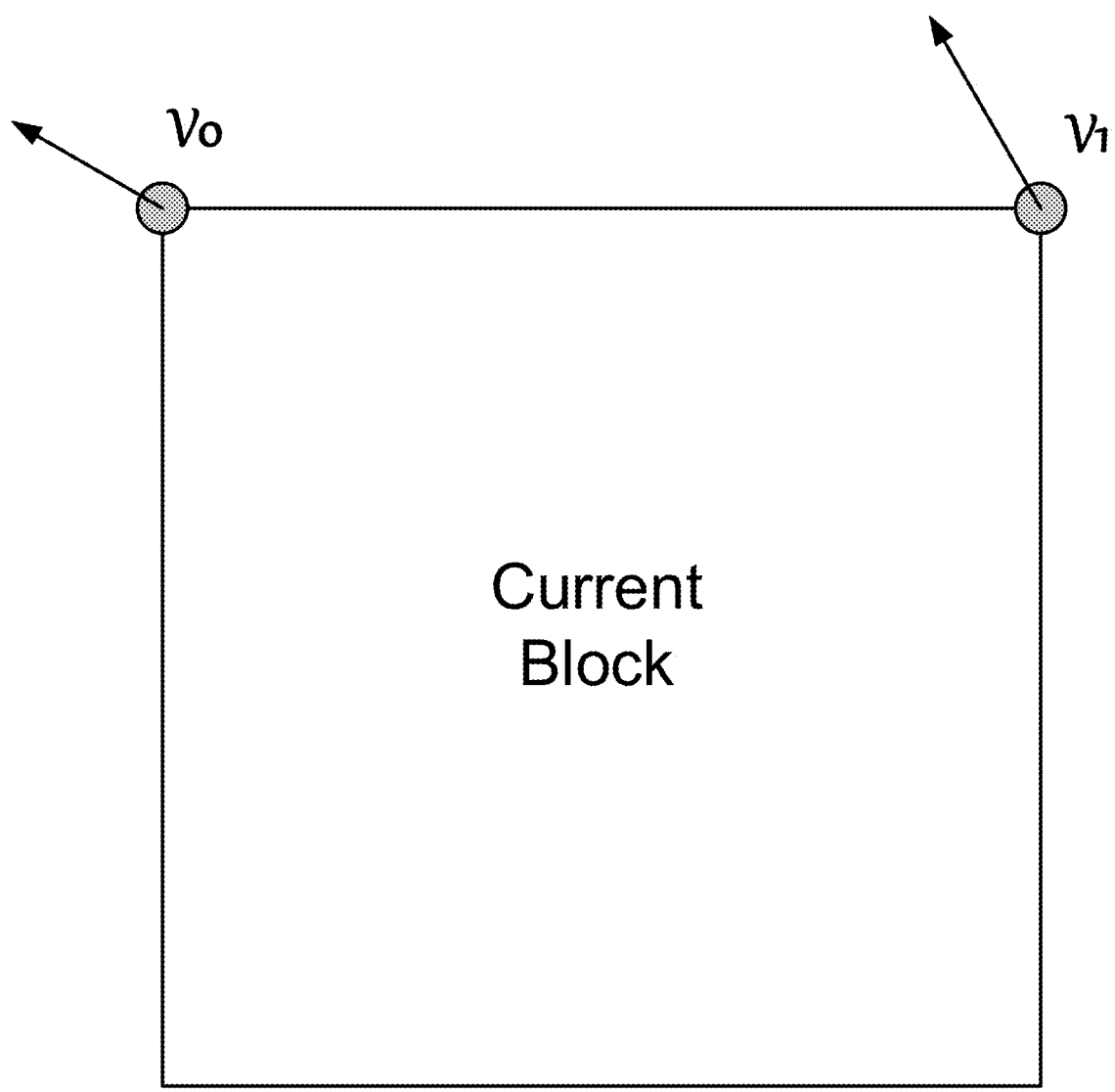
FIG. 10A illustrates an example of control point based affine motion model in accordance with some implementations of the present disclosure.
Figure 10B:
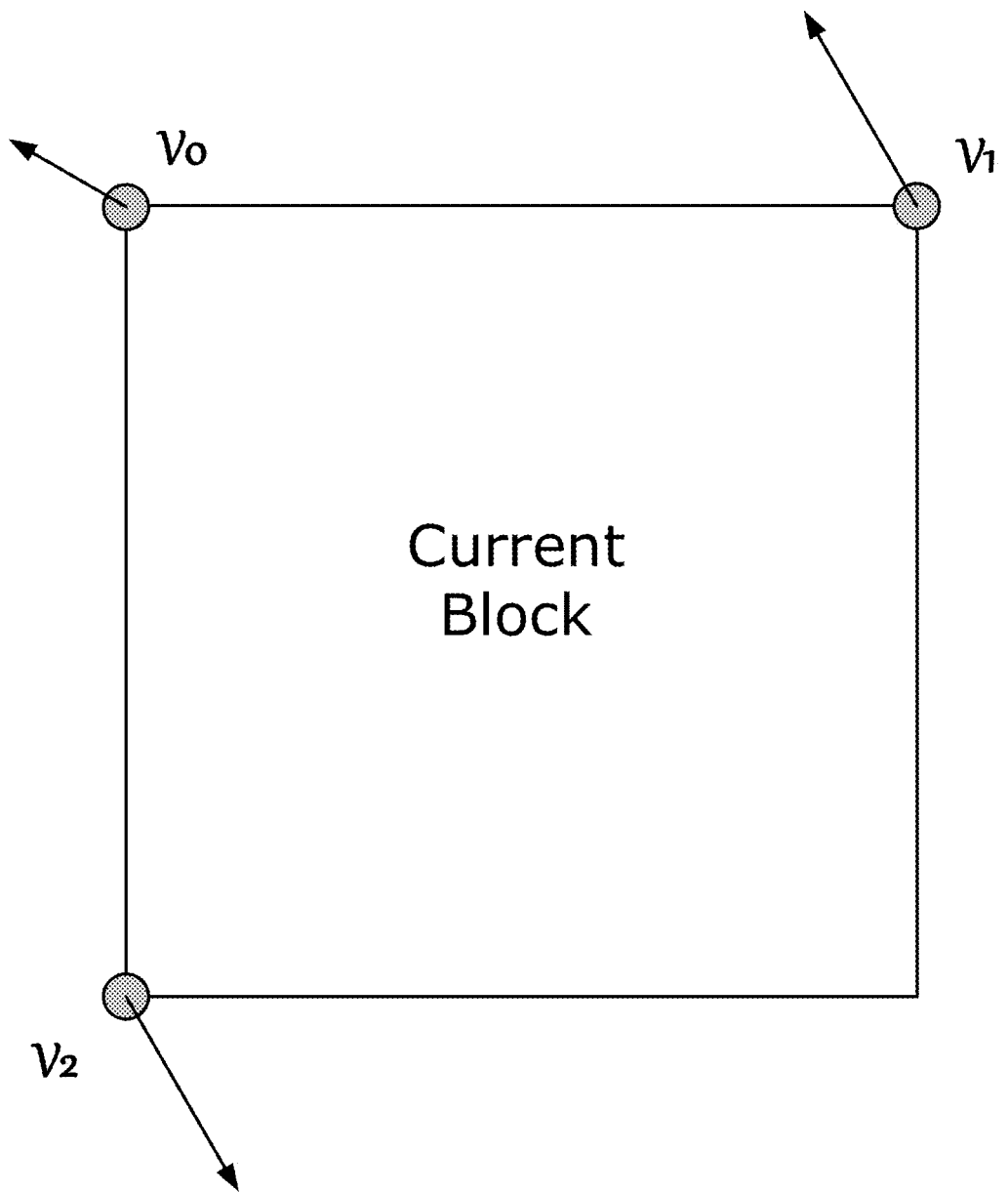
FIG. 10B illustrates an example of control point based affine motion model in accordance with some implementations of the present disclosure.

In HEVC, only translation motion model is applied for motion compensation prediction (MCP). While in the real world, there are many kinds of motion, e.g., zoom in/out, rotation, perspective motions and the other irregular motions. In VVC, a block-based affine transform motion compensation prediction is applied. As shown in FIGS. 10A and 10B, the affine motion field of the block is described by motion information of two control point (4-parameter) as shown in FIG. 10A or three control point motion vectors (6-parameter) as shown in FIG. 10B.

For 4-parameter affine motion model, motion vector at sample location (x, y) in a block is derived as:

$$\begin{cases} mv_x = \dfrac{mv_{1x} - mv_{0x}}{W} x + \dfrac{mv_{0y} - mv_{1y}}{W} y + mv_{0x} \\ mv_y = \dfrac{mv_{1y} - mv_{0y}}{W} x + \dfrac{mv_{1x} - mv_{0x}}{W} y + mv_{0y} \end{cases} \quad (2)$$

For 6-parameter affine motion model, motion vector at sample location (x, y) in a block is derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad (3)$$

Where ($mv_{0x}$, $mv_{0y}$) is motion vector of the top-left corner control point, ($mv_{1x}$, $mv_{1y}$) is motion vector of the top-right corner control point, and ($mv_{2x}$, $mv_{2y}$) is motion vector of the bottom-left corner control point.

Figure 11:
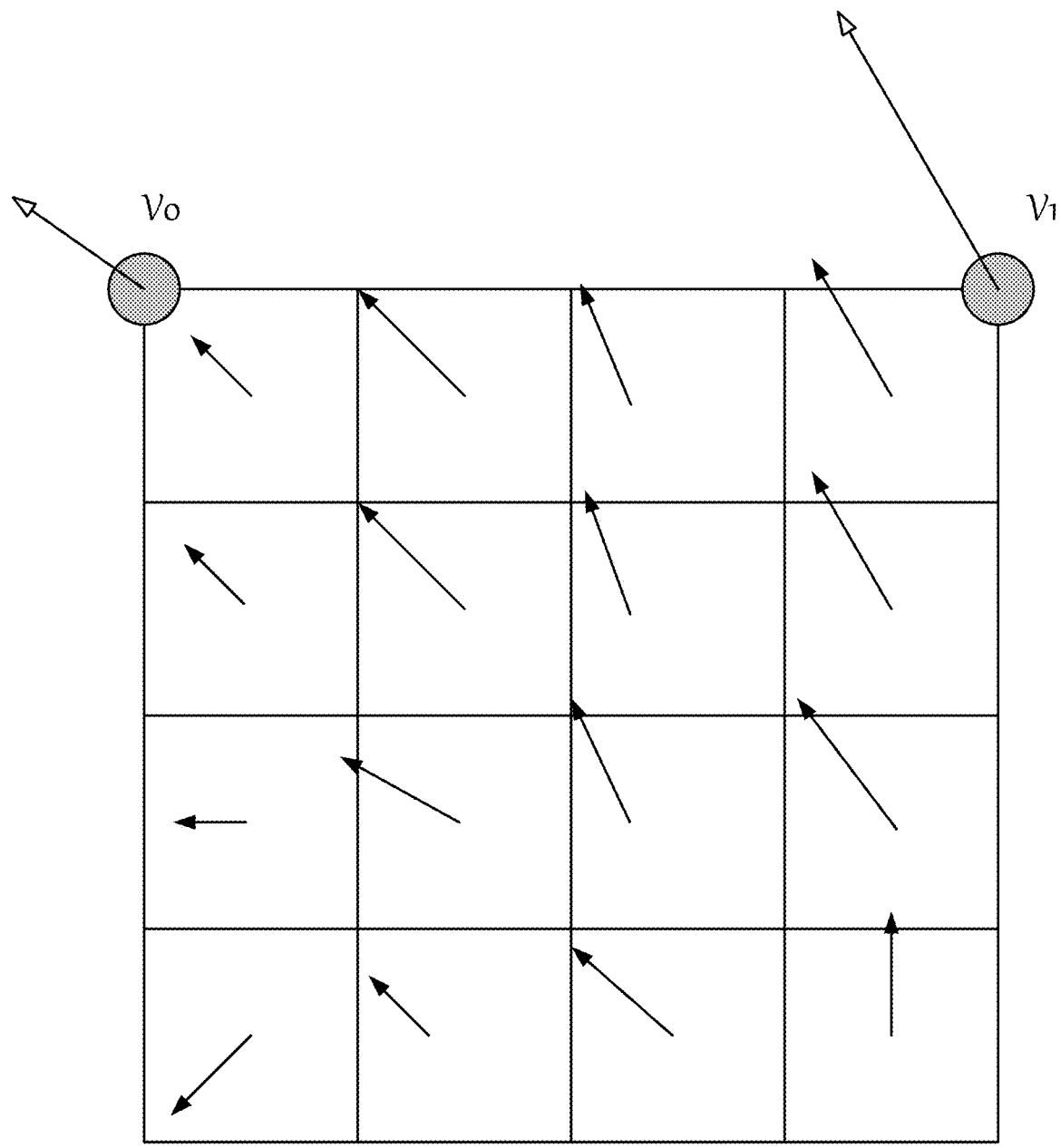
FIG. 11 illustrates an example of affine MVF per subblock in accordance with some implementations of the present disclosure.

In order to simplify the motion compensation prediction, block based affine transform prediction is applied. To derive motion vector of each 4×4 luma subblock, the motion vector of the center sample of each subblock, as shown in FIG. 11, is calculated according to above equations, and rounded to 1/16 fraction accuracy. Then the motion compensation interpolation filters are applied to generate the prediction of each subblock with derived motion vector. The subblock size of chroma-components is also set to be 4×4. The MV of a 4×4 chroma subblock is calculated as the average of the MVs of the top-left and bottom-right luma subblocks in the collocated 8×8 luma region.

As done for translational motion inter prediction, there are also two affine motion inter prediction modes: affine merge mode and affine AMVP mode.

Affine Merge Prediction

Figure 12:
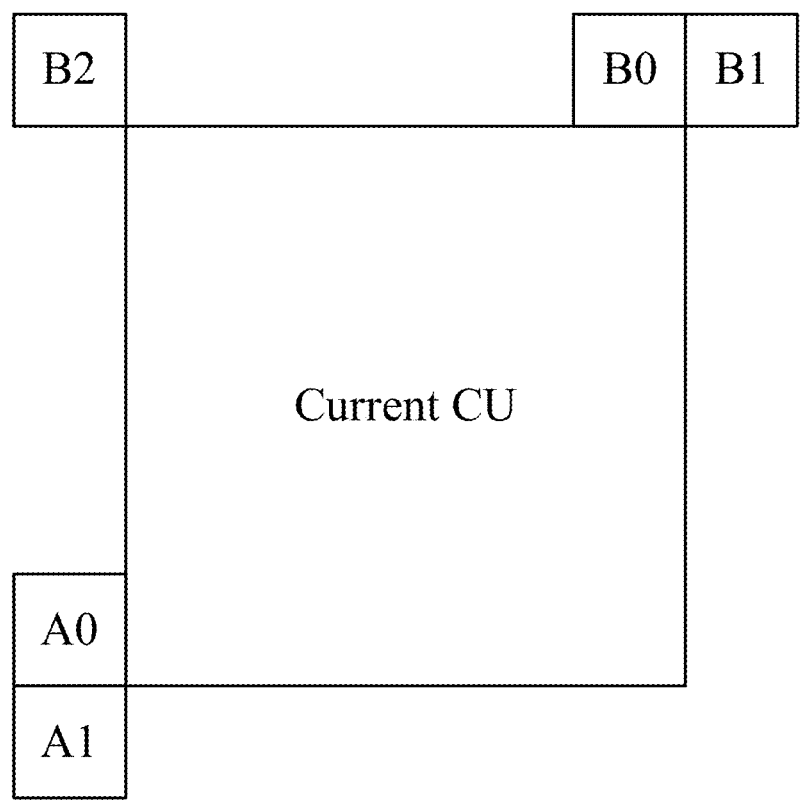
FIG. 12 illustrates locations of inherited affine motion predictors in accordance with some implementations of the present disclosure.

AF_MERGE mode can be applied for CUs with both width and height larger than or equal to 8. In this mode the CPMVs of the current CU is generated based on the motion information of the spatial neighboring CUs. There can be up to five CPMVP candidates and an index is signalled to indicate the one to be used for the current CU. The following three types of CPVM candidate are used to form the affine merge candidate list:

Inherited affine merge candidates that extrapolated from the CPMVs of the neighbour CUs
Constructed affine merge candidates CPMVPs that are derived using the translational MVs of the neighbour CUs
Zero MVs In VVC, there are maximum two inherited affine candidates, which are derived from affine motion model of the neighboring blocks, one from left neighboring CUs and one from above neighboring CUs. The candidate blocks are shown in FIG. 12. For the left predictor, the scan order is A0→A1, and for the above predictor, the scan order is B0→B1→B2. Only the first inherited candidate from each side is selected. No pruning check is performed between two inherited candidates. When a neighboring affine CU is identified, its control point motion vectors are used to derived the CPMVP candidate in the affine merge list of the current CU. If the neighbour left bottom block A is coded in affine mode, the motion vectors v_2, v_3 and v_4 of the top left corner, above right corner and left bottom corner of the CU which contains the block A are attained. When block A is coded with 4-parameter affine model, the two CPMVs of the current CU are calculated according to v_2, and v_3. In case that block A is coded with 6-parameter affine model, the three CPMVs of the current CU are calculated according to v_2, v_3 and v_4.

Constructed affine candidate means the candidate is constructed by combining the neighbor translational motion information of each control point. The motion information for the control points is derived from the specified spatial neighbors and temporal neighbor shown in FIG. 13. CPMVk (k=1, 2, 3, 4) represents the k-th control point. For CPMV1, the B2→B3→A2 blocks are checked and the MV of the first available block is used. For CPMV2, the B1→B0 blocks are checked and for CPMV3, the A1→A0 blocks are checked. For TMVP is used as CPMV4 if it's available.

After MVs of four control points are attained, affine merge candidates are constructed based on those motion information. The following combinations of control point MVs are used to construct in order:

{CPMV$_1$, CPMV$_2$, CPMV$_3$}, {CPMV$_1$, CPMV$_2$, CPMV$_4$}, {CPMV$_1$, CPMV$_3$, CPMV$_4$}, {CPMV$_2$, CPMV$_3$, CPMV$_4$}, {CPMV$_1$, CPMV$_2$}, {CPMV$_1$, CPMV$_3$}

The combination of 3 CPMVs constructs a 6-parameter affine merge candidate and the combination of 2 CPMVs constructs a 4-parameter affine merge candidate. To avoid motion scaling process, if the reference indices of control points are different, the related combination of control point MVs is discarded.

After inherited affine merge candidates and constructed affine merge candidate are checked, if the list is still not full, zero MVs are inserted to the end of the list.

Affine AMVP Prediction in VVC

Affine AMVP mode can be applied for CUs with both width and height larger than or equal to 16. An affine flag in CU level is signalled in the bitstream to indicate whether affine AMVP mode is used and then another flag is signalled to indicate whether 4-parameter affine or 6-parameter affine. In this mode, the difference of the CPMVs of current CU and their predictors CPMVPs is signalled in the bitstream. The affine AVMP candidate list size is 2 and it is generated by using the following four types of CPVM candidate in order:

Inherited affine AMVP candidates that extrapolated from the CPMVs of the neighbour CUs
Constructed affine AMVP candidates CPMVPs that are derived using the translational MVs of the neighbour CUs
Translational MVs from neighboring CUs
Zero MVs The checking order of inherited affine AMVP candidates is same to the checking order of inherited affine merge candidates. The only difference is that, for AVMP candidate, only the affine CU that has the same reference picture as in current block is considered. No pruning process is applied when inserting an inherited affine motion predictor into the candidate list.

Figure 13:
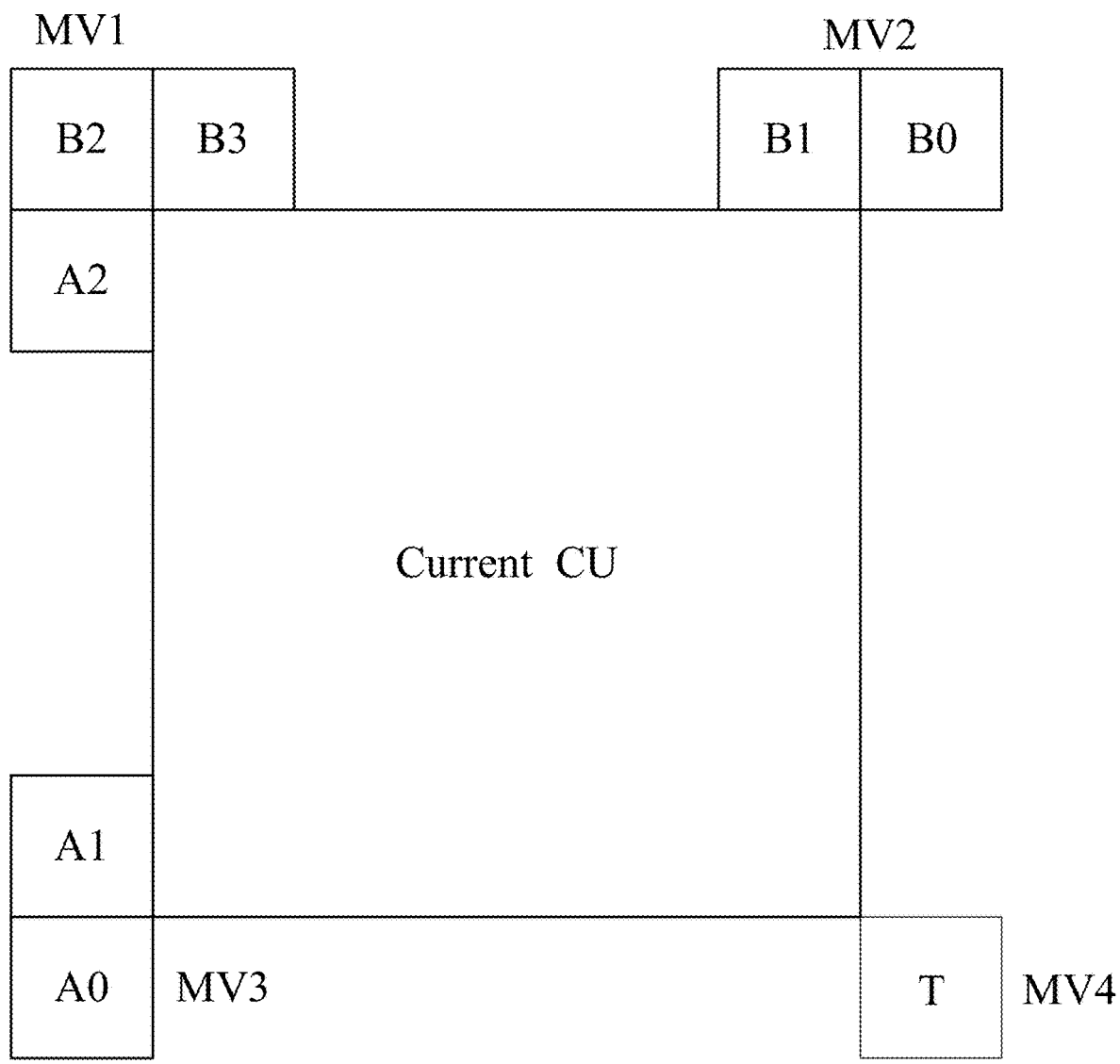
FIG. 13 illustrates locations of Candidates position for constructed affine merge mode in accordance with some implementations of the present disclosure.

Constructed AMVP candidate is derived from the specified spatial neighbors shown in FIG. 13. The same checking order is used as done in affine merge candidate construction. In addition, reference picture index of the neighboring block is also checked. The first block in the checking order that is inter coded and has the same reference picture as in current CUs is used. There is only one When the current CU is coded with 4-parameter affine mode, and $mv_0$ and $mv_1$ are both available, they are added as one candidate in the affine AMVP list. When the current CU is coded with 6-parameter affine mode, and all three CPMVs are available, they are added as one candidate in the affine AMVP list. Otherwise, constructed AMVP candidate is set as unavailable.

If the number of affine AMVP list candidates is still less than 2 after valid inherited affine AMVP candidates and constructed AMVP candidate are inserted, $mv_0$, $mv_1$ and $mv_2$ will be added, in order, as the translational MVs to predict all control point MVs of the current CU, when available. Finally, zero MVs are used to fill the affine AMVP list if it is still not full.

Prediction Refinement with Optical Flow for Affine Mode in VVC

Subblock based affine motion compensation can save memory access bandwidth and reduce computation complexity compared to pixel-based motion compensation, at the cost of prediction accuracy penalty. To achieve a finer granularity of motion compensation, prediction refinement with optical flow (PROF) is used to refine the subblock based affine motion compensated prediction without increasing the memory access bandwidth for motion compensation. In VVC, after the subblock based affine motion compensation is performed, luma prediction sample is refined by adding a difference derived by the optical flow equation. The PROF is described as following four steps:

Step 1) The subblock-based affine motion compensation is performed to generate subblock prediction/(i, j).

Step 2) The spatial gradients $g_x(i, j)$ and $g_y(i, j)$ of the subblock prediction are calculated at each sample location using a 3-tap filter [−1, 0, 1]. The gradient calculation is exactly the same as gradient calculation in BDOF.

$$g_x(i, j) = (I(i+1, j) \gg shift1) - (I(i-1, j) \gg shift1) \quad (4)$$

$$g_y(i, j) = (I(i, j+1) \gg shift1) - (I(i, j-1) \gg shift1) \quad (5)$$

shift1 is used to control the gradient's precision. The subblock (i.e., 4×4) prediction is extended by one sample on each side for the gradient calculation. To avoid additional memory bandwidth and additional interpolation computation, those extended samples on the extended borders are copied from the nearest integer pixel position in the reference picture.

Figure 14:
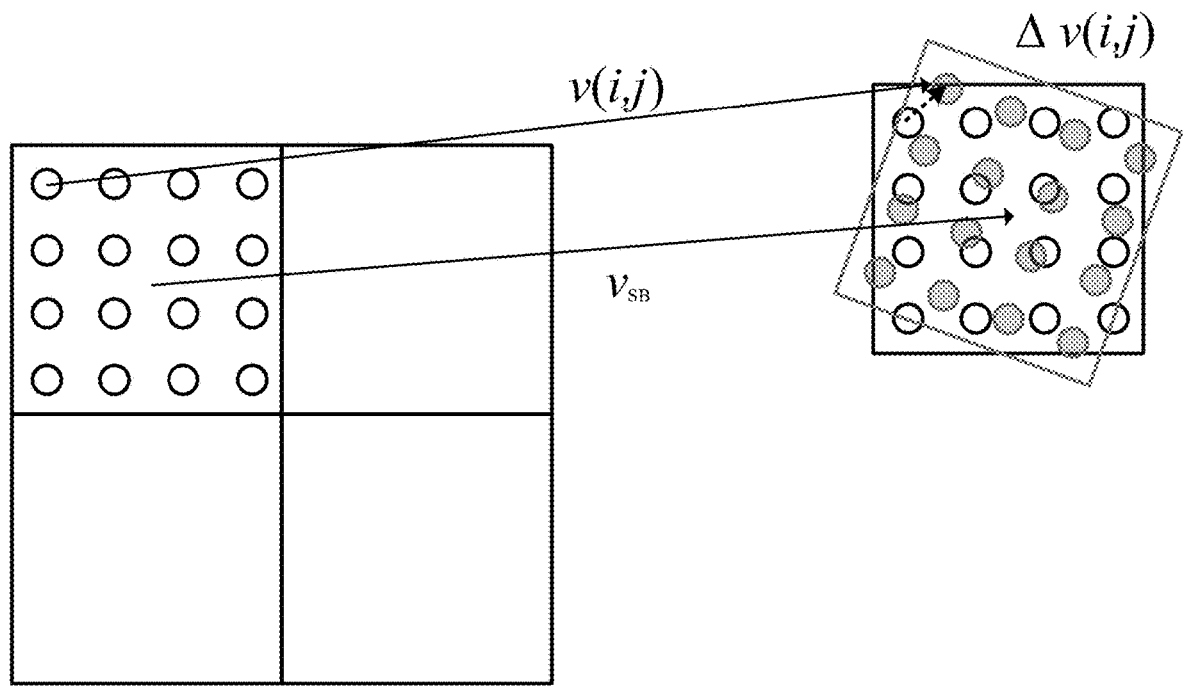
FIG. 14 illustrates an example of subblock MV and pixel in accordance with some implementations of the present disclosure.

Step 3) The luma prediction refinement is calculated by the following optical flow equation.

$$\Delta I(i, j) = g_x(i, j) * \Delta v_x(i, j) + g_y(i, j) * \Delta v_y(i, j) \quad (6)$$

where the $\Delta v(i, j)$ is the difference between sample MV computed for sample location (i, j), denoted by v(i, j), and the subblock MV of the subblock to which sample (i, j) belongs, as shown in FIG. 14. The $\Delta v(i, j)$ is quantized in the unit of 1/32 luam sample precision.

Since the affine model parameters and the sample location relative to the subblock center are not changed from subblock to subblock, $\Delta v(i, j)$ can be calculated for the first subblock, and reused for other subblocks in the same CU. Let dx(i, j) and dy(i, j) be the horizontal and vertical offset from the sample location (i, j) to the center of the subblock $(x_{SB}, y_{SB})$, $\Delta v(x, y)$ can be derived by the following equation, $$\begin{cases} dx(i, j) = i - x_{SB} \\ dy(i, j) = j - y_{SB} \end{cases} \quad (7)$$

$$\begin{cases} \Delta v_x(i, j) = C * dx(i, j) + D * dy(i, j) \\ \Delta v_y(i, j) = E * dx(i, j) + F * dy(i, j) \end{cases} \quad (8)$$

In order to keep accuracy, the enter of the subblock $(x_{SB}, y_{SB})$ is calculated as $((W_{SB}-1)/2, (H_{SB}-1)/2)$, where $W_{SB}$ and $H_{SB}$ are the subblock width and height, respectively.

For 4-parameter affine model, $$\begin{cases} C = F = \frac{v_{1x} - v_{0x}}{w} \\ E = -D = \frac{v_{1y} - v_{0y}}{w} \end{cases} \quad (9)$$

For 6-parameter affine model, $$\begin{cases} C = \frac{v_{1x} - v_{0x}}{w} \\ D = \frac{v_{2x} - v_{0x}}{h} \\ E = \frac{v_{1y} - v_{0y}}{w} \\ F = \frac{v_{2y} - v_{0y}}{h} \end{cases} \quad (10)$$

where $(v_{0x}, v_{0y})$, $(v_{1x}, v_{1y})$, $(v_{2x}, v_{2y})$ are the top-left, top-right and bottom-left control point motion vectors, w and h are the width and height of the CU.

Step 4) Finally, the luma prediction refinement $\Delta I(i, j)$ is added to the subblock prediction $I(i, j)$. The final prediction I' is generated as the following equation.

$$I'(i, j) = I(i, j) + \Delta I(i, j)$$

PROF is not be applied in two cases for an affine coded CU: 1) all control point MVs are the same, which indicates the CU only has translational motion; 2) the affine motion parameters are greater than a specified limit because the subblock based affine MC is degraded to CU based MC to avoid large memory access bandwidth requirement.

A fast encoding method is applied to reduce the encoding complexity of affine motion estimation with PROF. PROF is not applied at affine motion estimation stage in following two situations: a) if this CU is not the root block and its parent block does not select the affine mode as its best mode, PROF is not applied since the possibility for current CU to select the affine mode as best mode is low; b) if the magnitude of four affine parameters (C, D, E, F) are all smaller than a predefined threshold and the current picture is not a low delay picture, PROF is not applied because the improvement introduced by PROF is small for this case. In this way, the affine motion estimation with PROF can be accelerated.

Subblock-Based Temporal Motion Vector Prediction (SbTMVP) in VVC

VVC supports the subblock-based temporal motion vector prediction (SbTMVP) method. Similar to the temporal motion vector prediction (TMVP) in HEVC, SbTMVP uses the motion field in the collocated picture to improve motion vector prediction and merge mode for CUs in the current picture. The same collocated picture used by TMVP is used for SbTVMP. SbTMVP differs from TMVP in the following two main aspects:

TMVP predicts motion at CU level but SbTMVP predicts motion at sub-CU level;

Whereas TMVP fetches the temporal motion vectors from the collocated block in the collocated picture (the collocated block is the bottom-right or center block relative to the current CU), SbTMVP applies a motion shift before fetching the temporal motion information from the collocated picture, where the motion shift is obtained from the motion vector from one of the spatial neighboring blocks of the current CU.

Figure 15A:
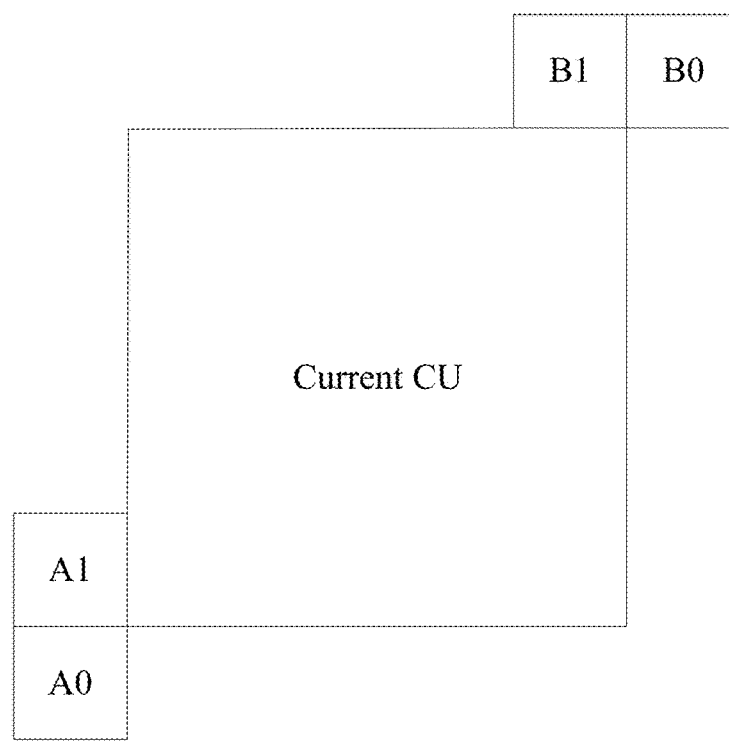
FIG. 15A illustrates an example of spatial neighboring blocks used by ATVMP in accordance with some implementations of the present disclosure.
Figure 15B:
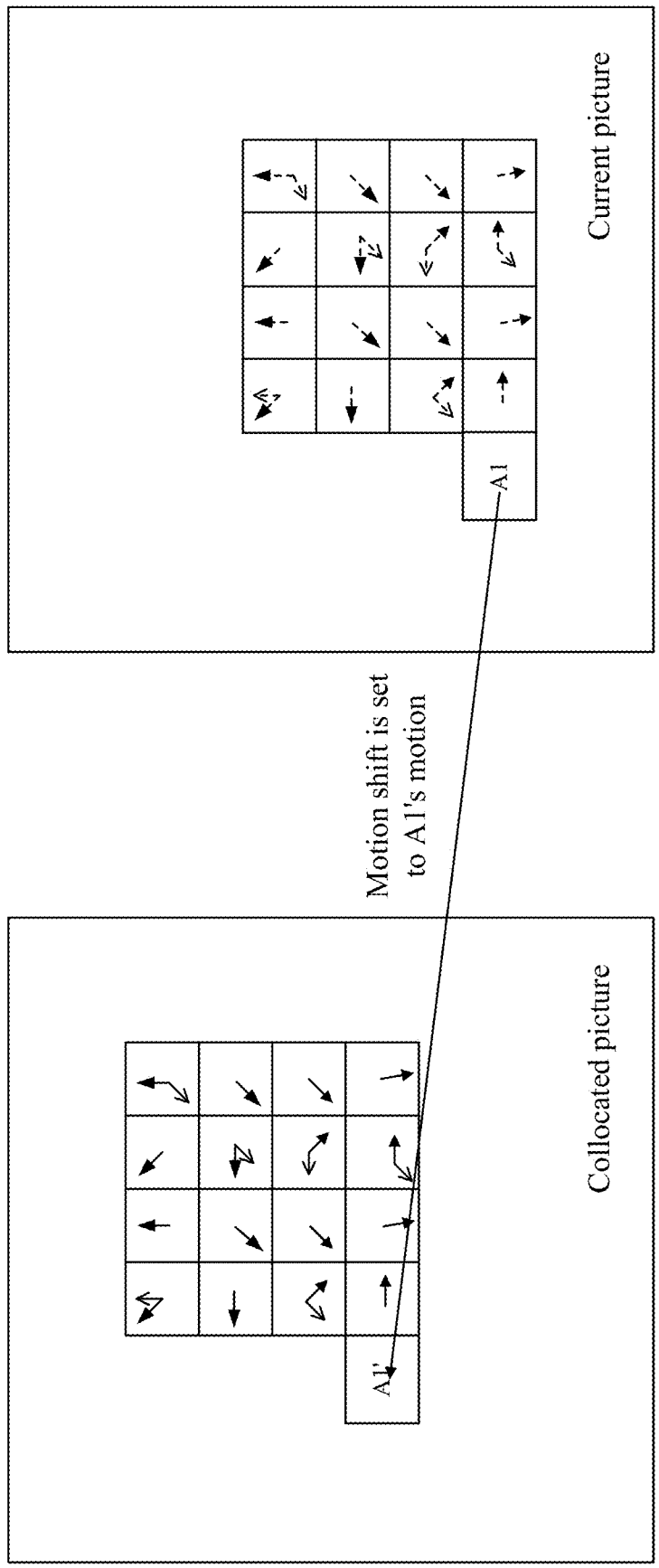
FIG. 15B illustrates an example of the SbTMVP process in accordance with some implementations of the present disclosure.

The SbTVMP process is illustrated in FIGS. 15A and 15B. SbTMVP predicts the motion vectors of the sub-CUs within the current CU in two steps. In the first step, the spatial neighbor A1 in FIG. 15A is examined. If A1 has a motion vector that uses the collocated picture as its reference picture, this motion vector is selected to be the motion shift to be applied. If no such motion is identified, then the motion shift is set to (0, 0).

In the second step, the motion shift identified in Step 1 is applied (i.e., added to the current block's coordinates) to obtain sub-CU level motion information (motion vectors and reference indices) from the collocated picture as shown in FIG. 15B. The example in FIG. 15B assumes the motion shift is set to block A1's motion. Then, for each sub-CU, the motion information of its corresponding block (the smallest motion grid that covers the center sample) in the collocated picture is used to derive the motion information for the sub-CU. After the motion information of the collocated sub-CU is identified, it is converted to the motion vectors and reference indices of the current sub-CU in a similar way as the TMVP process of HEVC, where temporal motion scaling is applied to align the reference pictures of the temporal motion vectors to those of the current CU.

In VVC, a combined subblock based merge list which contains both SbTVMP candidate and affine merge candidates is used for the signalling of subblock based merge mode. The SbTVMP mode is enabled/disabled by a sequence parameter set (SPS) flag. If the SbTMVP mode is enabled, the SbTMVP predictor is added as the first entry of the list of subblock based merge candidates, and followed by the affine merge candidates. The size of subblock based merge list is signalled in SPS and the maximum allowed size of the subblock based merge list is 5 in VVC.

The sub-CU size used in SbTMVP is fixed to be 8×8, and as done for affine merge mode, SbTMVP mode is only applicable to the CU with both width and height are larger than or equal to 8.

The encoding logic of the additional SbTMVP merge candidate is the same as for the other merge candidates, that is, for each CU in P or B slice, an additional RD check is performed to decide whether to use the SbTMVP candidate.
Adaptive Motion Vector Resolution (AMVR) in VVC In HEVC, motion vector differences (MVDs) (between the motion vector and predicted motion vector of a CU) are signalled in units of quarter-luma-sample when use_integer_mv_flag is equal to 0 in the slice header. In VVC, a CU-level adaptive motion vector resolution (AMVR) scheme is introduced. AMVR allows MVD of the CU to be coded in different precision. Dependent on the mode (normal AMVP mode or affine AVMP mode) for the current CU, the MVDs of the current CU can be adaptively selected as follows:

Normal AMVP mode: quarter-luma-sample, half-luma-sample, integer-luma-sample or four-luma-sample.

Affine AMVP mode: quarter-luma-sample, integer-luma-sample or $1/16$ luma-sample.

The CU-level MVD resolution indication is conditionally signalled if the current CU has at least one non-zero MVD component. If all MVD components (that is, both horizontal and vertical MVDs for reference list L0 and reference list L1) are zero, quarter-luma-sample MVD resolution is inferred.

For a CU that has at least one non-zero MVD component, a first flag is signalled to indicate whether quarter-luma-sample MVD precision is used for the CU. If the first flag is 0, no further signaling is needed and quarter-luma-sample MVD precision is used for the current CU. Otherwise, a second flag is signalled to indicate half-luma-sample or other MVD precisions (integer or four-luma sample) is used for normal AMVP CU. In the case of half-luma-sample, a 6-tap interpolation filter instead of the default 8-tap interpolation filter is used for the half-luma sample position. Otherwise, a third flag is signalled to indicate whether integer-luma-sample or four-luma-sample MVD precision is used for normal AMVP CU. In the case of affine AMVP CU, the second flag is used to indicate whether integer-luma-sample or $1/16$ luma-sample MVD precision is used. In order to ensure the reconstructed MV has the intended precision (quarter-luma-sample, half-luma-sample, integer-luma-sample or four-luma-sample), the motion vector predictors for the CU may be rounded to the same precision as that of the MVD before being added together with the MVD. The motion vector predictors are rounded toward zero (that is, a negative motion vector predictor is rounded toward positive infinity and a positive motion vector predictor is rounded toward negative infinity).

The encoder determines the motion vector resolution for the current CU using RD check. To avoid always performing CU-level RD check four times for each MVD resolution, in VTM14, the RD check of MVD precisions other than quarter-luma-sample is only invoked conditionally. For normal AVMP mode, the RD cost of quarter-luma-sample MVD precision and integer-luma sample MV precision is computed first. Then, the RD cost of integer-luma-sample MVD precision is compared to that of quarter-luma-sample MVD precision to decide whether it is necessary to further check the RD cost of four-luma-sample MVD precision. When the RD cost for quarter-luma-sample MVD precision is much smaller than that of the integer-luma-sample MVD precision, the RD check of four-luma-sample MVD precision is skipped. Then, the check of half-luma-sample MVD precision is skipped if the RD cost of integer-luma-sample MVD precision is significantly larger than the best RD cost of previously tested MVD precisions. For affine AMVP mode, if affine inter mode is not selected after checking rate-distortion costs of affine merge/skip mode, merge/skip mode, quarter-luma-sample MVD precision normal AMVP mode and quarter-luma-sample MVD precision affine AMVP mode, then $1/16$ luma-sample MV precision and 1-pel MV precision affine inter modes are not checked. Furthermore, affine parameters obtained in quarter-luma-sample MV precision affine inter mode is used as starting search point in $1/16$ luma-sample and quarter-luma-sample MV precision affine inter modes.
Bi-Prediction with CU-Level Weight (BCW) in VVC In HEVC, the bi-prediction signal is generated by averaging two prediction signals obtained from two different reference pictures and/or using two different motion vectors. In VVC, the bi-prediction mode is extended beyond simple averaging to allow weighted averaging of the two prediction signals.

$$P_{bi-pred} = ((8-w)*P_0 + w*P_1 + 4) \gg 3 \qquad (11)$$

Five weights are allowed in the weighted averaging bi-prediction, $w \in \{-2, 3, 4, 5, 10\}$. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. BCW is only applied to CUs with 256 or more luma samples (i.e., CU width times CU height is greater than or equal to 256). For low-delay pictures, all 5 weights are used. For non-low-delay pictures, only 3 weights (w∈ {3, 4, 5}) are used.

At the encoder, fast search algorithms are applied to find the weight index without significantly increasing the encoder complexity. These algorithms are summarized as follows. For further details readers are referred to the VTM software and document JVET-L0646. When combined with AMVR, unequal weights are only conditionally checked for 1-pel and 4-pel motion vector precisions if the current picture is a low-delay picture.

When combined with affine, affine ME may be performed for unequal weights if and only if the affine mode is selected as the current best mode.

When the two reference pictures in bi-prediction are the same, unequal weights are only conditionally checked.

Unequal weights are not searched when certain conditions are met, depending on the POC distance between current picture and its reference pictures, the coding QP, and the temporal level.

The BCW weight index is coded using one context coded bin followed by bypass coded bins. The first context coded bin indicates if equal weight is used; and if unequal weight is used, additional bins are signalled using bypass coding to indicate which unequal weight is used.

Weighted prediction (WP) is a coding tool supported by the H.264/AVC and HEVC standards to efficiently code video content with fading. Support for WP was also added into the VVC standard. WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which may complicate VVC decoder design, if a CU uses WP, then the BCW weight index is not signalled, and w is inferred to be 4 (i.e., equal weight is applied). For a merge CU, the weight index is inferred from neighbouring blocks based on the merge candidate index. This can be applied to both normal merge mode and inherited affine merge mode. For constructed affine merge mode, the affine motion information is constructed based on the motion information of up to 3 blocks. The BCW index for a CU using the constructed affine merge mode is simply set equal to the BCW index of the first control point MV.

In VVC, CIIP and BCW cannot be jointly applied for a CU. When a CU is coded with CIIP mode, the BCW index of the current CU is set to 2, e.g., equal weight.

Bi-Directional Optical Flow (BDOF) in VVC

The bi-directional optical flow (BDOF) tool is included in VVC. BDOF, previously referred to as BIO, was included in the JEM. Compared to the JEM version, the BDOF in VVC is a simpler version that requires much less computation, especially in terms of number of multiplications and the size of the multiplier.

BDOF is used to refine the bi-prediction signal of a CU at the 4×4 subblock level. BDOF is applied to a CU if it satisfies all the following conditions:

The CU is coded using "true" bi-prediction mode, i.e., one of the two reference pictures is prior to the current picture in display order and the other is after the current picture in display order The distances (i.e., POC difference) from two reference pictures to the current picture are same Both reference pictures are short-term reference pictures.

The CU is not coded using affine mode or the SbTMVP merge mode

CU has more than 64 luma samples

Both CU height and CU width are larger than or equal to 8 luma samples

BCW weight index indicates equal weight

WP is not enabled for the current CU

CIIP mode is not used for the current CU

BDOF is only applied to the luma component. As its name indicates, the BDOF mode is based on the optical flow concept, which assumes that the motion of an object is smooth. For each 4×4 subblock, a motion refinement $(v_x, v_y)$ is calculated by minimizing the difference between the L0 and L1 prediction samples. The motion refinement is then used to adjust the bi-predicted sample values in the 4×4 subblock. The following steps are applied in the BDOF process.

First, the horizontal and vertical gradients, $$\frac{\partial I^{(k)}}{\partial x}(i, j) \text{ and } \frac{\partial I^{(k)}}{\partial y}(i, j), k = 0,1,$$

of the two prediction signals are computed by directly calculating the difference between two neighboring samples, i.e., $$\frac{\partial I^{(k)}}{\partial x}(i, j) = \left((I^{(k)}(i+1, j) \gg shift1) - (I^{(k)}(i-1, j) \gg shift1)\right) \quad (12)$$

$$\frac{\partial I^{(k)}}{\partial y}(i, j) = \left((I^{(k)}(i, j+1) \gg shift1) - (I^{(k)}(i, j-1) \gg shift1)\right)$$

where $I^{(k)}(i, j)$ are the sample value at coordinate (i, j) of the prediction signal in list k, k=0, 1, and shift1 is calculated based on the luma bit depth, bitDepth, as shift1=max (6, bitDepth−6).

Then, the auto- and cross-correlation of the gradients, $S_1$, $S_2$, $S_3$, $S_5$ and $S_6$, are calculated as $$S_1 = \sum_{(i,j)\in\Omega} \text{Abs}(\psi_x(i, j)), S_3 = \sum_{(i,j)\in\Omega} \theta(i, j) \cdot \text{Sign}(\psi_x(i, j)) \quad (13)$$

$$S_2 = \sum_{(i,j)\in\Omega} \psi_x(i, j) \cdot \text{Sign}(\psi_y(i, j))$$

$$S_5 = \sum_{(i,j)\in\Omega} \text{Abs}(\psi_y(i, j)), S_6 = \sum_{(i,j)\in\Omega} \theta(i, j) \cdot \text{Sign}(\psi_y(i, j))$$

$$\text{where } \psi_x(i, j) = \left(\frac{\partial I^{(1)}}{\partial x}(i, j) + \frac{\partial I^{(0)}}{\partial x}(i, j)\right) \gg n_a \quad (14)$$

$$\psi_y(i, j) = \left(\frac{\partial I^{(1)}}{\partial y}(i, j) + \frac{\partial I^{(0)}}{\partial y}(i, j)\right) \gg n_a$$

$$\theta(i, j) = (I^{(1)}(i, j) \gg n_b) - (I^{(0)}(i, j) \gg n_b)$$

where $\Omega$ is a 6×6 window around the 4×4 subblock, and the values of $n_a$ and $n_b$ are set equal to min (1, bitDepth−11) and min (4, bitDepth−8), respectively.

The motion refinement $(v_x, v_y)$ is then derived using the cross- and auto-correlation terms using the following:

$$v_x = S_1 > 0 ? \; clip3(-th'_{BIO}, th'_{BIO}, -((S_3 \cdot 2^{n_b-n_a}) \gg \lfloor \log_2 S_1 \rfloor)) : 0 \quad (15)$$

$$v_y = S_5 > 0 ? \; clip3\big(-th'_{BIO}, th'_{BIO}, -\big((S_6 \cdot 2^{n_b-n_a} -$$
$$((v_x S_{2,m}) \ll n_{S_2} + v_x S_{2,s})/2) \gg \lfloor \log_2 S_5 \rfloor\big)\big) : 0$$

where $S_{2,m} = S_2 \gg n_{S_2}$, $S_{2,s} = S_2 \& (2^{n_s}2-1)$, $\text{th}'_{BIO} = 2^{max(5, BD-7)}$. $\lfloor \cdot \rfloor$ is the floor function, and $n_{S_2} = 12$.

Based on the motion refinement and the gradients, the following adjustment is calculated for each sample in the 4×4 subblock:

$$b(x, y) = \qquad (16)$$
$$rnd\left(\left(v_x \left(\frac{\partial I^{(1)}(x,y)}{\partial x} - \frac{\partial I^{(0)}(x,y)}{\partial x}\right) + v_y \left(\frac{\partial I^{(1)}(x,y)}{\partial y} - \frac{\partial I^{(0)}(x,y)}{\partial y}\right)\right) + :\right.$$

Finally, the BDOF samples of the CU are calculated by adjusting the bi-prediction samples as follows:

$$pred_{BDOF}(x, y) = (I^{(0)}(x, y) + I^{(1)}(x, y) + b(x, y) + o_{offset}) \gg shift \quad (17)$$

These values are selected such that the multipliers in the BDOF process do not exceed 15-bit, and the maximum bit-width of the intermediate parameters in the BDOF process is kept within 32-bit.

Figure 16:
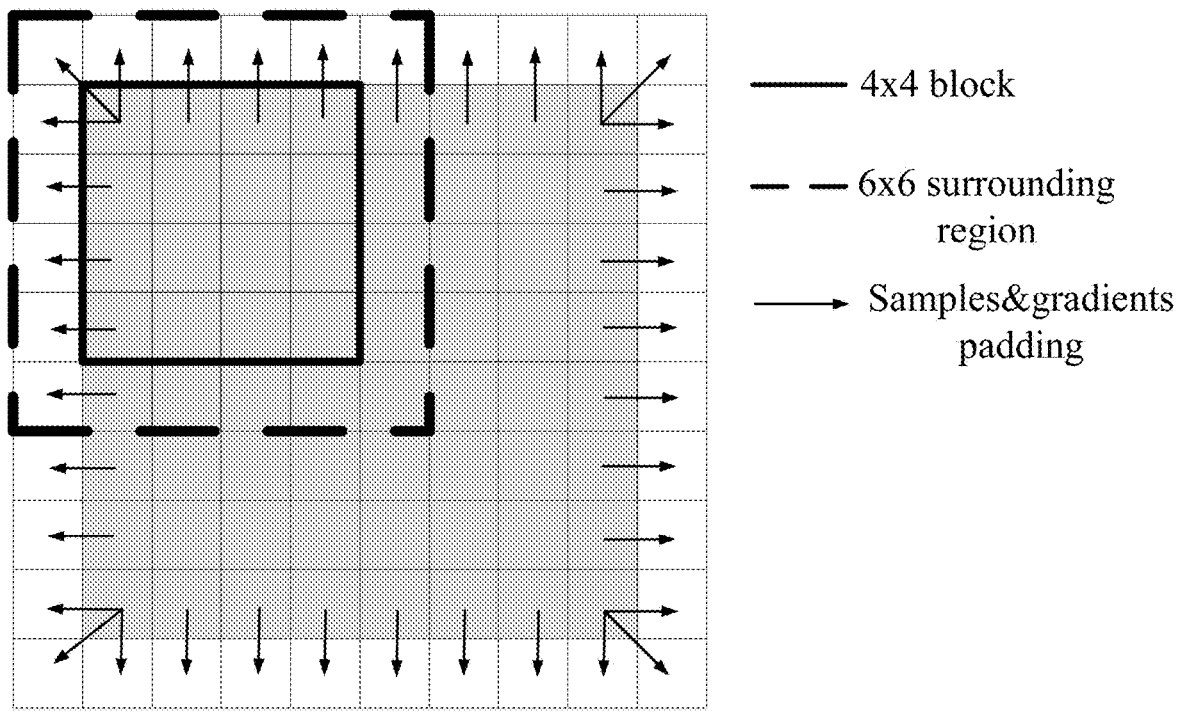
FIG. 16 illustrates an example of extended CU region used in BDOF in accordance with some implementations of the present disclosure.

In order to derive the gradient values, some prediction samples $I^{(k)}(i, j)$ in list k (k=0, 1) outside of the current CU boundaries need to be generated. As depicted in FIG. 16, the BDOF in VVC uses one extended row/column around the CU's boundaries. In order to control the computational complexity of generating the out-of-boundary prediction samples, prediction samples in the extended area (white positions) are generated by taking the reference samples at the nearby integer positions (using floor ( ) operation on the coordinates) directly without interpolation, and the normal 8-tap motion compensation interpolation filter is used to generate prediction samples within the CU (gray positions). These extended sample values are used in gradient calculation only. For the remaining steps in the BDOF process, if any sample and gradient values outside of the CU boundaries are needed, they are padded (i.e. repeated) from their nearest neighbors.

When the width and/or height of a CU are larger than 16 luma samples, the CU may be split into subblocks with width and/or height equal to 16 luma samples, and the subblock boundaries are treated as the CU boundaries in the BDOF process. The maximum unit size for BDOF process is limited to 16×16. For each subblock, the BDOF process could skipped. When the SAD of between the initial L0 and L1 prediction samples is smaller than a threshold, the BDOF process is not applied to the subblock. The threshold is set equal to (8*W*(H>>1), where W indicates the subblock width, and H indicates subblock height. To avoid the additional complexity of SAD calculation, the SAD between the initial L0 and L1 prediction samples calculated in DVMR process is re-used here.

If BCW is enabled for the current block, i.e., the BCW weight index indicates unequal weight, then bi-directional optical flow is disabled. Similarly, if WP is enabled for the current block, i.e., the luma_weight_lx flag is 1 for either of the two reference pictures, then BDOF is also disabled. When a CU is coded with symmetric MVD mode or CIIP mode, BDOF is also disabled.

Decoder Side Motion Vector Refinement (DMVR) in VVC

Figure 17:
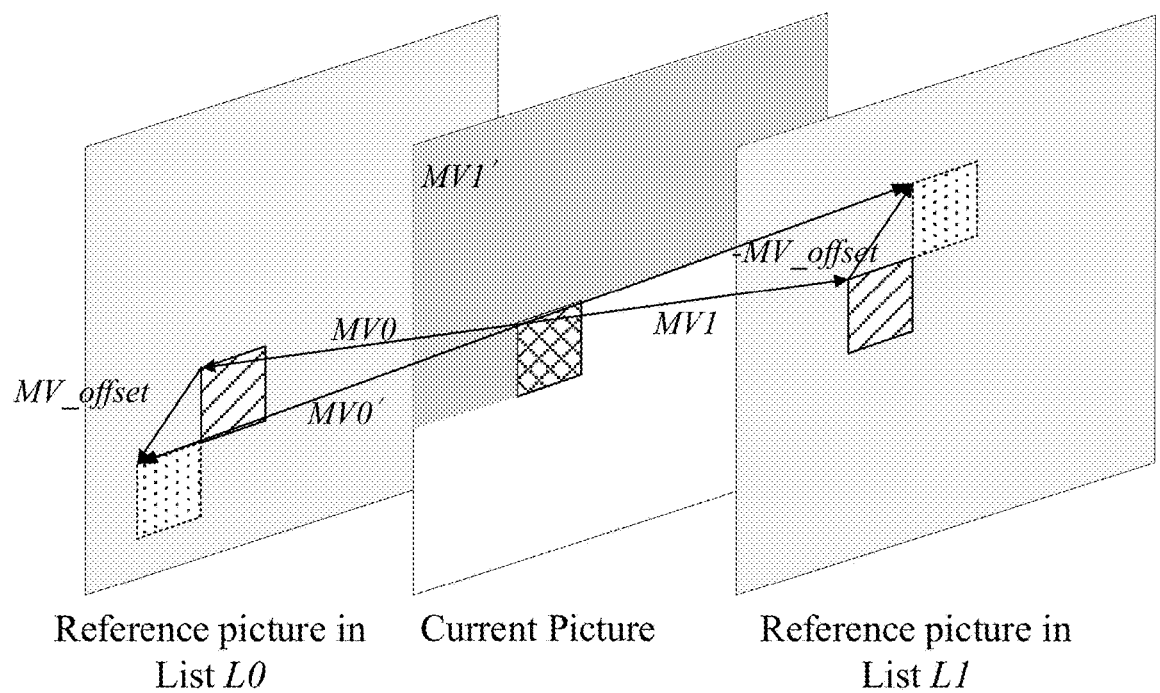
FIG. 17 illustrates an example of decoding side motion vector refinement in accordance with some implementations of the present disclosure.

In order to increase the accuracy of the MVs of the merge mode, a bilateral-matching (BM) based decoder side motion vector refinement is applied in VVC. In bi-prediction operation, a refined MV is searched around the initial MVs in the reference picture list L0 and reference picture list L1. The BM method calculates the distortion between the two candidate blocks in the reference picture list L0 and list L1. As illustrated in FIG. 17, the SAD between the red blocks based on each MV candidate around the initial MV is calculated. The MV candidate with the lowest SAD becomes the refined MV and used to generate the bi-predicted signal.

In VVC, the application of DMVR is restricted and is only applied for the CUS which are coded with following modes and features:

CU level merge mode with bi-prediction MV

One reference picture is in the past and another reference picture is in the future with respect to the current picture The distances (i.e., POC difference) from two reference pictures to the current picture are same Both reference pictures are short-term reference pictures CU has more than 64 luma samples Both CU height and CU width are larger than or equal to 8 luma samples BCW weight index indicates equal weight WP is not enabled for the current block CIIP mode is not used for the current block The refined MV derived by DMVR process is used to generate the inter prediction samples and also used in temporal motion vector prediction for future pictures coding. While the original MV is used in deblocking process and also used in spatial motion vector prediction for future CU coding.

The additional features of DMVR are mentioned in the following sub-clauses.

Searching Scheme

In DVMR, the search points are surrounding the initial MV and the MV offset obey the MV difference mirroring rule. In other words, any points that are checked by DMVR, denoted by candidate MV pair (MV0, MV1) obey the following two equations:

$$MV0' = MV0 + MV\_offset \qquad (18)$$
$$MV1' = MV1 - MV\_offset \qquad (19)$$

Where MV_offset represents the refinement offset between the initial MV and the refined MV in one of the reference pictures. The refinement search range is two integer luma samples from the initial MV. The searching includes the integer sample offset search stage and fractional sample refinement stage.

25 points full search is applied for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, it is proposed to favor the original MV during the DMVR process. The SAD between the reference blocks referred by the initial MV candidates is decreased by ¼ of the SAD value.

The integer sample search is followed by fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form $$E(x, y) = A(x - x_{min})^2 + B(y - y_{min})^2 + C \qquad (20)$$

where ($x_{min}$, $y_{min}$) corresponds to the fractional position with the least cost and C corresponds to the minimum cost value. By solving the above equations by using the cost value of the five search points, the ($x_{min}$, $y_{min}$) is computed as:

$$x_{min} = (E(-1,0) - E(1,0))/(2(E(-1,0) + E(1,0) - 2E(0,0))) \qquad (21)$$

$$y_{min} = (E(0,-1) - E(0,1))/(2((E(0,-1) + E(0,1) - 2E(0,0))) \qquad (22)$$

The value of $x_{min}$ and $y_{min}$ are automatically constrained to be between −8 and 8 since all cost values are positive and the smallest value is E(0,0). This corresponds to half peal offset with ¹⁄₁₆th-pel MV accuracy in VVC. The computed fractional ($x_{min}$) $y_{min}$) are added to the integer distance refinement MV to get the sub-pixel accurate refinement delta MV.

Bilinear-Interpolation and Sample Padding

In VVC, the resolution of the MVs is ¹⁄₁₆ luma samples. The samples at the fractional position are interpolated using an 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which are not needed for the interpolation process based on the original MV but are needed for the interpolation process based on the refined MV, will be padded from those available samples.

Geometric Partitioning Mode (GPM) in VVC

In VVC, a geometric partitioning mode is supported for inter prediction. The geometric partitioning mode is signalled using a CU-level flag as one kind of merge mode, with other merge modes including the regular merge mode, the MMVD mode, the CIIP mode and the subblock merge mode. In total 64 partitions are supported by geometric partitioning mode for each possible CU size w×h=$2^m$×$2^n$ with m, n∈{3 . . . 6} excluding 8×64 and 64×8.

Figure 18:
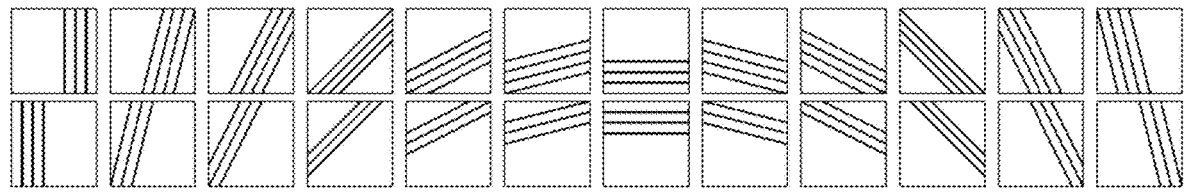
FIG. 18 illustrates examples of the GPM splits grouped by identical angles in accordance with some implementations of the present disclosure.

When this mode is used, a CU is split into two parts by a geometrically located straight line (FIG. 18). The location of the splitting line is mathematically derived from the angle and offset parameters of a specific partition. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU. The uni-prediction motion for each partition is derived using the process described in 3.4.11.1.

If geometric partitioning mode is used for the current CU, then a geometric partition index indicating the partition mode of the geometric partition (angle and offset), and two merge indices (one for each partition) are further signalled. The number of maximum GPM candidate size is signalled explicitly in SPS and specifies syntax binarization for GPM merge indices. After predicting each of part of the geometric partition, the sample values along the geometric partition edge are adjusted using a blending processing with adaptive weights as in 3.4.11.2. This is the prediction signal for the whole CU, and transform and quantization process may be applied to the whole CU as in other prediction modes. Finally, the motion field of a CU predicted using the geometric partition modes is stored as in 3.4.11.3.

Uni-Prediction Candidate List Construction

Figure 19:
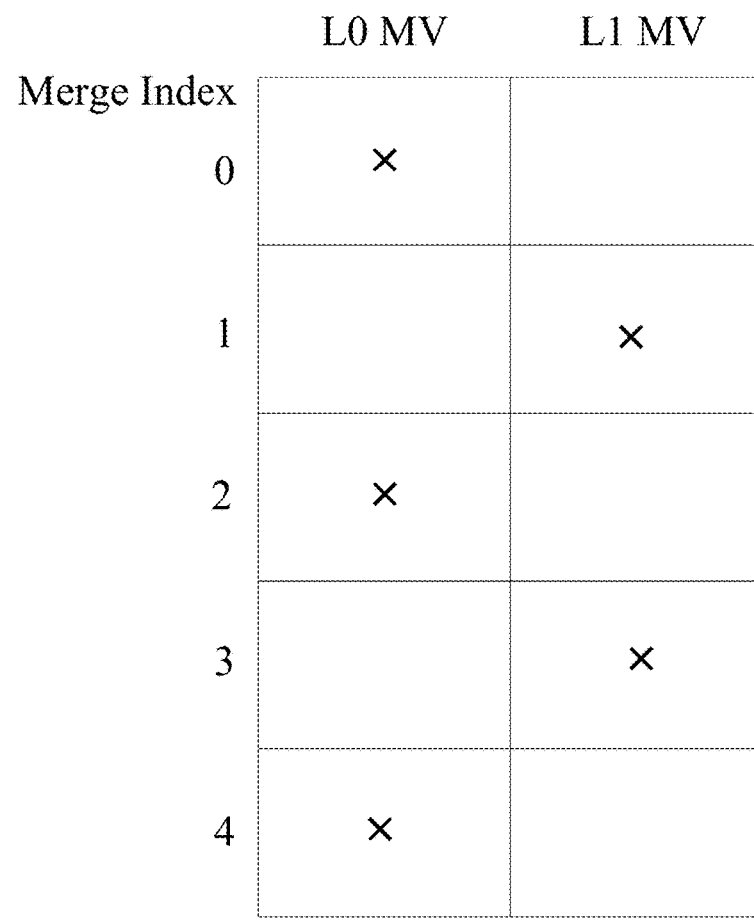
FIG. 19 illustrates an example of uni-prediction MV selection for geometric partitioning mode in accordance with some implementations of the present disclosure.

The uni-prediction candidate list is derived directly from the merge candidate list constructed according to the extended merge prediction process in 3.4.1. Denote n as the index of the uni-prediction motion in the geometric uni-prediction candidate list. The LX motion vector of the n-th extended merge candidate, with X equal to the parity of n, is used as the n-th uni-prediction motion vector for geometric partitioning mode. These motion vectors are marked with "x" in FIG. 19. In case a corresponding LX motion vector of the n—the extended merge candidate does not exist, the L(1−X) motion vector of the same candidate is used instead as the uni-prediction motion vector for geometric partitioning mode.

Combined Inter and Intra Prediction (CIIP) in VVC

Figure 20:
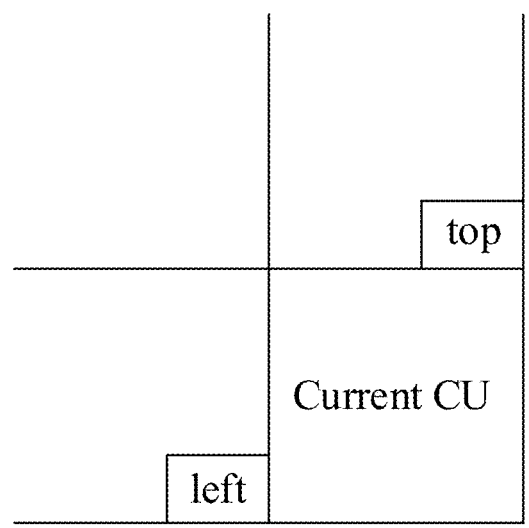
FIG. 20 illustrates an example of top and left neighboring blocks used in CIIP weight derivation in accordance with some implementations of the present disclosure.

In VVC, when a CU is coded in merge mode, if the CU contains at least 64 luma samples (that is, CU width times CU height is equal to or larger than 64), and if both CU width and CU height are less than 128 luma samples, an additional flag is signalled to indicate if the combined inter/intra prediction (CIIP) mode is applied to the current CU. As its name indicates, the CIIP prediction combines an inter prediction signal with an intra prediction signal. The inter prediction signal in the CIIP mode $P_{inter}$ is derived using the same inter prediction process applied to regular merge mode; and the intra prediction signal $P_{intra}$ is derived following the regular intra prediction process with the planar mode. Then, the intra and inter prediction signals are combined using weighted averaging, where the weight value is calculated depending on the coding modes of the top and left neighbouring blocks (depicted in FIG. 20) as follows:

If the top neighbor is available and intra coded, then set isIntra Top to 1, otherwise set isIntra Top to 0;

If the left neighbor is available and intra coded, then set isIntraLeft to 1, otherwise set isIntraLeft to 0;

If (isIntraLeft+isIntraTop) is equal to 2, then wt is set to 3;

Otherwise, if (isIntraLeft+isIntra Top) is equal to 1, then wt is set to 2;

Otherwise, set wt to 1.

The CIIP prediction is formed as follows:

$$P_{CIIP} = ((4 - wt) * P_{inter} + wt * P_{intra} + 2) \gg 2 \quad (23)$$

Intra Block Copy (IBC) in VVC

Intra block copy (IBC) is a tool adopted in HEVC extensions on SCC. It is well known that it significantly improves the coding efficiency of screen content materials. Since IBC mode is implemented as a block level coding mode, block matching (BM) is performed at the encoder to find the optimal block vector (or motion vector) for each CU. Here, a block vector is used to indicate the displacement from the current block to a reference block, which is already reconstructed inside the current picture. The luma block vector of an IBC-coded CU is in integer precision. The chroma block vector rounds to integer precision as well. When combined with AMVR, the IBC mode can switch between 1-pel and 4-pel motion vector precisions. An IBC-coded CU is treated as the third prediction mode other than intra or inter prediction modes. The IBC mode is applicable to the CUs with both width and height smaller than or equal to 64 luma samples.

At the encoder side, hash-based motion estimation is performed for IBC. The encoder performs RD check for blocks with either width or height no larger than 16 luma samples. For non-merge mode, the block vector search is performed using hash-based search first. If hash search does not return valid candidate, block matching based local search are performed.

In the hash-based search, hash key matching (32-bit CRC) between the current block and a reference block is extended to all allowed block sizes. The hash key calculation for every position in the current picture is based on 4×4 subblocks. For the current block of a larger size, a hash key is determined to match that of the reference block when all the hash keys of all 4×4 subblocks match the hash keys in the corresponding reference locations. If hash keys of multiple reference blocks are found to match that of the current block, the block vector costs of each matched reference are calculated and the one with the minimum cost is selected.

In block matching search, the search range is set to cover both the previous and current CTUs. At CU level, IBC mode is signalled with a flag and it can be signaled as IBC AMVP mode or IBC skip/merge mode as follows:

IBC skip/merge mode: a merge candidate index is used to indicate which of the block vectors in the list from neighboring candidate IBC coded blocks is used to predict the current block. The merge list consists of spatial, HMVP, and pairwise candidates.

IBC AMVP mode: block vector difference is coded in the same way as a motion vector difference. The block vector prediction method uses two candidates as predictors, one from left neighbor and one from above neighbor (if IBC coded). When either neighbor is not available, a default block vector may be used as a predictor. A flag is signaled to indicate the block vector predictor index.

IBC Reference Region

To reduce memory consumption and decoder complexity, the IBC in VVC allows only the reconstructed portion of the predefined area including the region of current CTU and some region of the left CTU. Depending on the location of the current coding CU location within the current CTU, the following applies:

If current block falls into the top-left 64×64 block of the current CTU, then in addition to the already reconstructed samples in the current CTU, it can also refer to the reference samples in the bottom-right 64×64 blocks of the left CTU, using CPR mode. The current block can also refer to the reference samples in the bottom-left 64×64 block of the left CTU and the reference samples in the top-right 64×64 block of the left CTU, using CPR mode.

If current block falls into the top-right 64×64 block of the current CTU, then in addition to the already reconstructed samples in the current CTU, if luma location (0, 64) relative to the current CTU has not yet been reconstructed, the current block can also refer to the reference samples in the bottom-left 64×64 block and bottom-right 64×64 block of the left CTU, using CPR mode; otherwise, the current block can also refer to reference samples in bottom-right 64×64 block of the left CTU.

If current block falls into the bottom-left 64×64 block of the current CTU, then in addition to the already reconstructed samples in the current CTU, if luma location (64, 0) relative to the current CTU has not yet been reconstructed, the current block can also refer to the reference samples in the top-right 64×64 block and bottom-right 64×64 block of the left CTU, using CPR mode. Otherwise, the current block can also refer to the reference samples in the bottom-right 64×64 block of the left CTU, using CPR mode.

If current block falls into the bottom-right 64×64 block of the current CTU, it can only refer to the already reconstructed samples in the current CTU, using CPR mode.

This restriction allows the IBC mode to be implemented using local on-chip memory for hardware implementations.

Local Illumination Compensation (LIC) in ECM

LIC is an inter prediction technique to model local illumination variation between current block and its prediction block as a function of that between current block template and reference block template. The parameters of the function can be denoted by a scale a and an offset $\beta$, which forms a linear equation, that is, $\alpha*p[x]+\beta$ to compensate illumination changes, where p[x] is a reference sample pointed to by MV at a location x on reference picture. Since $\alpha$ and $\beta$ can be derived based on current block template and reference block template, no signaling overhead is required for them, except that an LIC flag is signaled for AMVP mode to indicate the use of LIC.

The local illumination compensation proposed in JVET-O0066 is used for uni-prediction inter CUs with the following modifications.

Intra neighbor samples can be used in LIC parameter derivation;

LIC is disabled for blocks with less than 32 luma samples;

For both non-subblock and affine modes, LIC parameter derivation is performed based on the template block samples corresponding to the current CU, instead of partial template block samples corresponding to first top-left 16×16 unit;

Samples of the reference block template are generated by using MC with the block MV without rounding it to integer-pel precision.

Non-Adjacent Spatial Candidate in ECM

Figure 21:
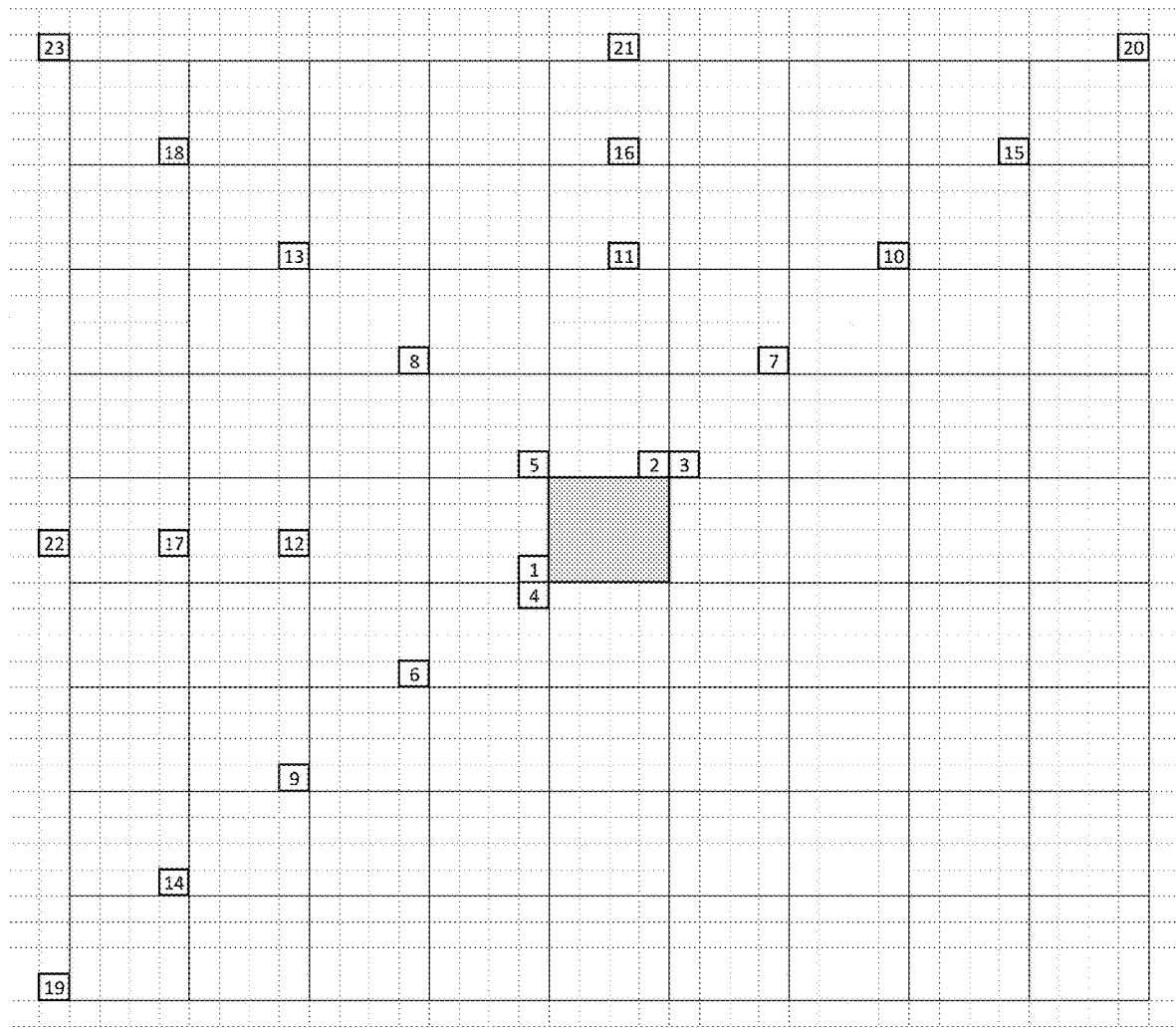
FIG. 21 illustrates an example of spatial neighboring blocks used to derive the spatial merge candidates in accordance with some implementations of the present disclosure.

The non-adjacent spatial merge candidates as in JVET-L0399 are inserted after the TMVP in the regular merge candidate list. The pattern of spatial merge candidates is shown in FIG. 21. The distances between non-adjacent spatial candidates and current coding block are based on the width and height of current coding block. The line buffer restriction is not applied.

Template Matching (TM) in ECM

Figure 22:
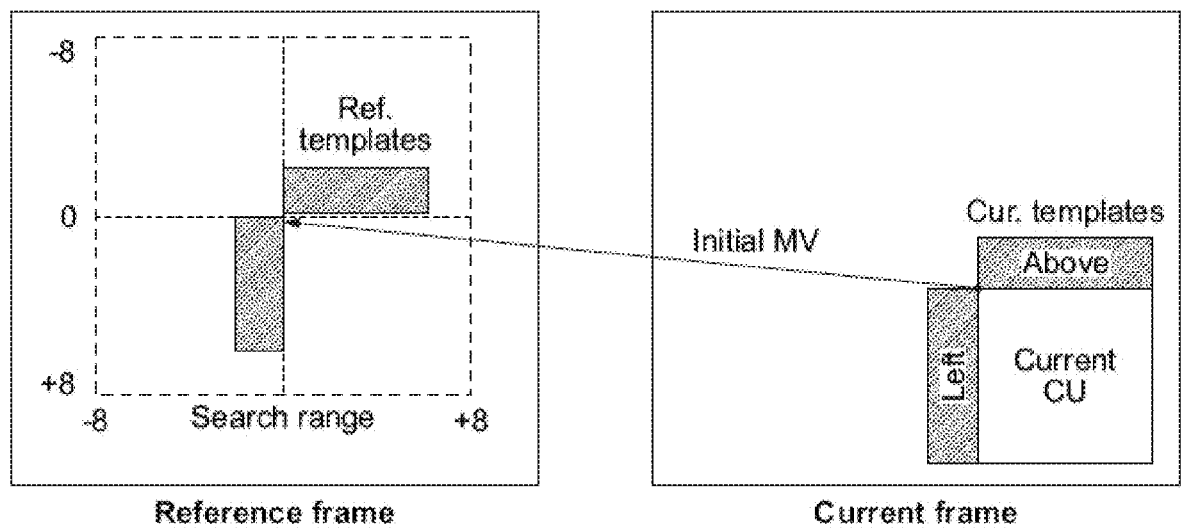
FIG. 22 illustrates an example of template matching performs on a search area around initial MV in accordance with some implementations of the present disclosure.

Template matching (TM) is a decoder-side MV derivation method to refine the motion information of the current CU by finding the closest match between a template (i.e., top and/or left neighbouring blocks of the current CU) in the current picture and a block (i.e., same size to the template) in a reference picture. As illustrated in FIG. 22, a better MV is searched around the initial motion of the current CU within a [−8, +8]-pel search range. The template matching method in JVET-J0021 is used with the following modifications: search step size is determined based on AMVR mode and TM can be cascaded with bilateral matching process in merge modes.

In AMVP mode, an MVP candidate is determined based on template matching error to select the one which reaches the minimum difference between the current block template and the reference block template, and then TM is performed only for this particular MVP candidate for MV refinement. TM refines this MVP candidate, starting from full-pel MVD precision (or 4-pel for 4-pel AMVR mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode as specified in Table 3. This search process ensures that the MVP candidate still keeps the same MV precision as indicated by the AMVR mode after TM process.

TABLE 3

Search patterns of AMVR and merge mode with AMVR.

| Search pattern | AMVR mode | | | | Merge mode | |
| --- | --- | --- | --- | --- | --- | --- |
| | 4-pel | Full-pel | Half-pel | Quarter-pel | AltIF = 0 | AltIF = 1 |
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| ⅛-pel cross | | | | | v | |

In merge mode, similar search method is applied to the merge candidate indicated by the merge index. As Table 3 shows, TM may perform all the way down to ⅛-pel MVD precision or skipping those beyond half-pel MVD precision, depending on whether the alternative interpolation filter (that is used when AMVR is of half-pel mode) is used according to merged motion information. Besides, when TM mode is enabled, template matching may work as an independent process or an extra MV refinement process between block-based and subblock-based bilateral matching (BM) methods, depending on whether BM can be enabled or not according to its enabling condition check.

Multi-Pass Decoder-Side Motion Vector Refinement in ECM

A multi-pass decoder-side motion vector refinement is applied. In the first pass, bilateral matching (BM) is applied to the coding block. In the second pass, BM is applied to each 16×16 subblock within the coding block. In the third pass, MV in each 8×8 subblock is refined by applying bi-directional optical flow (BDOF). The refined MVs are stored for both spatial and temporal motion vector prediction.

First Pass—Block Based Bilateral Matching MV Refinement

In the first pass, a refined MV is derived by applying BM to a coding block. Similar to decoder-side motion vector refinement (DMVR), in bi-prediction operation, a refined MV is searched around the two initial MVs (MV0 and MV1) in the reference picture lists L0 and L1. The refined MVs (MV0_pass1 and MV1_pass1) are derived around the initiate MVs based on the minimum bilateral matching cost between the two reference blocks in L0 and L1.

BM performs local search to derive integer sample precision intDeltaMV. The local search applies a 3×3 square search pattern to loop through the search range [−sHor, sHor] in horizontal direction and [−sVer, sVer] in vertical direction, wherein, the values of sHor and sVer are determined by the block dimension, and the maximum value of sHor and sVer is 8.

The bilateral matching cost is calculated as: bilCost=mvDistanceCost+sadCost. When the block size cbW*cbH is greater than 64, MRSAD cost function is applied to remove the DC effect of distortion between reference blocks. When the bilCost at the center point of the 3×3 search pattern has the minimum cost, the intDeltaMV local search is terminated. Otherwise, the current minimum cost search point becomes the new center point of the 3×3 search pattern and continue to search for the minimum cost, until it reaches the end of the search range.

The existing fractional sample refinement is further applied to derive the final deltaMV. The refined MVs after the first pass is then derived as:

$$-\text{MV0\_pass1} = MV0 + deltaMV$$

$$-\text{MV1\_pass1} = MV1 - deltaMV$$

Second Pass—Subblock Based Bilateral Matching MV Refinement

In the second pass, a refined MV is derived by applying BM to a 16×16 grid subblock. For each subblock, a refined MV is searched around the two MVs (MV0_pass1 and MV1_pass1), obtained on the first pass, in the reference picture list L0 and L1. The refined MVs (MV0_pass2(sbIdx2) and MV1_pass2(sbIdx2)) are derived based on the minimum bilateral matching cost between the two reference subblocks in L0 and L1.

For each subblock, BM performs full search to derive integer sample precision intDeltaMV. The full search has a search range [−sHor, sHor] in horizontal direction and [−sVer, sVer] in vertical direction, wherein, the values of sHor and sVer are determined by the block dimension, and the maximum value of sHor and sVer is 8.

Figure 23:
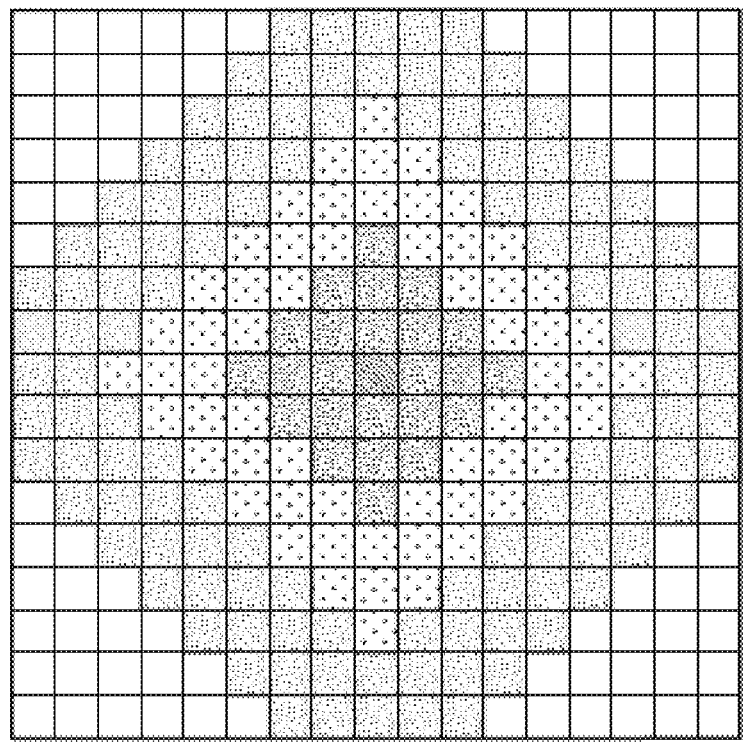
FIG. 23 illustrates an example of diamond regions in the search area in accordance with some implementations of the present disclosure.

The bilateral matching cost is calculated by applying a cost factor to the SATD cost between two reference subblocks, as: bilCost=satdCost*costFactor. The search area (2*sHor+1)*(2*sVer+1) is divided up to 5 diamond shape search regions shown on FIG. 23. Each search region is assigned a costFactor, which is determined by the distance (intDeltaMV) between each search point and the starting MV, and each diamond region is processed in the order starting from the center of the search area. In each region, the search points are processed in the raster scan order starting from the top left going to the bottom right corner of the region. When the minimum bilCost within the current search region is less than a threshold equal to sbW*sbH, the int-pel full search is terminated, otherwise, the int-pel full search continues to the next search region until all search points are examined.

The existing VVC DMVR fractional sample refinement is further applied to derive the final deltaMV(sbIdx2). The refined MVs at second pass is then derived as:

−MV0_pass2($sbIdx2$) = MV0_pass1 + $deltaMV$($sbIdx2$)

−MV1_pass2($sbIdx2$) = MV1_pass1 + $deltaMV$($sbIdx2$)

Third Pass—Subblock Based Bi-Directional Optical Flow MV Refinement

In the third pass, a refined MV is derived by applying BDOF to an 8×8 grid subblock. For each 8×8 subblock, BDOF refinement is applied to derive scaled Vx and Vy without clipping starting from the refined MV of the parent subblock of the second pass. The derived bioMv(Vx, Vy) is rounded to 1/16 sample precision and clipped between −32 and 32.

OBMC in ECM

When OBMC is applied, top and left boundary pixels of a CU are refined using neighboring block's motion information with a weighted prediction as described in JVET-L0101.

Conditions of not applying OBMC are as follows:
When OBMC is disabled at SPS level
When current block has intra mode or IBC mode
When current block applies LIC
When current luma block area is smaller or equal to 32

A subblock-boundary OBMC is performed by applying the same blending to the top, left, bottom, and right subblock boundary pixels using neighboring subblocks' motion information. It is enabled for the subblock based coding tools:
Affine AMVP modes;
Affine merge modes and subblock-based temporal motion vector prediction (SbTMVP);
Subblock-based bilateral matching.

Sample-Based BDOF in ECM

In the sample-based BDOF, instead of deriving motion refinement (Vx, Vy) on a block basis, it is performed per sample.

The coding block is divided into 8×8 subblocks. For each subblock, whether to apply BDOF or not is determined by checking the SAD between the two reference subblocks against a threshold. If decided to apply BDOF to a subblock, for every sample in the subblock, a sliding 5×5 window is used and the existing BDOF process is applied for every sliding window to derive Vx and Vy. The derived motion refinement (Vx, Vy) is applied to adjust the bi-predicted sample value for the center sample of the window.

Interpolation in ECM

Figure 24:
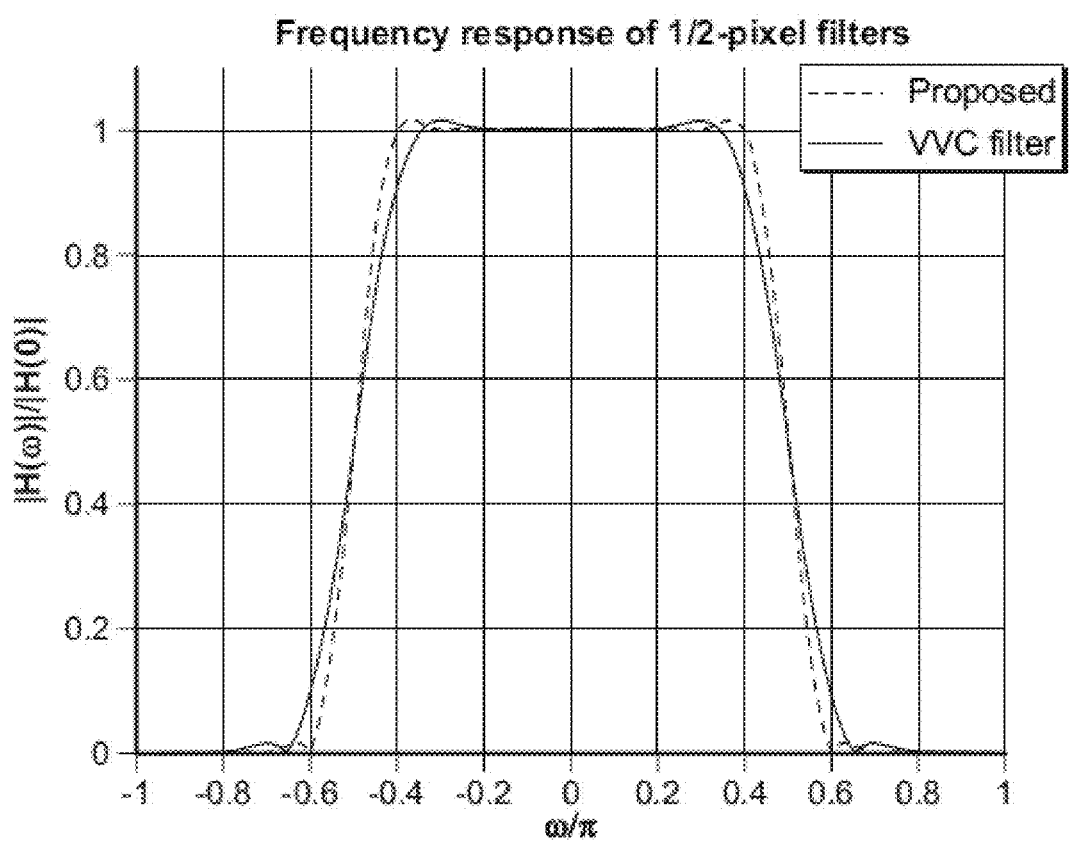
FIG. 24 illustrates frequency responses of the interpolation filter and the VVC interpolation filter at half-pel phase in accordance with some implementations of the present disclosure.

The 8-tap interpolation filter used in VVC is replaced with a 12-tap filter. The interpolation filter is derived from the sinc function of which the frequency response is cut off at Nyquist frequency, and cropped by a cosine window function. Table 4 gives the filter coefficients of all 16 phases. FIG. 24 compares the frequency responses of the interpolation filters with the VVC interpolation filter, all at half-pel phase.

TABLE 4

| Filter coefficients of the 12-tap interpolation filter | | | | | | | | | | | | |
|---|---|---|---|---|---|---|---|---|---|---|---|---|
| 1/16 | −1 | 2 | −3 | 6 | −14 | 254 | 16 | −7 | 4 | −2 | 1 | 0 |
| 2/16 | −1 | 3 | −7 | 12 | −26 | 249 | 35 | −15 | 8 | −4 | 2 | 0 |
| 3/16 | −2 | 5 | −9 | 17 | −36 | 241 | 54 | −22 | 12 | −6 | 3 | −1 |
| 4/16 | −2 | 5 | −11 | 21 | −43 | 230 | 75 | −29 | 15 | −8 | 4 | −1 |
| 5/16 | −2 | 6 | −13 | 24 | −48 | 216 | 97 | −36 | 19 | −10 | 4 | −1 |
| 6/16 | −2 | 7 | −14 | 25 | −51 | 200 | 119 | −42 | 22 | −12 | 5 | −1 |
| 7/16 | −2 | 7 | −14 | 26 | −51 | 181 | 140 | −46 | 24 | −13 | 6 | −2 |
| 8/16 | −2 | 6 | −13 | 25 | −50 | 162 | 162 | −50 | 25 | −13 | 6 | −2 |
| 9/16 | −2 | 6 | −13 | 24 | −46 | 140 | 181 | −51 | 26 | −14 | 7 | −2 |
| 10/16 | −1 | 5 | −12 | 22 | −42 | 119 | 200 | −51 | 25 | −14 | 7 | −2 |
| 11/16 | −1 | 4 | −10 | 19 | −36 | 97 | 216 | −48 | 24 | −13 | 6 | −2 |
| 12/16 | −1 | 4 | −8 | 15 | −29 | 75 | 230 | −43 | 21 | −11 | 5 | −2 |
| 13/16 | −1 | 3 | −6 | 12 | −22 | 54 | 241 | −36 | 17 | −9 | 5 | −2 |
| 14/16 | 0 | 2 | −4 | 8 | −15 | 35 | 249 | −26 | 12 | −7 | 3 | −1 |
| 15/16 | 0 | 1 | −2 | 4 | −7 | 16 | 254 | −14 | 6 | −3 | 2 | −1 |

The refined MVs (MV0_pass3(sbIdx3) and MV1_pass3(sbIdx3)) at third pass are derived as:

−MV0_pass3($sbIdx3$) = MV0_pass2($sbIdx2$) + $bioMv$

−MV1_pass3($sbIdx3$) = MV0_pass2($sbIdx2$) − $bioMv$

Multi-Hypothesis Prediction (MHP) in ECM

In the multi-hypothesis inter prediction mode (JVET-M0425), one or more additional motion-compensated prediction signals are signaled, in addition to the conventional bi prediction signal. The resulting overall prediction signal is obtained by sample-wise weighted superposition. With the bi prediction signal $p_{bi}$ and the first additional inter prediction signal/hypothesis $h_3$, the resulting prediction signal $p_3$ is obtained as follows:

$$p_3 = (1-\alpha)p_{bi} + \alpha h_3$$

The weighting factor α is specified by the new syntax element add_hyp_weight_idx, according to the following mapping:

| add_hyp_weight_idx | α |
|---|---|
| 0 | ¼ |
| 1 | −⅛ |

Analogously to above, more than one additional prediction signal can be used. The resulting overall prediction signal is accumulated iteratively with each additional prediction signal.

$$p_{n+1} = (1-\alpha_{n+1})p_n + \alpha_{n+1}h_{n+1}$$

The resulting overall prediction signal is obtained as the last $p_n$ (i.e., the $p_n$ having the largest index n). Within this EE, up to two additional prediction signals can be used (i.e., n is limited to 2).

The motion parameters of each additional prediction hypothesis can be signaled either explicitly by specifying the reference index, the motion vector predictor index, and the motion vector difference, or implicitly by specifying a merge index. A separate multi-hypothesis merge flag distinguishes between these two signalling modes.

For inter AMVP mode, MHP is only applied if non-equal weight in BCW is selected in bi-prediction mode.

Combination of MHP and BDOF is possible, however the BDOF is only applied to the bi-prediction signal part of the prediction signal (i.e., the ordinary first two hypotheses).

Adaptive Reordering of Merge Candidates with Template Matching (ARMC-TM) in ECM

The merge candidates are adaptively reordered with template matching (TM). The reordering method is applied to regular merge mode, template matching (TM) merge mode, and affine merge mode (excluding the SbTMVP candidate). For the TM merge mode, merge candidates are reordered before the refinement process.

After a merge candidate list is constructed, merge candidates are divided into several subgroups. The subgroup size is set to 5 for regular merge mode and TM merge mode. The subgroup size is set to 3 for affine merge mode. Merge candidates in each subgroup are reordered ascendingly according to cost values based on template matching. For simplification, merge candidates in the last but not the first subgroup are not reordered.

The template matching cost of a merge candidate is measured by the sum of absolute differences (SAD) between samples of a template of the current block and their corresponding reference samples. The template comprises a set of reconstructed samples neighboring to the current block. Reference samples of the template are located by the motion information of the merge candidate.

Figure 25:
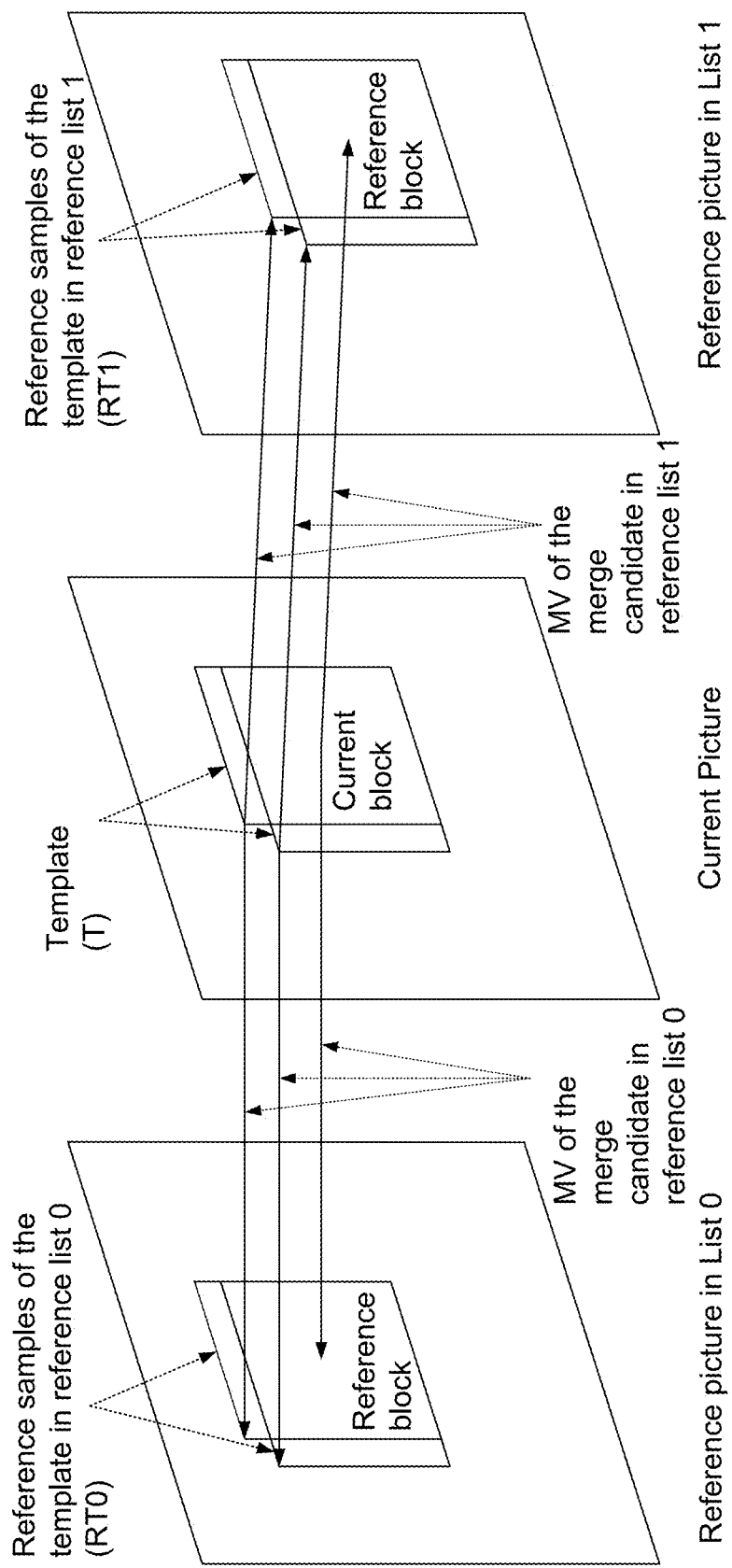
FIG. 25 illustrates an example of template and reference samples of the template in reference pictures in accordance with some implementations of the present disclosure.

When a merge candidate utilizes bi-directional prediction, the reference samples of the template of the merge candidate are also generated by bi-prediction as shown in FIG. 25.

Figure 26:
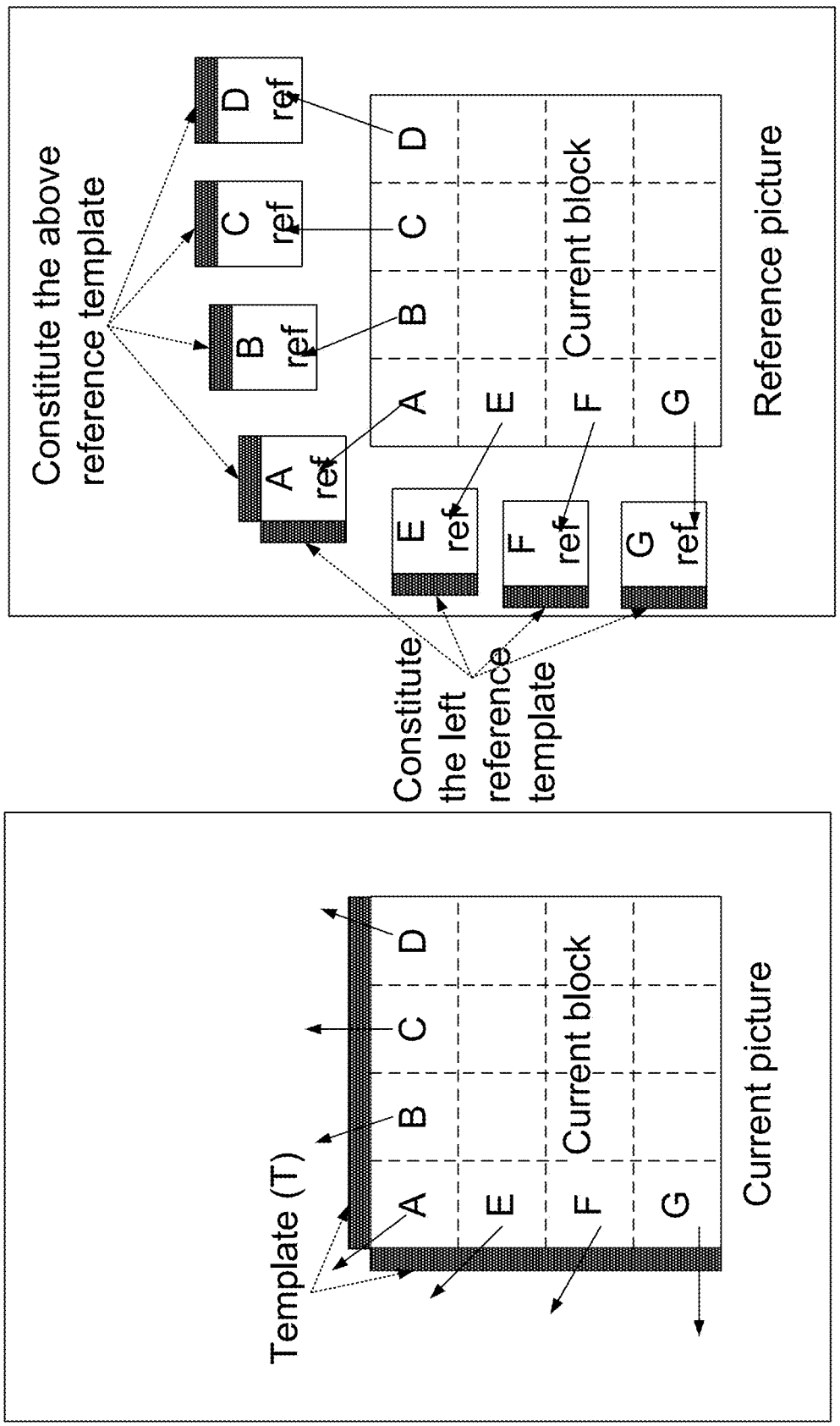
FIG. 26 illustrates an example of template and reference samples of the template for block with sub-block motion using the motion information of the subblocks of the current block in accordance with some implementations of the present disclosure.

For subblock-based merge candidates with subblock size equal to Wsub×Hsub, the above template comprises several sub-templates with the size of Wsub×1, and the left template comprises several sub-templates with the size of 1×Hsub. As shown in FIG. 26, the motion information of the subblocks in the first row and the first column of current block is used to derive the reference samples of each sub-template.

Geometric Partitioning Mode (GPM) with Merge Motion Vector Differences (MMVD) in ECM GPM in VVC is extended by applying motion vector refinement on top of the existing GPM uni-directional MVs. A flag is first signaled for a GPM CU, to specify whether this mode is used. If the mode is used, each geometric partition of a GPM CU can further decide whether to signal MVD or not. If MVD is signaled for a geometric partition, after a GPM merge candidate is selected, the motion of the partition is further refined by the signaled MVDs information. All other procedures are kept the same as in GPM.

The MVD is signaled as a pair of distance and direction, similar as in MMVD. There are nine candidate distances (¼-pel, ½-pel, 1-pel, 2-pel, 3-pel, 4-pel, 6-pel, 8-pel, 16-pel), and eight candidate directions (four horizontal/vertical directions and four diagonal directions) involved in GPM with (GPM-MMVD). MMVD In addition, when pic_fpel_mmvd_enabled_flag is equal to 1, the MVD is left shifted by 2 as in MMVD.

Geometric Partitioning Mode (GPM) with Template Matching (TM) in ECM

Template matching is applied to GPM. When GPM mode is enabled for a CU, a CU-level flag is signaled to indicate whether TM is applied to both geometric partitions. Motion information for each geometric partition is refined using TM. When TM is chosen, a template is constructed using left, above or left and above neighboring samples according to partition angle, as shown in Table 5. The motion is then refined by minimizing the difference between the current template and the template in the reference picture using the same search pattern of merge mode with half-pel interpolation filter disabled.

TABLE 5

Template for the 1st and 2nd geometric partitions, where A represents using above samples, L represents using left samples, and L + A represents using both left and above samples.

| Partition angle | 0 | 2 | 3 | 4 | 5 | 8 | 11 | 12 | 13 | 14 |
|---|---|---|---|---|---|---|---|---|---|---|
| 1st partition | A | A | A | A | L + A | L + A | L + A | L + A | A | A |
| 2nd partition | L + A | L + A | L + A | L | L | L | L | L + A | L + A | L + A |
| Partition angle | 16 | 18 | 19 | 20 | 21 | 24 | 27 | 28 | 29 | 30 |
| 1st partition | A | A | A | A | L + A | L + A | L + A | L + A | A | A |
| 2nd partition | L + A | L + A | L + A | L | L | L | L | L + A | L + A | L + A |

A GPM candidate list is constructed as follows:

1. Interleaved List-0 MV candidates and List-1 MV candidates are derived directly from the regular merge candidate list, where List-0 MV candidates are higher priority than List-1 MV candidates. A pruning method with an adaptive threshold based on the current CU size is applied to remove redundant MV candidates.

2. Interleaved List-1 MV candidates and List-0 MV candidates are further derived directly from the regular merge candidate list, where List-1 MV candidates are higher priority than List-0 MV candidates. The same pruning method with the adaptive threshold is also applied to remove redundant MV candidates.

3. Zero MV candidates are padded until the GPM candidate list is full.

The GPM-MMVD and GPM-TM are exclusively enabled to one GPM CU. This is done by firstly signaling the GPM-MMVD syntax. When both two GPM-MMVD control flags are equal to false (i.e., the GPM-MMVD are disabled for two GPM partitions), the GPM-TM flag is signaled to indicate whether the template matching is applied to the two GPM partitions. Otherwise (at least one GPM-MMVD flag is equal to true), the value of the GPM-TM flag is inferred to be false.

Partitioning of the Picture into CTUs

Figure 31:
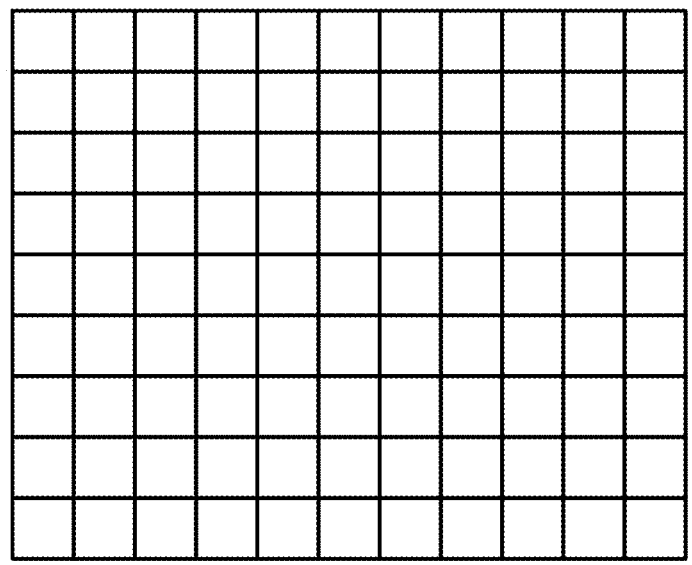
FIG. 31 illustrates an example of a picture divided into CTUs in accordance with some implementations of the present disclosure.

Pictures are divided into a sequence of coding tree units (CTUs). The CTU concept is same to that of the HEVC [6][7]. For a picture that has three sample arrays, a CTU consists of an N×N block of luma samples together with two corresponding blocks of chroma samples. FIG. 31 shows the example of a picture divided into CTUs.

The maximum allowed size of the luma block in a CTU is specified to be 128×128 (although the maximum size of the luma transform blocks is 64×64).

Partitioning of Pictures into Subpictures, Slices, Tiles

A picture is divided into one or more tile rows and one or more tile columns. A tile is a sequence of CTUs that covers a rectangular region of a picture.

A slice consists of an integer number of complete tiles or an integer number of consecutive complete CTU rows within a tile of a picture.

Two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture contains one or more slices that collectively cover a rectangular region of a picture.

Figure 32:
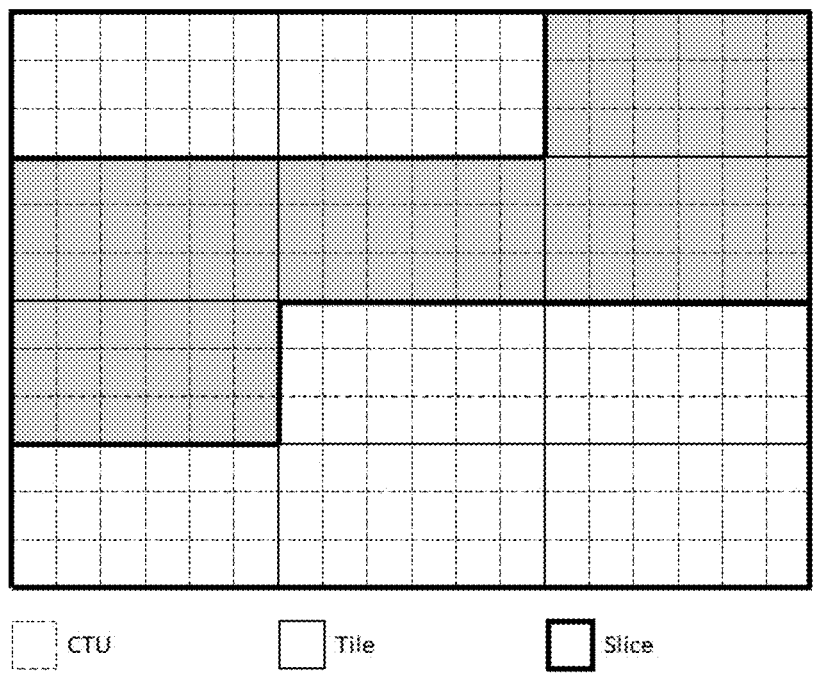
FIG. 32 illustrates an example of a picture partitioned into tiles and raster-scan slices in accordance with some implementations of the present disclosure.

FIG. 32 shows an example of raster-scan slice partitioning of a picture, where the picture is divided into 12 tiles and 3 raster-scan slices.

Figure 33:
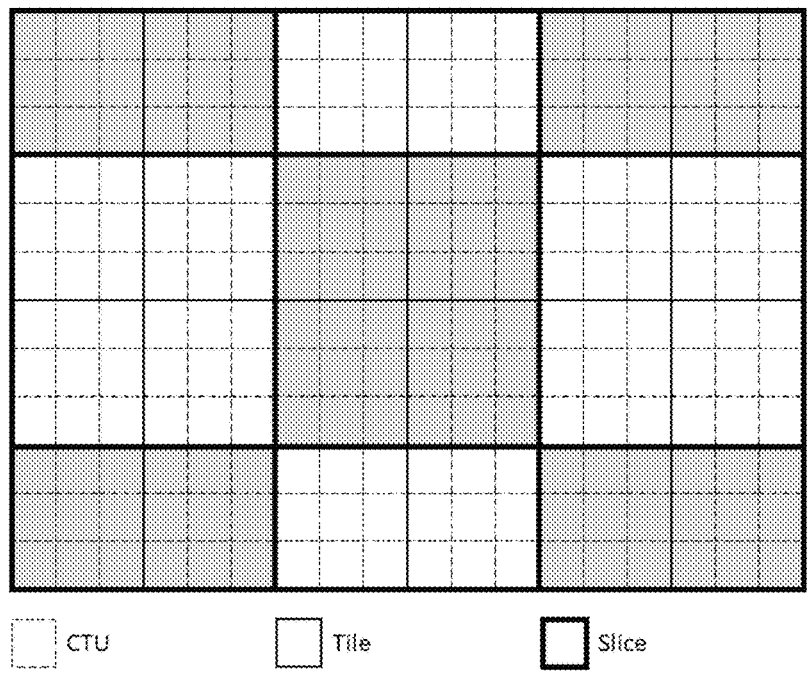
FIG. 33 illustrates an example of a picture partitioned into tiles and rectangular slices in accordance with some implementations of the present disclosure.

FIG. 33 shows an example of rectangular slice partitioning of a picture, where the picture is divided into 24 tiles (6 tile columns and 4 tile rows) and 9 rectangular slices.

Figure 34:
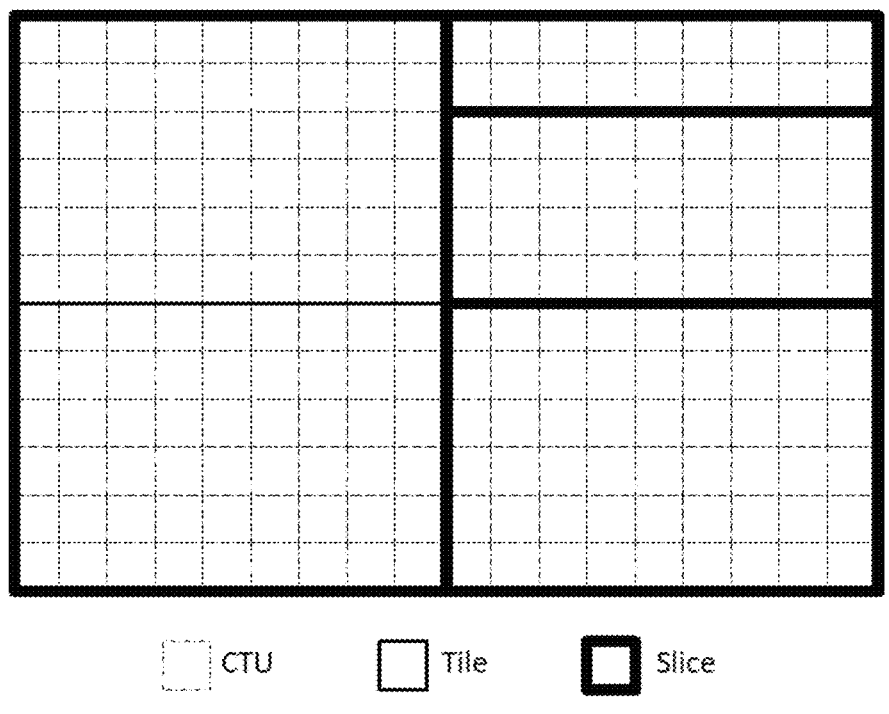
FIG. 34 illustrates an example of a picture partitioned into 4 tiles and 4 rectangular slices in accordance with some implementations of the present disclosure.

FIG. 34 shows an example of a picture partitioned into tiles and rectangular slices, where the picture is divided into 4 tiles (2 tile columns and 2 tile rows) and 4 rectangular slices.

Figure 35:
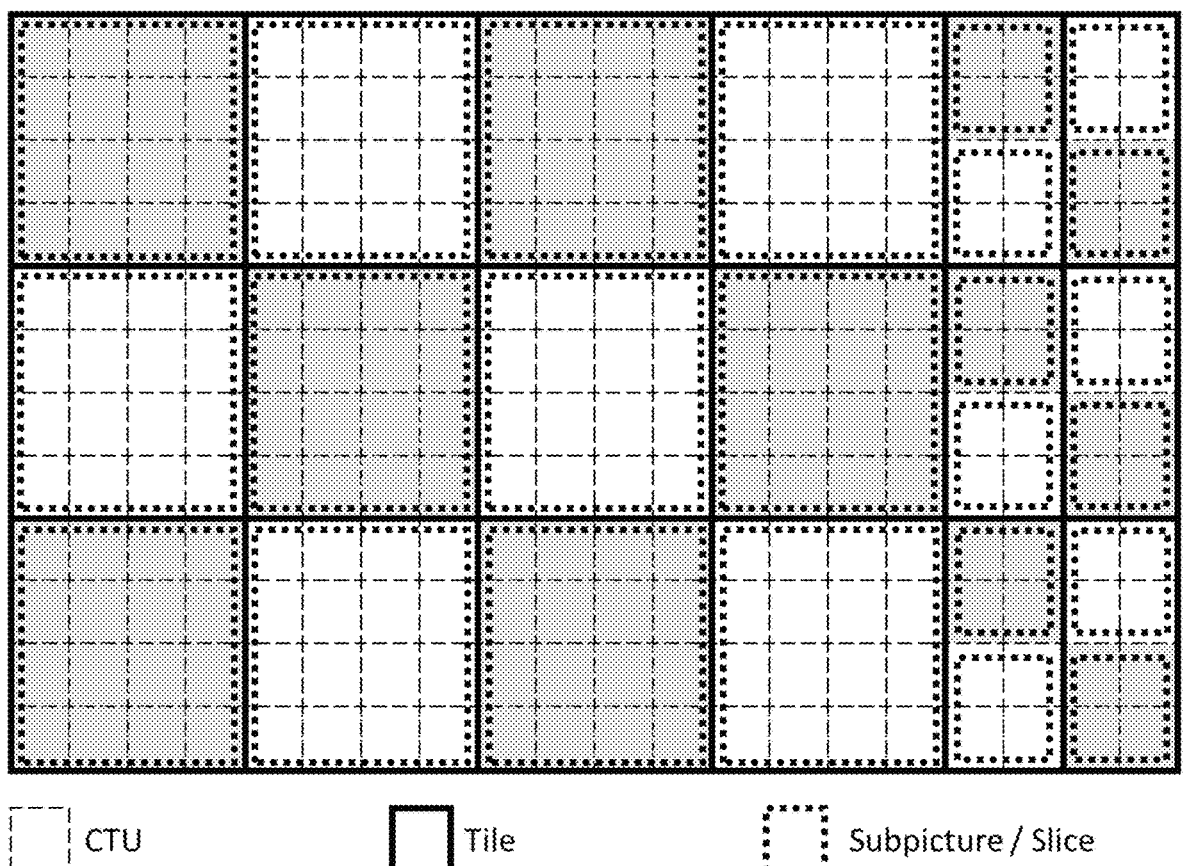
FIG. 35 illustrates an example of a picture partitioned into 28 subpictures in accordance with some implementations of the present disclosure.

FIG. 35 shows an example of subpicture partitioning of a picture, where a picture is partitioned into 18 tiles, 12 on the left-hand side each covering one slice of 4 by 4 CTUs and 6 tiles on the right-hand side each covering 2 vertically-stacked slices of 2 by 2 CTUs, altogether resulting in 24 slices and 24 subpictures of varying dimensions (each slice is a subpicture).

360-Degree Video Coding Tools

Horizontal Wrap Around Motion Compensation

The horizontal wrap around motion compensation in the VTM10 is a 360-specific coding tool designed to improve the visual quality of reconstructed 360-degree video in the equi-rectangular (ERP) projection format [5]. In conventional motion compensation, when a motion vector refers to samples beyond the picture boundaries of the reference picture, repetitive padding is applied to derive the values of the out-of-bounds samples by copying from those nearest neighbors on the corresponding picture boundary. For 360-degree video, this method of repetitive padding is not suitable, and could cause visual artefacts called "seam artefacts" in a reconstructed viewport video. Because a 360-degree video is captured on a sphere and inherently has no "boundary," the reference samples that are out of the boundaries of a reference picture in the projected domain can always be obtained from neighboring samples in the spherical domain. For a general projection format, it may be difficult to derive the corresponding neighboring samples in the spherical domain, because it involves 2D-to-3D and 3D-to-2D coordinate conversion [5], as well as sample interpolation for fractional sample positions. This problem is much simpler for the left and right boundaries of the ERP projection format, as the spherical neighbors outside of the left picture boundary can be obtained from samples inside the right picture boundary, and vice versa. Given the wide usage of the ERP projection format, and the relative ease of implementation, the horizontal wrap around motion compensation was adopted in the VVC to improve the visual quality of 360-video coded in the ERP projection format.

Figure 36:
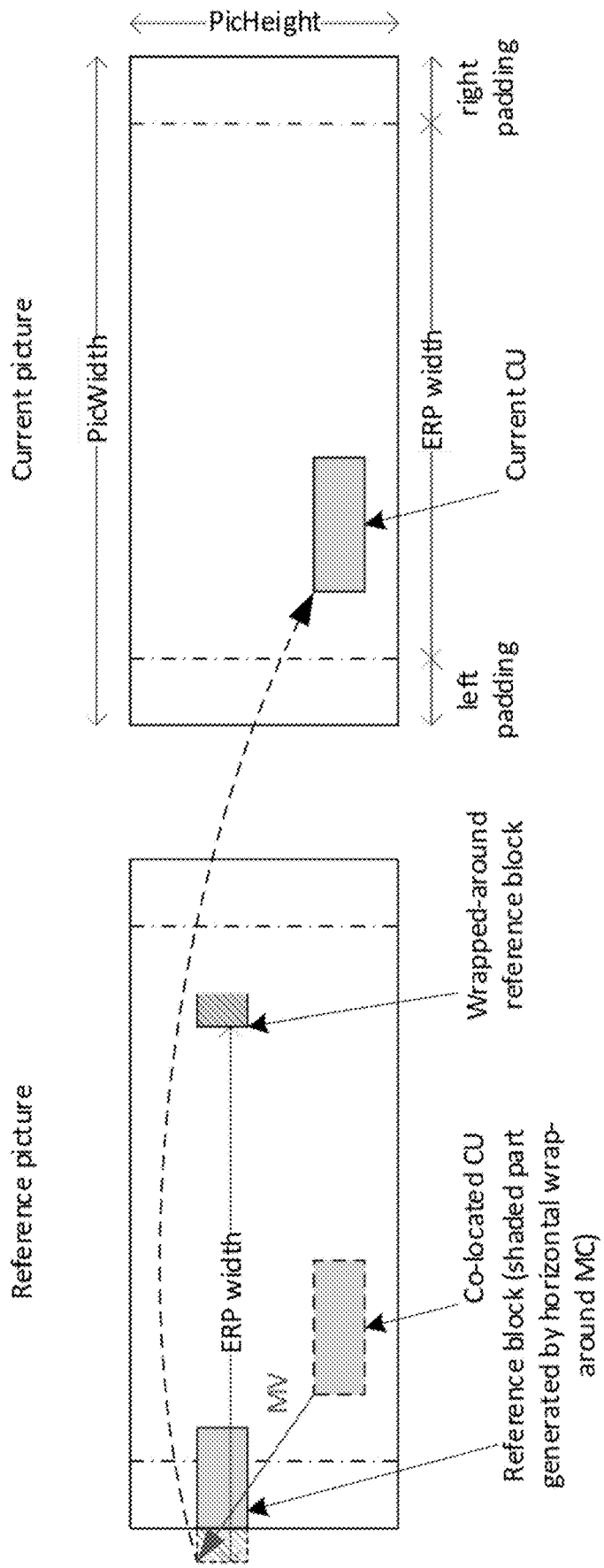
FIG. 36 illustrates an example of horizontal wrap around motion compensation in VVC in accordance with some implementations of the present disclosure.

The horizontal wrap around motion compensation process is as depicted in FIG. 36. When a part of the reference block is outside of the reference picture's left (or right) boundary in the projected domain, instead of repetitive padding, the "out-of-boundary" part is taken from the corresponding spherical neighbors that are located within the reference picture toward the right (or left) boundary in the projected domain. Repetitive padding is only used for the top and bottom picture boundaries. As depicted in FIG. 36, the horizontal wrap around motion compensation can be combined with the non-normative padding method often used in 360-degree video coding (see padded ERP in [5]). In VVC, this is achieved by signaling a high level syntax element to indicate the wrap-around offset, which should be set to the ERP picture width before padding; this syntax is used to adjust the position of horizontal wrap around accordingly. This syntax is not affected by the specific amount of padding on the left and right picture boundaries, and therefore naturally supports asymmetric padding of the ERP picture, i.e., when left and right padding are different. The horizontal wrap around motion compensation provides more meaningful information for motion compensation when the reference samples are outside of the reference picture's left and right boundaries. Under the 360 video CTC [4], this tool improves compression performance not only in terms of rate-distortion performance, but also in terms of reduced seam artefacts and improved subjective quality of the reconstructed 360-degree video. The horizontal wrap around motion compensation can also be used for other single face projection formats with constant sampling density in the horizontal direction, such as adjusted equal-area projection in 360Lib [5].

TABLE 6

Luma integer sample fetching process in VVC.

8.5.6.3.3 Luma integer sample fetching process
Inputs to this process are:
- a luma location in full-sample units ( xInt$_L$, yInt$_L$ ),
- the luma reference sample array refPicLX$_L$,
- a variable refWraparoundEnabledFlag indicating whether horizontal wrap-around
  motion compensation is enabled.
Output of this process is a predicted luma sample value predSampleLX$_L$
The variable shift is set equal to Max( 2, 14 − BitDepth ).
The variable picW is set equal to pps_pic_width_in_luma_samples of the reference picture
refPicLX and the variable picH is set equal to pps_pic_height_in_luma_samples of the
reference picture refPicLX.
The luma locations in full-sample units ( xInt, yInt ) are derived as follows:
- If sps_subpic_treated_as_pic_flag[ CurrSubpicIdx ] is equal to 1 and
  sps_num_subpics_minus1 for the reference picture refPicLX is greater than 0, the
  following applies:
    xInt = Clip3( SubpicLeftBoundaryPos, SubpicRightBoundaryPos,
    refWraparoundEnabledFlag ?
      ClipH( ( PpsRefWraparoundOffset ) * MinCbSizeY, picW, xInt$_L$ ) : xInt$_L$ ) ({SEQ
    Equation \* ARABIC})
    yInt = Clip3( SubpicTopBoundaryPos, SubpicBotBoundaryPos, yInt$_L$ ) ({SEQ
    Equation \* ARABIC})
- Otherwise (sps_subpic_treated_as_pic_flag[ CurrSubpicIdx ] is equal to 0 or
  sps_num_subpics_minus1 for the reference picture refPicLX is equal to 0), the following
  applies:
    xInt = Clip3(0, picW − 1, refWraparoundEnabledFlag ?({SEQ Equation \*
    ARABIC})
      ClipH( ( PpsRefWraparoundOffset ) * MinCbSizeY, picW, xInt$_L$ ) : xInt$_L$ )
    yInt = Clip3( 0, picH − 1, yInt$_L$ ) ({SEQ Equation \* ARABIC})
The predicted luma sample value predSampleLX$_L$ is derived as follows:
predSampleLX$_L$ = refPicLX$_L$[ xInt ][ yInt ] << shift ({SEQ Equation \*
ARABIC})

In the existing video codec such as HEVC and VVC, the reference block of a inter mode coded CU (termed inter CU hereafter) may be located outside the reference picture partially or totally. This is because the repetitive padding process is applied to the reference pictures to generate the reference pixels surrounding each reference picture.

In the VVC spec., the padding process is implemented by changing the integer reference sample fetching process (as illustrated in Table 6). Whenever the to-be-fetched integer reference samples are located outside the reference picture, the nearest integer reference samples inside the reference picture are used instead.

Figure 27:
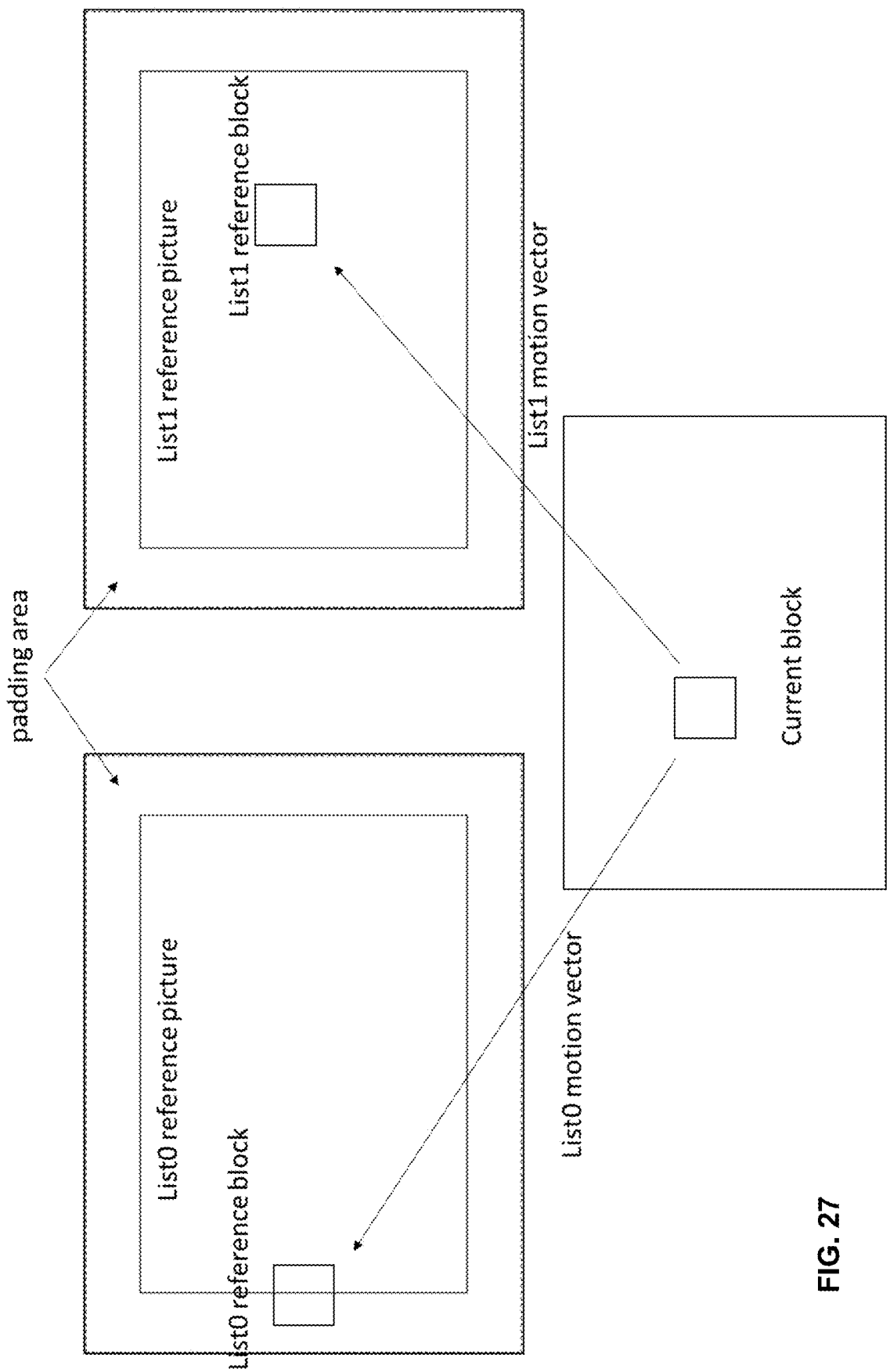
FIG. 27 illustrates an example of padded reference picture for motion compensation in accordance with some implementations of the present disclosure.

Due to the padded reference picture, it is valid for an inter CU to have a reference block located outside the reference picture partially or totally as illustrated in FIG. 27. In the FIG. 27, bi-directional motion compensated is performed to generate the inter prediction block of the current block. In this example, list0 reference block is partially out-of-boundary (OOB) while list 1 reference block is fully inside the reference picture.

When a inter block is bi-directional predicted or even multi-directional predicted, the final predictor is simply an average of the two or multiple motion compensated prediction blocks; when BWC is further applied, different weights are applied to the list and list1 MC predictors, respectively to generate the final predictors. However, the out-of-boundary (OOB) part of a motion compensated blocks has less effective prediction because the OOB part is simply repetitive pattern generated by the boundary pixels within the reference picture. Yet, in the existing video codec, the less effective OOB part of a MC block is not specially considered in the inter prediction. Similarly, in VVC, a wraparound motion compensation could also be used. Same issues may be observed in the scheme of wrap around MC.

In this disclosure, several methods are proposed to improve the inter prediction by considering the less effective OOB part of a MC block. Moreover, "block" is used to describe the concept of this disclosure and "block" may be easily replaced by any concreate definition used in existing codec. For example, "block" may be a coding unit (CU), prediction unit (PU), transform unit (TU), coding tree unit (CTU), coding block (CB), prediction block (PB), transform block (TB), coding tree block (CTB), sub-CU, sub-PU or any other well-defined terms in the existing codec.

The following methods may be applied independently or combinedly.

In one embodiment according to the present disclosure, when combining two or more than two prediction blocks generated by the motion compensation process, additional weightings are applied to the predictors; the additional weightings are derived based on whether the predictor sample is OOB or not. The basic concept is that when performing weighted average of two predictor blocks, less weights are given to the OOB predictor samples since they are less effective.

In one scheme, the final predictor samples of a bi-directional inter coded block is generated by weighted average of the predictors using the following equation:

$$P_{i,j}^{final} = \left(w_{i,j}^{L0} P_{i,j}^{L0} + w_{i,j}^{L1} P_{i,j}^{L1} + o_{offset}\right) \gg shift,$$

where $P_{i,j}^{L0}$ and $P_{i,j}^{L1}$ are the predictor samples derived from the motion compensation process from the list0 and list1 reference pictures, respectively; $w_{i,j}^{L0}$ and $w_{i,j}^{L1}$ are the weightings associated with the corresponding predictors derived by OOB conditions; shift is the averaging factor and is set to 1 when it is an averaging of two predictors, $o_{offset}$ is the rounding offset which is normally set as 1<<(shift−1).

Figure 28:
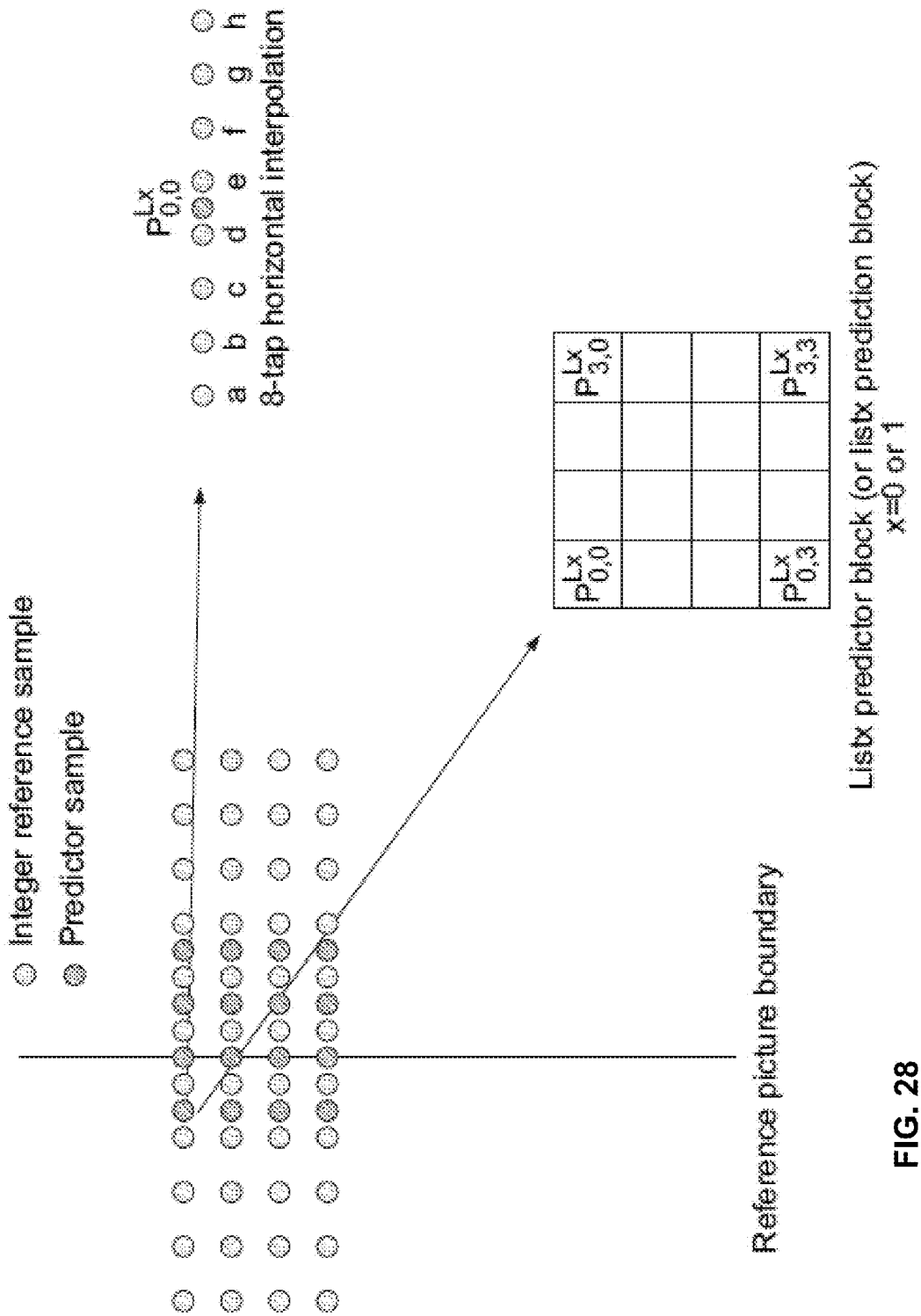
FIG. 28 illustrates an example of fractional interpolation in accordance with some implementations of the present disclosure.

As illustrated in the FIG. 28, the predictor samples of a block are derived by performing motion compensation from the reference picture. The motion vector of the current block is used to locate the reference block. It is noted that when the reference block is located at the fractional position between the integer reference samples, fractional sample interpolation process is further applied to derive the prediction samples. As illustrated in subclause 8.5.6.3.2 "Luma sample interpolation filtering process" in VVC, the fractional sample interpolation first performs vertically one-dimensional interpolation which access vertical neighboring 8 integer samples followed by horizontally one-dimensional interpolation which access horizontal neighboring 8 vertically interpolated samples. In the ECM, the 8-tap interpolation filter used in VVC is further replaced with a 12-tap filter.

Based on the motion compensation scheme as described above, a predictor sample $P_{i,j}^{Lx}$ is defined as OOB when at least one of the integer reference samples used to generate the predictor sample (through the interpolation process) is located outside the reference picture.

The weightings may be derived using the methods as below.

Figure 30:
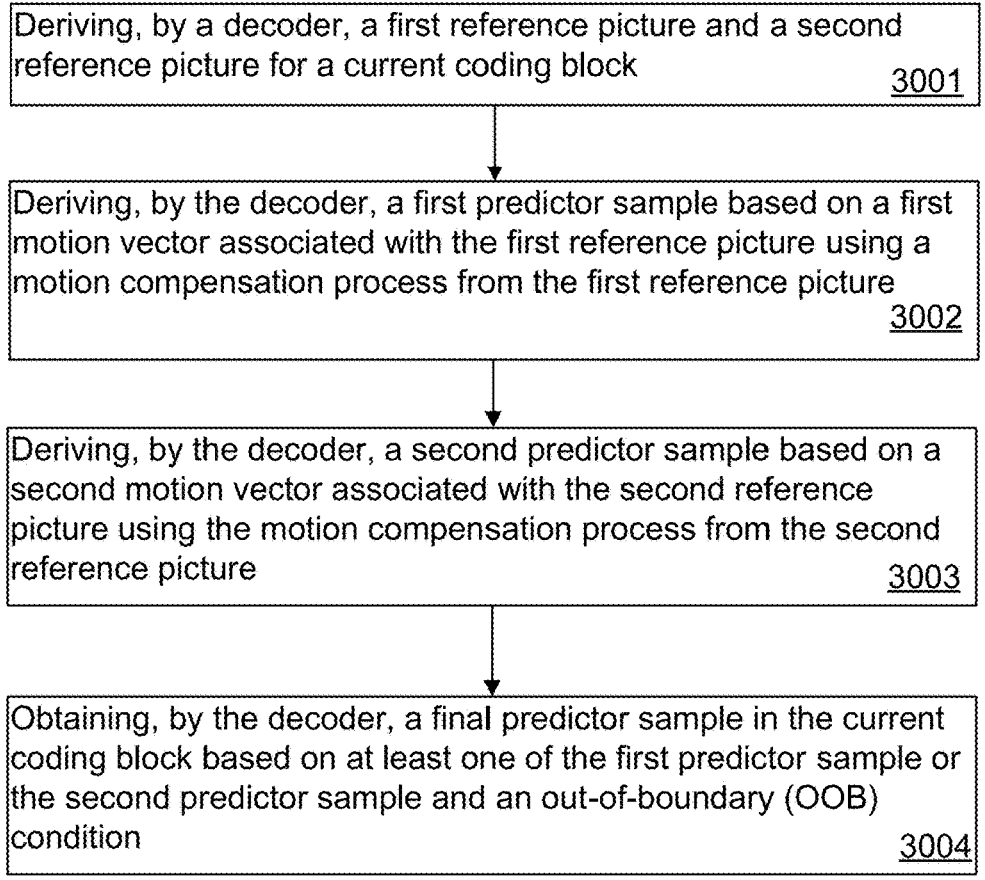
FIG. 30 is a block diagram showing a video coding process in accordance with some implementations of the present disclosure.

If $P_{i,j}^{L0}$ is determined as OOB and $P_{i,j}^{L1}$ is determined as NOT OOB
- $w_{i,j}^{L0}$ is set as 0
- $w_{i,j}^{L1}$ is set as 2
- (It is identical to $P_{i,j}^{final}=P_{i,j}^{L1}$)

else if $P_{i,j}^{L0}$ is determined as NOT OOB and $P_{i,j}^{L1}$ is determined as OOB
- $w_{i,j}^{L0}$ is set as 2
- $w_{i,j}^{L1}$ is set as 0
- (It is identical to $P_{i,j}^{final}=P_{i,j}^{L0}$)

else if $P_{i,j}^{L0}$ is determined as OOB and $P_{i,j}^{L1}$ is determined as OOB
- $w_{i,j}^{L0}$ is set as 1
- $w_{i,j}^{L1}$ is set as 1
- (It is identical to $(P_{i,j}^{final}=(P_{i,j}^{L0}+P_{i,j}^{L1}+1)>>1)$ else if $P_{i,j}^{L0}$ is determined as NOT OOB and $P_{i,j}^{L1}$ is determined as NOT OOB
- $w_{i,j}^{L0}$ is set as 1
- $w_{i,j}^{L1}$ is set as 1
- (It is identical to $(P_{i,j}^{final}=(P_{i,j}^{L0}+P_{i,j}^{L1}+1)>>1)$ FIG. 30 shows one example of the coding method in accordance with the present disclosure. In Step 3001, the decoder derives a first reference picture and a second reference picture for a current coding block. In Step 3002, the decoder derives a first predictor sample based on a first motion vector associated with the first reference picture using a motion compensation process from the first reference picture. In Step 3003, the decoder derives a second predictor sample based on a second motion vector associated with the second reference picture using the motion compensation process from the second reference picture. In Step 3004, the decoder obtains a final predictor sample in the current coding block based on at least one of the first predictor sample or the second predictor sample and an out-of-boundary (OOB) condition. The example method may be performed by an encoder as well.

In another embodiment of the present disclosure, when a block is coded as BCW mode which combines two prediction blocks generated by the motion compensation process with BCW weighted averaging, additional weightings are applied to the predictors; the additional weightings are derived based on whether the predictor is OOB or not. In one scheme, the final predictor samples of a BCW coded block are generated by weighted average of the predictors using the following equation:

$$P_{i,j}^{final} = \left((8-w)*w_{i,j}^{L0}P_{i,j}^{L0} + w*w_{i,j}^{L1}P_{i,j}^{L1} + o_{offset}\right)>>shift$$

where w is the BCW weighting, $P_{i,j}^{L0}$ and $P_{i,j}^{L1}$ are the predictor samples derived from the motion compensation process from the list 0 and list1 reference pictures, respectively; $w_{i,j}^{L0}$ and $w_{i,j}^{L1}$ are the weightings associated with the corresponding predictors derived by OOB conditions; shift is the averaging factor and is set to 3 to normalize the BCW weightings, $o_{offset}$ is the rounding offset which is normally set as 1<<(shift−1).

If $P_{i,j}^{L0}$ is determined as OOB and $P_{i,j}^{L1}$ is determined as NOT OOB
- $w_{i,j}^{L0}$ is set as 0
- $w_{i,j}^{L1}$ is set as 8/w
- (It is identical to $P_{i,j}^{final}=P_{i,j}^{L1}$)

else if $P_{i,j}^{L0}$ is determined as NOT OOB and $P_{i,j}^{L1}$ is determined as OOB
- $w_{i,j}^{L0}$ is set as 8/(8−w)
- $w_{i,j}^{L1}$ is set as 0
- (It is identical to $P_{i,j}^{final}=P_{i,j}^{L0}$)

else if $P_{i,j}^{L0}$ is determined as OOB and $P_{i,j}^{L1}$ is determined as OOB,
- $w_{i,j}^{L0}$ is set as 1
- $w_{i,j}^{L1}$ is set as 1
- (It is identical to $P_{i,j}^{final}=(8-w)*P_{i,j}^{L0}+w*P_{i,j}^{L1}+4)>>3$ else if $P_{i,j}^{L0}$ is determined as NOT OOB and $P_{i,j}^{L1}$ is determined as NOT OOB,
- $w_{i,j}^{L0}$ is set as 1
- $w_{i,j}^{L1}$ is set as 1
- (It is identical to $P_{i,j}^{final}=(8-w)*P_{i,j}^{L0}+w*P_{i,j}^{L1}+4)>>3$ In another embodiment of the present disclosure, when a BDOF is enabled for a block, additional weightings are applied to the predictors; the additional weightings are derived based on whether the predictor is OOB or not. In one scheme, the final predictor samples of a BDOF enabled block are generated by weighted average of the predictors using the following equation $$P_{i,j}^{final} = \left((w_{i,j}^{L0}P_{i,j}^{L0} + w_{i,j}^{L1}P_{i,j}^{L1} + o_{offset})>>shift\right) + B_{i,j}$$

where $B_{i,j}$ is the BDOF offset for each predictor sample, $P_{i,j}^{L0}$ and $P_{i,j}^{L1}$ are the predictor samples derived from the motion compensation process from the list 0 and list1 reference pictures, respectively; $w_{i,j}^{L0}$ and $w_{i,j}^{L1}$ are the weightings associated with the corresponding predictors derived by OOB conditions; shift is the averaging factor and is set to 1 when it is an averaging of two predictors, $o_{offset}$ is the rounding offset which is normally set as 1<<(shift−1).

If $P_{i,j}^{L0}$ is determined as OOB and $P_{i,j}^{L1}$ is determined as NOT OOB
- $w_{i,j}^{L0}$ is set as 0
- $w_{i,j}^{L1}$ is set as 1<<shift
- (It is identical to $P_{i,j}^{final}=P_{i,j}^{L1}+B_{i,j}$)

else if $P_{i,j}^{L0}$ is determined as NOT OOB and $P_{i,j}^{L1}$ is determined as OOB
- $w_{i,j}^{L0}$ is set as 1<<shift
- $w_{i,j}^{L1}$ is set as 0
- (It is identical to $P_{i,j}^{final}=P_{i,j}^{L0}+B_{i,j}$)

else if $P_{i,j}^{L0}$ is determined as OOB and $P_{i,j}^{L1}$ is determined as OOB
  $w_{i,j}^{L0}$ is set as 1
  $w_{i,j}^{L1}$ is set as 1
  (It is identical to $P_{i,j}^{final}=((P_{i,j}^{L0}+P_{i,j}^{L1}+o_{offset})>>shift)+B_{i,j}$ else if $P_{i,j}^{L0}$ is determined as NOT OOB and $P_{i,j}^{L1}$ is determined as NOT OOB
  $w_{i,j}^{L0}$ is set as 1
  $w_{i,j}^{L1}$ is set as 1
  (It is identical to $(P_{i,j}^{final}=((P_{i,j}^{L0}+P_{i,j}^{L1}+o_{offset})>>shift)+B_{i,j}$ In another embodiment of the present disclosure, when a BDOF is enabled for a block, additional weightings are applied to the predictors; the additional weightings are derived based on whether the predictor is OOB or not. In one scheme, the final predictor samples of a BDOF enabled block are generated by weighted average of the predictors using the following equation $$P_{i,j}^{final} = \left(\left(w_{i,j}^{L0}P_{i,j}^{L0} + w_{i,j}^{L1}P_{i,j}^{L1} + o_{offset}\right) \gg shift\right) + B_{i,j}$$

where $B_{i,j}$ is the BDOF offset for each predictor sample, $P_{i,j}^{L0}$ and $P_{i,j}^{L1}$ are the predictor samples derived from the motion compensation process from the list 0 and list1 reference pictures, respectively; $w_{i,j}^{L0}$ and $w_{i,j}^{L1}$ are the weightings associated with the corresponding predictors derived by OOB conditions; shift is the averaging factor and is set to 1 when it is an averaging of two predictors, $o_{offset}$ is the rounding offset which is normally set as $1<<(shift-1)$.

If $P_{i,j}^{L0}$ is determined as OOB and $P_{i,j}^{L1}$ is determined as NOT OOB
  $w_{i,j}^{L0}$ is set as 0
  $w_{i,j}^{L1}$ is set as $1<<shift$
  $B_{i,j}$ is set as 0
  (It is identical to $P_{i,j}^{final}=P_{i,j}^{L1}$)
else if $P_{i,j}^{L0}$ is determined as NOT OOB and $P_{i,j}^{L1}$ is determined as OOB
  $w_{i,j}^{L0}$ is set as $1<<shift$
  $w_{i,j}^{L1}$ is set as 0
  $B_{i,j}$ is set as 0
  (It is identical to $P_{i,j}^{final}=P_{i,j}^{L0}$)
else if $P_{i,j}^{L0}$ is determined as OOB and $P_{i,j}^{L1}$ is determined as OOB
  $w_{i,j}^{L0}$ is set as 1
  $w_{i,j}^{L1}$ is set as 1
  (It is identical to $P_{i,j}^{final}=((P_{i,j}^{L0}+P_{i,j}^{L1}+o_{offset})>>shift)+B_{i,j}$
else if $P_{i,j}^{L0}$ is determined as NOT OOB and $P_{i,j}^{L1}$ is determined as NOT OOB
  $w_{i,j}^{L0}$ is set as 1
  $w_{i,j}^{L1}$ is set as 1
  (It is identical to $(P_{i,j}^{final}=((P_{i,j}^{L0}+P_{i,j}^{L1}+o_{offset})>>shift)+B_{i,j}$ Based on the motion compensation scheme described above, a predictor sample is defined as OOB when at least one of the integer reference samples used to generate the predictor sample (through the interpolation process) is located outside the reference picture.

However, sometimes, only a few OOB reference integer samples are used to generate a predictor sample through the interpolation process, in this case, this predictor sample may still provide efficient prediction (e.g., only 2 out of 8 reference integer sample are OOB). Therefore, to provide tolerance of OOB determinations, different schemes are proposed to determine whether a predictor sample is OOB or not.

In another embodiment of the present disclosure, the predictor sample is determined as OOB when at least one of the vertically nearest integer reference samples are OOB or at least one of the horizontally nearest integer reference samples are OOB. For example, as illustrated in FIG. 28, the horizontally nearest integer reference samples of the predictor P_0,0→Lx is the sample d and e.

In another embodiment of the present disclosure, the predictor sample is determined as OOB when at least N out of the integer samples used to generate the predictor sample are OOB, where N is any integer.

In another embodiment of the present disclosure, when performing weighted average of two or multiple predictor blocks, less weights are given to the predictor samples which uses OOB integer reference samples to do the interpolation. Furthermore, the weights are in inverse proportion to the number of the OOB integer reference samples.

In another embodiment of the present disclosure, when performing weighted average of two or multiple predictor blocks, weights are given to the predictor samples which uses OOB integer reference samples to do the interpolation. The weights are signaled in the bitstream at different levels such as sequence level (sequence parameter set), picture level (picture parameter set), slice level (slice header) or block level.

However, in the present disclosure, to provide flexible OOB determinations, the following scheme is proposed to determine whether a predictor sample is OOB or not. In one or more embodiments, the predictor sample is determined as OOB depending on whether the predictor sample is located outside the reference picture and the fractional position of the predictor sample. To be specific, the positions of the predicted pixel within the current block are denoted as $Pos_{i,j}$; horizontal and vertical position index are further denoted as $Pos\_x_{i,j}$ and $Pos\_y_{i,j}$, the list0 MV and the list1 MV of the current block are $Mv_{i,j}^{L0}$ and $Mv_{i,j}^{L1}$, respectively; horizontal and vertical components of the MVs are further denoted as $Mv\_x_{i,j}^{L0}$ and $Mv\_y_{i,j}^{Lx}$ (Lx could be L0 or L1 representing list0 and list1, respectively). Since fractional MVs are supported in many existing video coding standards, such as 1/16-sample MV (could also be denoted as 1/16-pel MV) used in VVC, 1/4-sample MV used in HEVC, $Mv_{i,j}^{L0}$ and $Mv_{i,j}^{L1}$ are represented in the unit of the fractional samples (e.g. 1/16 sample), $Pos'\_x_{i,j}$ and $Pos'\_y_{i,j}$ are the position index denoted in the unit of the fractional sample for the positions of the predicted pixel within the current block. $Pos'_{LeftBdry}$, $Pos'_{RightBdry}$, $Pos'_{TopBdry}$, $Pos'_{BottomBdry}$ are the position index of boundary of a picture in the unit of the fractional samples.

Please be noted that, in this disclosure, it is assumed that the position index is started from the top-left of a picture, for example, the position index of the top-left sample of a picture is denoted as (0,0); and the position index is increased from top to bottom and left to right. In one exemplary scheme, one predictor sample is determined as OOB using the following conditions checking:

In one exemplary scheme, one predictor sample is determined as OOB using the following conditions checking (M, N, O, P are any integer):

The predictor sample $P_{i,j}^{Lx}$ is regarded as OOB when at least one of the following conditions holds $$\left(\text{Pos}\_x'_{i,j} + \text{Mv}\_x_{i,j}^{Lx}\right) > \left(Pos'_{RightBdry} + M\right),$$

$$\left(\text{Pos}\_x'_{i,j} + \text{Mv}\_x_{i,j}^{Lx}\right) < \left(Pos_{LeftBdry} - N\right),$$

$$\left(\text{Pos}\_y'_{i,j} + \text{Mv}\_y_{i,j}^{Lx}\right) > \left(Pos'_{BottomBdry} + O\right),$$

$$\text{or } \left(\text{Pos}\_y'_{i,j} + \text{Mv}\_y_{i,j}^{Lx}\right) > \left(Pos_{TopBdry} - P\right)$$

Otherwise, when none of the above conditions holds, the predictor sample $P_{i,j}^{Lx}$ is regarded as non-OOB.

Figure 37:
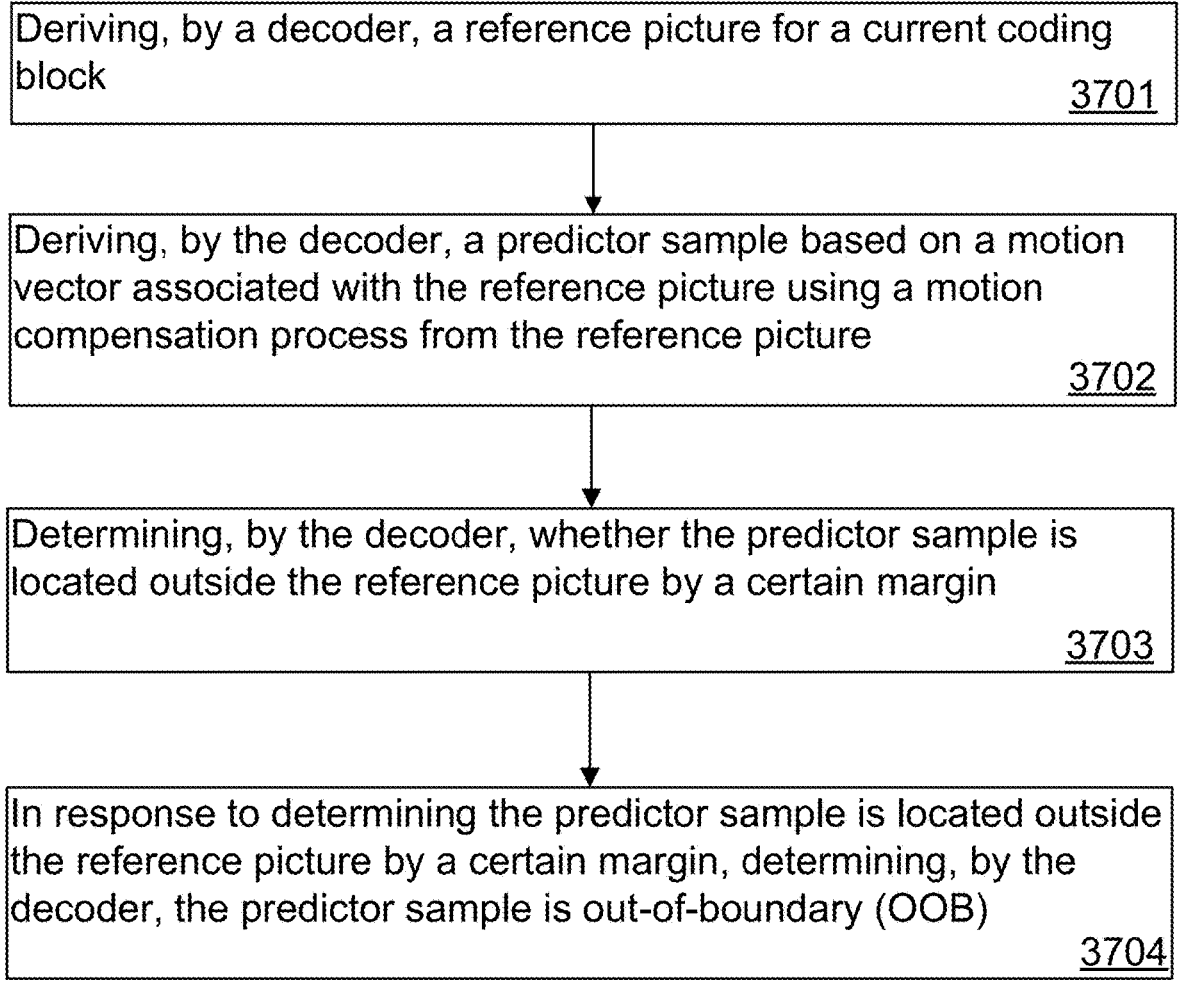
FIG. 37 is a flow chart showing a video coding method in accordance with some implementations of the present disclosure.

FIG. 37 illustrates a flow chart of a video coding process in accordance with one example of the present disclosure. In Step 3701, an encoder or a decoder may derive a reference picture for a current coding block. In Step 3702, the encoder or the decoder may derive a predictor sample based on a motion vector associated with the reference picture using a motion compensation process from the reference picture. In Step 3703, the encoder or the decoder may determine whether the predictor sample is located outside the reference picture by a certain margin. In Step 3704, the encoder or the decoder may determine the predictor sample is OOB in response to determining the predictor sample is located outside the reference picture by a certain margin.

In yet another embodiment, the OOB determination of the predictor samples could be done at the basis of a group of predictor samples. In one example, a block of M×N predictor samples, where M is block width and N is block height, share the same OOB status (determined as OOB or non-OOB) according to a OOB determination process as described previously (but not limited to the proposed schemes).

DMVR Considering OOB Conditions

In order to increase the accuracy of the MVs of the merge mode, a bilateral-matching (BM) based decoder side motion vector refinement is applied in VVC. In bi-prediction operation, a refined MV is searched around the initial MVs in the reference picture list L0 and reference picture list L1. The BM method calculates the distortion between the two candidate blocks in the reference picture list L0 and list L1. As illustrated in FIG. 17, the SAD between the red blocks based on each MV candidate around the initial MV is calculated. The MV candidate with the lowest SAD becomes the refined MV and used to generate the bi-predicted signal. In another embodiment, when the sample of the candidate blocks in the reference picture list L0 or list L1 is determined as OOB, that sample and its associated sample of the other corresponding candidate block are not used to calculate the matching cost (e.g., sum of absolute sample differences or sum of squared sample differences).

Template Matching Considering OOB Conditions

Template matching (TM) is a decoder-side MV derivation method to refine the motion information of the current CU by finding the closest match between a template (i.e., top and/or left neighbouring blocks of the current CU) in the current picture and a reference block (i.e., same size to the template) in a reference picture. In another embodiment, when the sample of the reference block in a reference picture is determined as OOB, that sample and its associated sample of the template in the current picture are not used to calculate the matching cost (e.g., sum of absolute sample differences or sum of squared sample differences).

MHP Considering OOB Conditions

In the multi-hypothesis inter prediction mode (JVET-M0425), one or more additional motion-compensated prediction signals are signaled, in addition to the conventional bi prediction signal. The resulting overall prediction signal is obtained by sample-wise weighted superposition. With the bi-prediction signal $p_{bi}$ and the first additional inter prediction signal/hypothesis $h_3$, the resulting prediction signal $p_3$ is obtained as follows:

$$p_3 = (1-\alpha)p_{bi} + \alpha h_3$$

In another embodiment, when the sample of additional motion-compensated prediction is determined as OOB, that sample is not used to generate the resulting overall prediction signal of MHP mode.

LIC Considering OOB Conditions

LIC is an inter prediction technique to model local illumination variation between current block and its prediction block as a function derived from pixels between current block template and reference block of the current block template. The parameters of the function can be denoted by a scale $\alpha$ and an offset $\beta$, which forms a linear equation, that is, $\alpha*p[x]+\beta$ to compensate illumination changes, where p[x] is a reference sample pointed to by MV at a location x on reference picture. Since $\alpha$ and $\beta$ can be derived based on current block template and reference block of the current block template, no signaling overhead is required for them, except that an LIC flag is signaled to indicate the use of LIC. In another embodiment, when the sample of the reference block of the current block template is determined as OOB, that sample and its associated sample of the current block template are not used to derive the LIC parameters.

Affine PROF

In another embodiment, when performing PROF, the PROF offset is set as zero when the samples used to derive the horizontal/vertical gradient values contain OOB reference samples.

In another embodiment, when performing PROF, the horizontal/vertical gradient value is set as zero when the samples used to derive the horizontal/vertical gradient values contain OOB reference samples.

Uni-Prediction Considering OOB Conditions

The uni-prediction method is similar to the inter-prediction block that is predicted using one single motion vector. In one or more examples of the present disclosure, for a uni-prediction block, an alternative predictor is used to replace the OOB predictor sample. In one scheme, the alternative predictor is derived by the predictor in the other reference pictures which is pointed by scaling the mv of the current block according to the temporal distances between the current picture, reference picture and the target reference picture using the similar scaling method used in the derivation of temporal MV prediction (TMVP) in VVC or HEVC.

As illustrated in FIG. 38, according to one example of the present disclosure, a method for decoding a bi-prediction coding block is provided. In Step 3801, a decoder derives a first reference picture for a current coding block. In Step 3802, the decoder derives a first predictor sample based on a motion vector associated with the first reference picture using a motion compensation process from the first reference picture. In Step 3803, the decoder determines whether the first predictor sample is out-of-boundary (OOB), and in response to determining the first predictor sample is OOB, the decoder replaces the first predictor sample that is OOB with a first alternative predictor sample. In Step 3804, the decoder derives a second reference picture for the current coding block. In Step 3805, the decoder derives a second predictor sample based on a motion vector associated with the second reference picture using a motion compensation process from the second reference picture. In Step 3806, the decoder determines whether the second predictor sample is out-of-boundary (OOB), and in response to determining the second predictor sample is OOB, the decoder replaces the second predictor sample that is OOB with a second alternative predictor sample. In Step 3807, the decoder generates a final prediction sample by averaging sample values of the first predictor sample and the second predictor sample.

Figure 39:
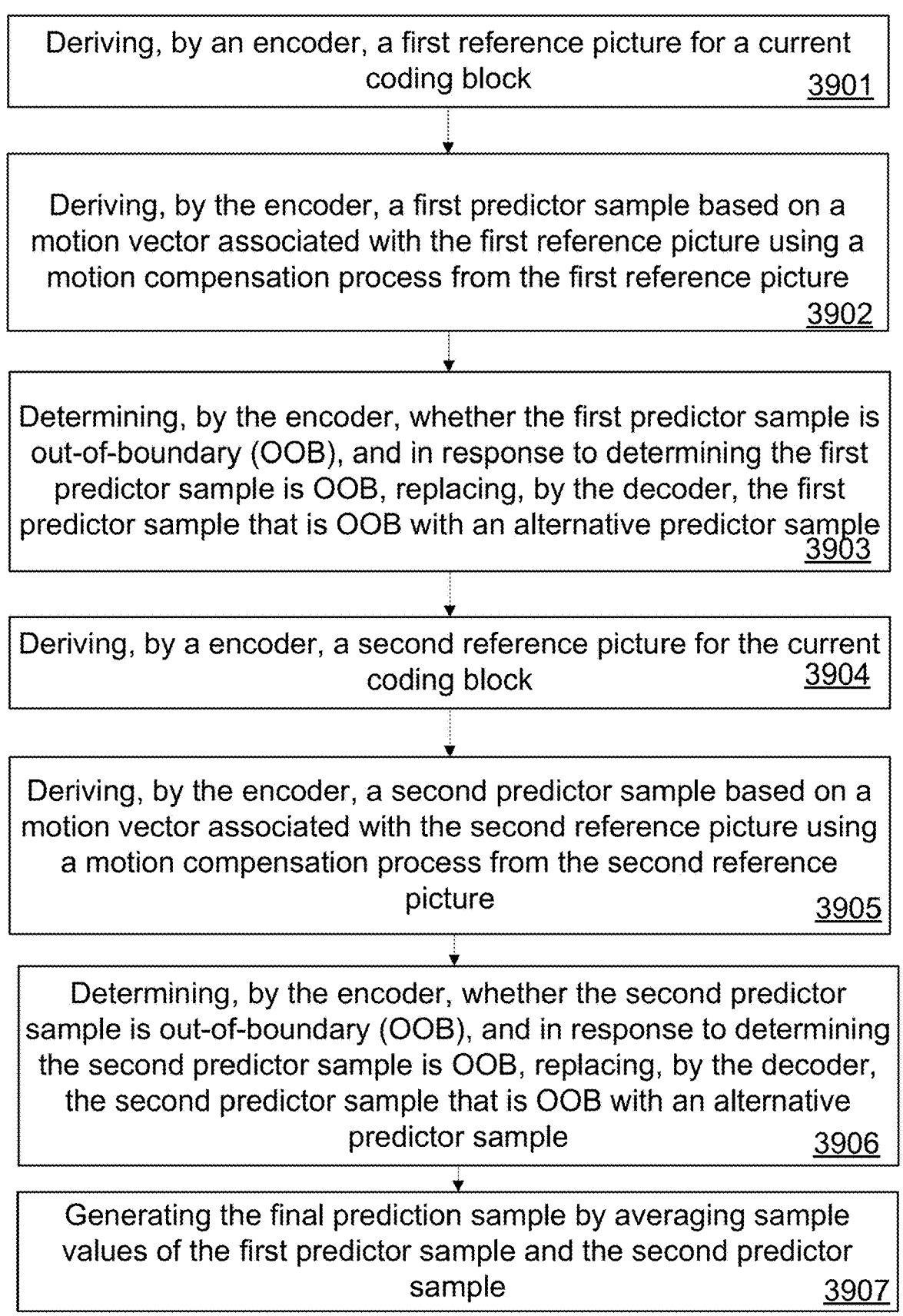
FIG. 39 is a flow chart showing a method for coding a bi-prediction coding block in accordance with some implementations of the present disclosure.

FIG. 39 is a block diagram illustrating a method for coding a bi-prediction coding block in accordance with one example of the present disclosure. In Step 3901, an encoder derives a first reference picture for a current coding block. In Step 3902, the encoder derives a first predictor sample based on a motion vector associated with the first reference picture using a motion compensation process from the first reference picture. In Step 3903, the encoder determines whether the first predictor sample is out-of-boundary (OOB), and in response to determining the first predictor sample is OOB, the encoder replaces the first predictor sample that is OOB with a first alternative predictor sample. In Step 3904, the encoder derives a second reference picture for the current coding block. In Step 3905, the encoder derives a second predictor sample based on a motion vector associated with the second reference picture using a motion compensation process from the second reference picture. In Step 3906, the encoder determines whether the second predictor sample is out-of-boundary (OOB), and in response to determining the second predictor sample is OOB, the encoder replaces the second predictor sample that is OOB with a second alternative predictor sample. In Step 3907, the encoder generates a final prediction sample by averaging sample values of the first predictor sample and the second predictor sample.

As illustrated in FIG. 40, according to one example of the present disclosure, a method for decoding a uni-prediction coding block is provided. In Step 4001, a decoder derives a first reference picture for a current coding block. In Step 4002, the decoder derives a first predictor sample based on a motion vector associated with the first reference picture using a motion compensation process from the first reference picture. In Step 4003, the decoder determines whether the first predictor sample is out-of-boundary (OOB), and in response to determining the first predictor sample is OOB, the decoder replaces the first predictor sample that is OOB with an alternative predictor sample. The decoder may derive the alternative predictor sample based on a second predictor sample in a second reference picture. For example, the decoder may derive the second predictor sample in the second reference picture by scaling a motion vector of the current coding block according to distances between a current picture, the first reference picture and the second reference picture.

FIG. 41 is a block diagram illustrating a method for coding a uni-prediction coding block in accordance with one example of the present disclosure. In Step 4101, an encoder derives a first reference picture for a current coding block. In Step 4102, the encoder derives a first predictor sample based on a motion vector associated with the first reference picture using a motion compensation process from the first reference picture. In Step 4103, the encoder determines whether the first predictor sample is out-of-boundary (OOB), and in response to determining the first predictor sample is OOB, the encoder replaces the first predictor sample that is OOB with an alternative predictor sample.

Implementation of the Proposed Methods

In an alternative way to fulfill the same motivation of the proposed method, in the fourteenth embodiment, the OOB predictor in one reference list LX (X may be 0 or 1) may be replaced by the corresponding non-OOB predictor in the other reference list L(1−X). After the replacement, the original averaging process for bi-directional MC may be kept unchanged. One example is given below to have the same results as illustrated in the first embodiment.

If $P_{i,j}^{L0}$ is determined as OOB and $P_{i,j}^{L1}$ is determined as NOT OOB It is identical to $(P_{i,j}^{final}=(P_{i,j}^{L1}+P_{i,j}^{L1}+1)>>1$
(and it is also identical to $P_{i,j}^{final}=P_{i,j}^{L1}$)

else if $P_{i,j}^{L0}$ is determined as NOT OOB and $P_{i,j}^{L1}$ is determined as OOB It is identical to $(P_{i,j}^{final}=(P_{i,j}^{L0}+P_{i,j}^{L1}+P_{i,j}^{L1}+1)>>1$
(It is identical to $P_{i,j}^{final}=P_{i,j}^{L0}$)

else if $P_{i,j}^{L0}$ is determined as OOB and $P_{i,j}^{L1}$ is determined as OOB It is identical to $(P_{i,j}^{final}=(P_{i,j}^{L1}+P_{i,j}^{L1}+1)>>1$ else if $P_{i,j}^{L0}$ is determined as NOT OOB and $P_{i,j}^{L1}$ is determined as NOT OOB It is identical to $(P_{i,j}^{final}=(P_{i,j}^{L1}+P_{i,j}^{L1}+1)>>1$ High-Level Syntax Signaling In another embodiment, one or multiple syntax elements could be signalled into the bitstream to indicate the enable/disable of the proposed MC considering OOB conditions. Besides, one or multiple syntax elements could be signalled into the bitstream to indicate the parameters or thresholds used in MC considering OOB. The proposed syntax elements could be signaled in sequence level (e.g., sequence parameter set), picture level (e.g., picture parameter set), slice level (e.g., slice header), CTU/CTB level, CU/CB level, PU/PB level. Moreover, the enabling/disabling controls could be in hierarchical schemes. For example, one syntax element is signaled at sequence level to indicate the enabling/disabling of the proposed OOB schemes. When the syntax element indicates the OOB scheme is disabled, no more syntax elements are signaled into the bitstream; when the syntax element indicates the OOB scheme is enabled, more syntax elements could be signaled at lower-level to indicate the OOB enabling/disabling at lower level. For example, when sequence-level syntax element indicates the OOB is enabled, one slice-level syntax element is signaled to indicate the enabling/disabling of OOB scheme at slice level.

In the motion compensation (MC) schemes of the existing video coding standards, when the reference sample indicated by the motion vector is located outside the predefined boundaries, either boundary sample padding or horizontal/vertical wrap around are utilized to enable the MC process using the reference sample located outside the boundaries. The predefine boundaries include but not limited to the coding picture boundaries, the sub-picture boundaries, the slice boundaries and/or tile boundaries. In another embodiment, the proposed MC schemes could be applied to any scheme when the motion compensation could be performed based on the reference samples located outside the boundaries as described above. It is also noted that the proposed schemes could be applied when reference picture resampling (RPR) is in use.

It is noted that the proposed motion compensation (MC) schemes which considers OOB conditions are not limited to be applied to the coding methods in the proposed embodiments but also may be applied to all the inter tools which perform MC to generate the predictor samples as illustrated in the previous sections such as sub-block MC (such as sub-block TMVP, Affine modes), OBMC, IBC, SMVD, DMVR and so on.

The above methods may be implemented using an apparatus that includes one or more circuitries, which include application specific integrated circuits (ASICs), digital signal processors (DSPs), digital signal processing devices (DSPDs), programmable logic devices (PLDs), field programmable gate e arrays (FPGAs), controllers, micro-controllers, microprocessors, or other electronic components. The apparatus may use the circuitries in combination with the other hardware or software components for performing the above-described methods. Each module, sub-module, unit, or sub-unit disclosed above may be implemented at least partially using the one or more circuitries.

Figure 29:
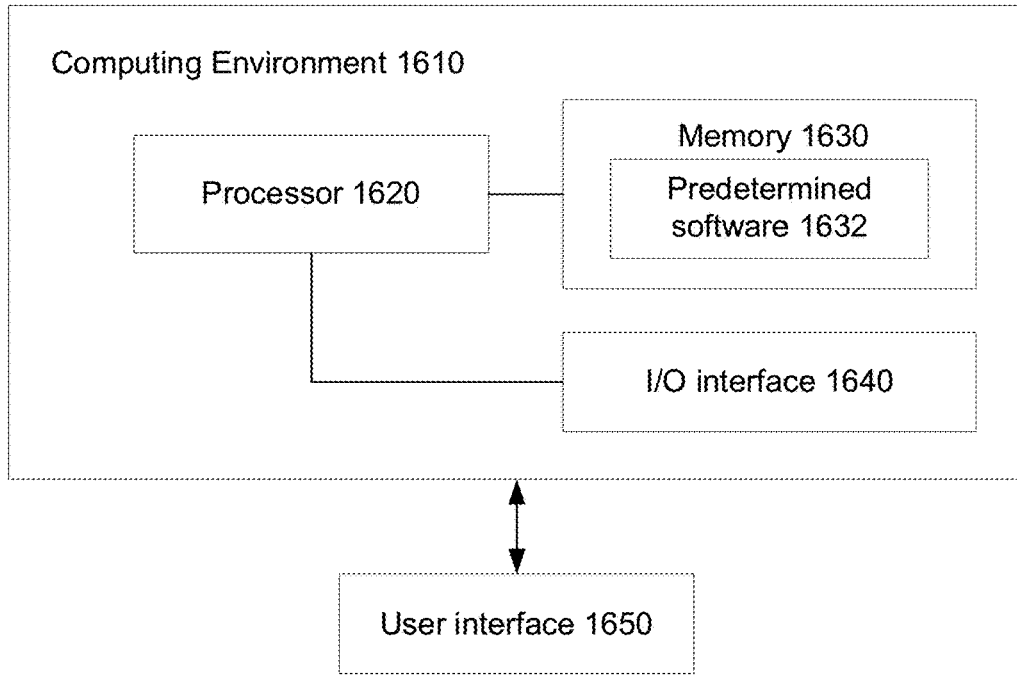
FIG. 29 is a block diagram illustrating a computing environment coupled with a user interface in accordance with some implementations of the present disclosure.

FIG. 29 shows a computing environment 1610 coupled with a user interface 1650. The computing environment 1610 may be part of a data processing server. The computing environment 1610 includes a processor 1620, a memory 1630, and an Input/Output (I/O) interface 1640.

The processor 1620 typically controls overall operations of the computing environment 1610, such as the operations associated with display, data acquisition, data communications, and image processing. The processor 1620 may include one or more processors to execute instructions to perform all or some of the steps in the above-described methods. Moreover, the processor 1620 may include one or more modules that facilitate the interaction between the processor 1620 and other components. The processor may be a Central Processing Unit (CPU), a microprocessor, a single chip machine, a Graphical Processing Unit (GPU), or the like.

The memory 1630 is configured to store various types of data to support the operation of the computing environment 1610. The memory 1630 may include predetermined software 1632. Examples of such data includes instructions for any applications or methods operated on the computing environment 1610, video datasets, image data, etc. The memory 1630 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The I/O interface 1640 provides an interface between the processor 1620 and peripheral interface modules, such as a keyboard, a click wheel, buttons, and the like. The buttons may include but are not limited to, a home button, a start scan button, and a stop scan button. The I/O interface 1640 may be coupled with an encoder and decoder.

In an embodiment, there is also provided a non-transitory computer-readable storage medium comprising a plurality of programs, for example, in the memory 1630, executable by the processor 1620 in the computing environment 1610, for performing the above-described methods. In one example, the plurality of programs may be executed by the processor 1620 in the computing environment 1610 to receive (for example, from the video encoder 20 in FIG. 2) a bitstream or data stream including encoded video information (for example, video blocks representing encoded video frames, and/or associated one or more syntax elements, etc.), and may also be executed by the processor 1620 in the computing environment 1610 to perform the decoding method described above according to the received bitstream or data stream. In another example, the plurality of programs may be executed by the processor 1620 in the computing environment 1610 to perform the encoding method described above to encode video information (for example, video blocks representing video frames, and/or associated one or more syntax elements, etc.) into a bitstream or data stream, and may also be executed by the processor 1620 in the computing environment 1610 to transmit the bitstream or data stream (for example, to the video decoder 30 in FIG. 3). Alternatively, the non-transitory computer-readable storage medium may have stored therein a bitstream or a data stream comprising encoded video information (for example, video blocks representing encoded video frames, and/or associated one or more syntax elements etc.) generated by an encoder (for example, the video encoder 20 in FIG. 2) using, for example, the encoding method described above for use by a decoder (for example, the video decoder 30 in FIG. 3) in decoding video data. The non-transitory computer-readable storage medium may be, for example, a ROM, a Random Access Memory (RAM), a CD-ROM, a magnetic tape, a floppy disc, an optical data storage device or the like.

In an embodiment, the is also provided a computing device comprising one or more processors (for example, the processor 1620); and the non-transitory computer-readable storage medium or the memory 1630 having stored therein a plurality of programs executable by the one or more processors, wherein the one or more processors, upon execution of the plurality of programs, are configured to perform the above-described methods.

In an embodiment, there is also provided a computer program product comprising a plurality of programs, for example, in the memory 1630, executable by the processor 1620 in the computing environment 1610, for performing the above-described methods. For example, the computer program product may include the non-transitory computer-readable storage medium.

In an embodiment, the computing environment 1610 may be implemented with one or more ASICs, DSPs, Digital Signal Processing Devices (DSPDs), Programmable Logic Devices (PLDs), FPGAs, GPUs, controllers, micro-controllers, microprocessors, or other electronic components, for performing the above methods.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

Unless specifically stated otherwise, an order of steps of the method according to the present disclosure is only intended to be illustrative, and the steps of the method according to the present disclosure are not limited to the order specifically described above, but may be changed according to practical conditions. In addition, at least one of the steps of the method according to the present disclosure may be adjusted, combined or deleted according to practical requirements.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for decoding a bi-prediction coding block, comprising:
   deriving, by a decoder, a first reference picture for a current coding block;

deriving, by the decoder, a first predictor sample based on a motion vector associated with the first reference picture using a motion compensation process from the first reference picture;

determining, by the decoder, whether the first predictor sample is out-of-boundary (OOB), and in response to determining the first predictor sample is OOB, replacing, by the decoder, the first predictor sample with a first alternative predictor sample;

deriving, by the decoder, a second reference picture for the current coding block;

deriving, by the decoder, a second predictor sample based on a motion vector associated with the second reference picture using a motion compensation process from the second reference picture;

determining, by the decoder, whether the second predictor sample is out-of-boundary (OOB), and in response to determining the second predictor sample is OOB, replacing, by the decoder, the second predictor sample with a second alternative predictor sample; and generating a final prediction sample by averaging sample values of the first predictor sample and the second predictor sample.

2. The method of claim 1, wherein replacing the first predictor sample with the first alternative predictor sample comprises:

setting the first alternative predictor sample as the second predictor sample.

3. The method of claim 1, wherein replacing the second predictor sample with the second alternative predictor sample comprises:

setting the second alternative predictor sample as the first predictor sample.

4. An apparatus, comprising:

one or more processors; and a memory configured to store instructions executable by the one or more processors and a bitstream; wherein the one or more processors, upon execution of the instructions, are configured to perform operations with the bitstream, the operations comprising:

deriving a first reference picture for a current coding block;

deriving a first predictor sample based on a motion vector associated with the first reference picture using a motion compensation process from the first reference picture;

determining whether the first predictor sample is out-of-boundary (OOB), and in response to determining the first predictor sample is OOB, replacing the first predictor sample with a first alternative predictor sample;

deriving a second reference picture for the current coding block;

deriving a second predictor sample based on a motion vector associated with the second reference picture using a motion compensation process from the second reference picture;

determining whether the second predictor sample is out-of-boundary (OOB), and in response to determining the second predictor sample is OOB, replacing the second predictor sample with a second alternative predictor sample; and generating a final prediction sample by averaging sample values of the first predictor sample and the second predictor sample.

5. The apparatus of claim 4, wherein replacing the first predictor sample with the first alternative predictor sample comprises:

setting the first alternative predictor sample as the second predictor sample.

6. The apparatus of claim 4, wherein replacing the second predictor sample with the second alternative predictor sample comprises:

setting the second alternative predictor sample as the first predictor sample.

7. A non-transitory computer-readable storage medium for storing computer-executable instructions and a bitstream, when the computer-executable instructions executed by one or more computer processors, cause the one or more computer processors to receive a bitstream, and perform operations with the bitstream, the operations comprising:

deriving, by a decoder, a first reference picture for a current coding block;

deriving, by the decoder, a first predictor sample based on a motion vector associated with the first reference picture using a motion compensation process from the first reference picture;

determining, by the decoder, whether the first predictor sample is out-of-boundary (OOB), and in response to determining the first predictor sample is OOB, replacing, by the decoder, the first predictor sample with a first alternative predictor sample;

deriving, by the decoder, a second reference picture for the current coding block;

deriving, by the decoder, a second predictor sample based on a motion vector associated with the second reference picture using a motion compensation process from the second reference picture;

determining, by the decoder, whether the second predictor sample is out-of-boundary (OOB), and in response to determining the second predictor sample is OOB, replacing, by the decoder, the second predictor sample with a second alternative predictor sample; and generating a final prediction sample by averaging sample values of the first predictor sample and the second predictor sample.

8. The non-transitory computer-readable storage medium of claim 7, wherein replacing the first predictor sample with the first alternative predictor sample comprises:

setting the first alternative predictor sample as the second predictor sample.

9. The non-transitory computer-readable storage medium of claim 7, wherein replacing the second predictor sample with the second alternative predictor sample comprises:

setting the second alternative predictor sample as the first predictor sample.

* * * * *